(12) United States Patent
Wang et al.

(10) Patent No.: US 12,353,250 B2
(45) Date of Patent: Jul. 8, 2025

(54) SCROLLABLE DISPLAY APPARATUS AND DISPLAY SYSTEM

(71) Applicant: BOE TECHNOLOGY GROUP CO., LTD., Beijing (CN)

(72) Inventors: Bo Wang, Beijing (CN); Fuqiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/251,011

(22) PCT Filed: Mar. 23, 2022

(86) PCT No.: PCT/CN2022/082615
§ 371 (c)(1),
(2) Date: Apr. 28, 2023

(87) PCT Pub. No.: WO2023/178577
PCT Pub. Date: Sep. 28, 2023

(65) Prior Publication Data
US 2024/0345629 A1    Oct. 17, 2024

(51) Int. Cl.
*G06F 1/16* (2006.01)
(52) U.S. Cl.
CPC .......... *G06F 1/1652* (2013.01); *G06F 1/1677* (2013.01)
(58) Field of Classification Search
CPC combination set(s) only.
See application file for complete search history.

(56) References Cited

U.S. PATENT DOCUMENTS 11,387,575 B2 *   7/2022   Choi ................. H01Q 9/42
11,604,492 B1 *   3/2023   Valikodath ............ G06F 1/1624
(Continued)

FOREIGN PATENT DOCUMENTS

CN   107402672 A   11/2017
CN   109426408 A   3/2019
(Continued)

OTHER PUBLICATIONS

PCT International Search Report (w/ English Translation) and Written Opinion for corresponding PCT Application No. PCT/CN2022/082615, dated Nov. 1, 2022, 12 pages.

*Primary Examiner* — Lisa Lea-Edmonds
(74) *Attorney, Agent, or Firm* — Dority & Manning, P.A.

(57) ABSTRACT

A scrollable display apparatus includes a flexible display panel, at least one first detection component and one or more first processors. The flexible display panel includes a fixed display part and at least one scrollable display part. A first detection component is configured to detect location information of a scrollable display part. The one or more first processors are configured to: determine a current state of the scrollable display part according to the position information of the scrollable display part detected by the first detection component; if it is determined that the scrollable display part is in a start-unfolded state, control the fixed display part to display a plurality of extension selection messages; and in response to a control instruction corresponding to a selected extension selection message, control the scrollable display part to display extension display information corresponding to the selected extension selection message.

20 Claims, 50 Drawing Sheets

(56) References Cited

U.S. PATENT DOCUMENTS

| | | | |
|---|---|---|---|
| 11,797,050 B2 * | 10/2023 | Lim | G06F 1/1624 |
| 11,805,605 B2 * | 10/2023 | Yoon | H05K 5/0017 |
| 11,815,959 B2 * | 11/2023 | Kim | G06F 1/1624 |
| 11,822,391 B2 * | 11/2023 | Kwak | G09F 9/301 |
| 12,111,700 B2 * | 10/2024 | Kim | G06F 1/1652 |
| 12,170,040 B2 * | 12/2024 | Wang | G09F 9/30 |
| 2014/0137041 A1 | 5/2014 | Jeon et al. | |
| 2015/0153777 A1 * | 6/2015 | Liu | G06F 1/1643 |
| | | | 345/173 |
| 2018/0081398 A1 | 3/2018 | Shin et al. | |
| 2021/0206266 A1 | 7/2021 | Shim et al. | |
| 2022/0291811 A1 | 9/2022 | Zhang et al. | |
| 2023/0017380 A1 * | 1/2023 | Kim | G06F 1/1652 |
| 2023/0099802 A1 * | 3/2023 | An | H04M 1/0237 |
| | | | 455/566 |
| 2023/0352814 A1 * | 11/2023 | An | G06F 1/1652 |
| 2023/0389243 A1 * | 11/2023 | Cho | H05K 7/20963 |
| 2024/0049411 A1 * | 2/2024 | Jang | B60K 35/81 |
| 2024/0063528 A1 * | 2/2024 | Seol | H04M 1/0237 |
| 2024/0345629 A1 * | 10/2024 | Wang | G06F 1/1652 |
| 2025/0023967 A1 * | 1/2025 | Baik | H04M 1/0268 |

FOREIGN PATENT DOCUMENTS

| | | |
|---|---|---|
| CN | 109683837 A | 4/2019 |
| CN | 112634762 A | 4/2021 |
| CN | 112927619 A | 6/2021 |
| CN | 113539098 A | 10/2021 |
| CN | 113568691 A | 10/2021 |

* cited by examiner

SCROLLABLE DISPLAY APPARATUS AND DISPLAY SYSTEM

CROSS-REFERENCE TO RELATED APPLICATION

This application is a national phase entry under 35 USC 371 of International Patent Application No. PCT/CN2022/082615 filed on Mar. 23, 2022, which is incorporated herein by reference in its entirety.

TECHNICAL FIELD

The present disclosure relates to the field of display technology, and in particular, to a scrollable display apparatus and a display system.

BACKGROUND

An organic light-emitting diode (OLED) display apparatus has many advantages such as self-luminescence, short response time, high definition and contrast, and may also ensure that a screen therein has certain flexibility and adaptability.

"Scrollable" is a new flexible display form of the OLED display apparatus, which makes a display area of a flexible display panel therein may be freely adjusted at multiple levels according to needs of users, and an adjusting process is smooth and easy.

SUMMARY

In another aspect, a scrollable display apparatus is provided. The scrollable display apparatus includes a flexible display panel, at least one first detection component, and one or more first processors. The flexible display panel includes a fixed display part and at least one scrollable display part. A first detection component in the at least one first detection component is configured to detect location information of a scrollable display part in the at least one scrollable display part. The one or more first processors are configured to: determine a current state of the scrollable display part according to the position information of the scrollable display part detected by the first detection component, where the current state includes a start-unfolded state; if it is determined that the scrollable display part is in the start-unfolded state, control the fixed display part to display a plurality of extension selection messages; and in response to a control instruction corresponding to a selected extension selection message from the plurality of first extension option messages, control the scrollable display part to display extension display information corresponding to the selected extension selection message.

In some embodiments, the current state further includes at least one target state. A first processor is configured to: if it is determined that the scrollable display part is in a designated target state or upon receipt of a control instruction causing the scrollable display part to be unfolded to the designated target state, in response to the control instruction corresponding to the selected extension selection message, control the scrollable display part to display the extension display information corresponding to the selected extension selection message, where the designated target state is one of the at least one target state.

In some embodiments, the first detection component includes: at least two photosensitive elements, disposed on the scrollable display part and coupled to the first processor, any photosensitive element being configured to detect an intensity of external ambient light. The at least two photosensitive elements include a first photosensitive element and at least one second photosensitive element.

The first processor is configured to: if an intensity of external ambient light detected by the first photosensitive element is within a first preset intensity range, and an intensity of external ambient light detected by all second photosensitive elements is within a second preset intensity range, determine that the scrollable display part is in the start-unfolded state, where any light intensity value in the first preset intensity range is greater than any light intensity value in the second preset intensity range; and if the intensity of the external ambient light detected by the first photosensitive element is within the first preset intensity range, and an intensity of the external ambient light detected by a designated number of second photosensitive elements is within the second preset intensity range, determine that the scrollable display part is in the designated target state.

In some embodiments, the scrollable display apparatus further includes a first housing component. The first housing component includes a fixed member and a sliding member that are connected in a sliding manner, the fixed member is connected to the fixed display part, and the sliding member is connected to the scrollable display part.

The first detection component includes an induction member and at least one detection member, the induction member is disposed on the sliding member or the scrollable display part, the at least one detection member is disposed on the fixed member and coupled to the first processor, and the at least one detection member is configured to detect position information of the induction member to obtain the position information of the scrollable display part.

In some embodiments, the scrollable display part has a display portion and a connecting portion, the display portion is adjacent to the fixed display part, and the connecting portion is located on a side of the display portion away from the fixed display part. The induction member is located on the connecting portion.

In some embodiments, the induction member includes a magnetic element; and a detection member includes magnetic detection elements, and a number of the magnetic detection elements is at least two. At least two of the magnetic detection elements include an initial magnetic detection element and at least one target magnetic detection element.

The first processor is configured to: if the magnetic element is out of a detection range of the initial magnetic detection element and does not enter a detection range of any target magnetic detection element, determine that the scrollable display part is in the start-unfolded state; and if the magnetic element is located within a detection range of a designated target magnetic detection element, determine that the scrollable display part is in the designated target state, where the designated target magnetic detection element is one of the at least one target magnetic detection element.

In some embodiments, the induction member includes a first electrode plate; and a detection member includes a second electrode plate, and the second electrode plate and the first electrode plate form a capacitor. The first electrode plate and the second electrode plate are both coupled to the first processor.

The first processor is configured to: if a capacitance value of the capacitor is within a first capacitance threshold range, determine that the scrollable display part is in the start-unfolded state; and if the capacitance value of the capacitor is within a second capacitance threshold range, determine that the scrollable display part is in the designated target state.

In some embodiments, the flexible display panel includes a plurality of conductive layers, and the induction member is located in at least one conductive layer.

In some embodiments, the at least one scrollable display part includes two scrollable display parts, and the two scrollable display parts are respectively disposed on two opposite sides of the fixed display part; and the sliding member further includes two sliding shafts, and a scrollable display part is wound on a portion of an outer peripheral surface of a sliding shaft. Diameters of the two sliding shafts in a first direction are not equal, and the first direction is perpendicular to a display surface of the fixed display part.

In some embodiments, the first processor is further configured to: based on the control instruction corresponding to the selected extension selection message, control the scrollable display part to be unfolded to the designated target state.

In some embodiments, the extension selection messages include a first selection message and a second selection message. A first processor is configured to: in response to a control instruction corresponding to the first selection message, control the scrollable display part and the fixed display part to display a current interface of the fixed display part together; or in response to a control instruction corresponding to the second selection message, control the scrollable display part to display a display image different from the current interface of the fixed display part.

In some embodiments, the second selection message includes any one or more of a first selection sub-message, a second selection sub-message, a third selection sub-message, and a fourth selection sub-message.

The first processor is configured to: in response to a control instruction corresponding to the first selection sub-message, control the scrollable display part to display desktop information of the fixed display part; or in response to a control instruction corresponding to the second selection sub-message, control the scrollable display part to display interface information on a next layer-level of the current interface of the fixed display part; or in response to a control instruction corresponding to the third selection sub-message, control the scrollable display part to display interface information on a previous layer-level of the current interface of the fixed display part; or in response to a control instruction corresponding to the fourth selection sub-message, control the scrollable display part to display interface information of any application program other than a current application program from all opened application programs.

In some embodiments, the scrollable display apparatus further includes a communication interface. The communication interface is coupled to the first processor and configured to be coupled to an external display apparatus. The second selection message includes a fifth selection sub-message. The first processor is configured to, in response to a control instruction corresponding to the fifth selection sub-message, control the scrollable display part to display current interface information of the external display apparatus.

In another aspect, a control method of a scrollable display apparatus is provided. The scrollable display apparatus includes: a flexible display panel and at least one first detection component. The flexible display panel includes a fixed display part and at least one scrollable display part. A first detection component in the at least one first detection component is configured to detect location information of a scrollable display part in the at least one scrollable display part. The control method includes: detecting the location information of the scrollable display part; determining a current state of the scrollable display part according to the detected position information of the scrollable display part, where the current state includes a start-unfolded state; if it is determined that the scrollable display part is in the start-unfolded state, controlling the fixed display part to display a plurality of extension selection messages; and in response to a control instruction corresponding to a selected extension selection message, controlling the scrollable display part to display extension display information corresponding to the selected extension selection message.

In some embodiments, the current state further includes at least one target state. In response to the control instruction corresponding to the selected extension selection message, controlling the scrollable display part to display the extension display information corresponding to the selected extension selection message, includes: if it is determined that the scrollable display part is in a designated target state or upon receipt of a control instruction causing the scrollable display part to be unfolded to the designated target state, in response to the control instruction corresponding to the selected extension selection message, controlling the scrollable display part to display the extension display information corresponding to the selected extension selection message, where the designated target state is one of the at least one target state.

In some embodiments, the first detection component includes at least two photosensitive elements disposed on the scrollable display part, and any photosensitive element is configured to detect an intensity of external ambient light. The at least two photosensitive elements include a first photosensitive element and at least one second photosensitive element.

Determining the current state of the scrollable display part according to the detected position information of the scrollable display part, includes: if an intensity of external ambient light detected by the first photosensitive element is within a first preset intensity range, and an intensity of external ambient light detected by all second photosensitive elements is within a second preset intensity range, determining that the scrollable display part is in the start-unfolded state, where any light intensity value in the first preset intensity range is greater than any light intensity value in the second preset intensity range; and if the intensity of the external ambient light detected by the first photosensitive element is within the first preset intensity range, and an intensity of the external ambient light detected by a designated number of second photosensitive elements is within the second preset intensity range, determining that the scrollable display part is in the designated target state.

In some embodiments, the scrollable display apparatus further includes a first housing component. The first housing component includes a fixed member and a sliding member that are connected in a sliding manner. The fixed member is connected to the fixed display part, and the sliding member is connected to the scrollable display part. The first detection component includes an induction member and at least one detection member. The induction member is disposed on the sliding member or the scrollable display part, and the at least one detection member is disposed on the fixed member.

In some embodiments, the induction member includes a magnetic element; and the detection member includes magnetic detection elements, a number of the magnetic detection elements is at least two, and at least two of the magnetic detection elements include an initial magnetic detection element and at least one target magnetic detection element.

Determining the current state of the scrollable display part according to the detected position information of the scrollable display part, includes: if the magnetic element is out of a detection range of the initial magnetic detection element and does not enter a detection range of any target magnetic detection element, determining that the scrollable display part is in the start-unfolded state; and if the magnetic element is located within a detection range of a designated target magnetic detection element, determining that the scrollable display part is in the designated target state, where the designated target magnetic detection element is one of the at least one target magnetic detection element.

In some embodiments, the induction member includes a first electrode plate, the detection member includes a second electrode plate, and the second electrode plate and the first electrode plate form a capacitor.

Determining the current state of the scrollable display part according to the detected position information of the scrollable display part, includes: if a capacitance value of the capacitor is within a first capacitance threshold range, determining that the scrollable display part is in the start-unfolded state; and if the capacitance value of the capacitor is within a second capacitance threshold range, determining that the scrollable display part is in the designated target state.

In some embodiments, the control method of the scrollable display apparatus further includes: based on the control instruction corresponding to the selected extension selection message, controlling the scrollable display part to be unfolded to the designated target state.

In some embodiments, the plurality of extension selection messages include a first selection message and a second selection message. In response to the control instruction corresponding to the selected extension selection message, controlling the scrollable display part to display the extension display information corresponding to the selected extension selection message, includes: in response to a control instruction corresponding to the first selection message, controlling the scrollable display part and the fixed display part to display a current interface of the fixed display part together; or in response to a control instruction corresponding to the second selection message, controlling the scrollable display part to display a display image different from the current interface of the fixed display part.

In some embodiments, the second selection messages include any one or more of a first selection sub-message, a second selection sub-message, a third selection sub-message, and a fourth selection sub-message. In response to the control instruction corresponding to the second selection message, controlling the scrollable display part to display the display image different from the current interface of the fixed display part, includes: in response to a control instruction corresponding to the first selection sub-message, controlling the scrollable display part to display desktop information of the fixed display part; or in response to a control instruction corresponding to the second selection sub-message, controlling the scrollable display part to display interface information on a next layer-level of the current interface of the fixed display part; or in response to a control instruction corresponding to the third selection sub-message, controlling the scrollable display part to display interface information on a previous layer-level of a current interface of the fixed display part; or in response to a control instruction corresponding to the fourth selection sub-message, controlling the scrollable display part to display interface information of any application program other than a current application program from all opened application programs.

In some embodiments, the scrollable display apparatus further includes a communication interface configured to be coupled to an external display apparatus. The second selection messages include a fifth selection sub-message. In response to the control instruction corresponding to the second selection message, controlling the scrollable display part to display the display image different from the current interface of the fixed display part, includes: in response to a control instruction corresponding to the fifth selection sub-message, controlling the scrollable display part to display current interface information of the external display apparatus.

In yet another aspect, a display system is provided. The display system includes a first display apparatus and at least one first scrollable display apparatus. The first display apparatus includes a first connecting part. A first scrollable display apparatus in the at least one first scrollable display apparatus includes a second connecting part. The first display apparatus is configured to, in a case that the second connecting part is connected to the first connecting part, and the first scrollable display apparatus is in a preset state, display a plurality of first extension option messages, where the preset state includes any one of a folded state and a start-unfolded state.

The first scrollable display apparatus is configured to, in response to a control instruction corresponding to a selected first extension option message from the plurality of first extension option messages, display extension display information corresponding to the selected first extension option message.

In some embodiments, the first scrollable display apparatus includes a flexible display panel, and the flexible display panel includes a fixed display part and at least one scrollable display part. The first scrollable display apparatus is configured to: if it is determined that the scrollable display part is in a designated target state or upon receipt of a control instruction causing the scrollable display part to be unfolded to the designated target state, in response to the control instruction corresponding to the selected first extension option message, display the extension display information corresponding to the selected first extension option message, where the designated target state is one of at least one target state.

In some embodiments, the first scrollable display apparatus is further configured to, in response to the control instruction corresponding to the selected first extension option message, control the scrollable display part to be unfolded to the designated target state.

In some embodiments, the first extension option messages include any one or more of a first option message, a second option message, a third option message, a fourth option message, and a fifth option message. The first scrollable display apparatus is configured to: in response to a control instruction corresponding to the first option message, display a current interface of the first display apparatus together with the first display apparatus; or in response to a control instruction corresponding to the second option message, display interface information on a next layer-level of the current interface of the first display apparatus; or in response to a control instruction corresponding to the third option message, display interface information on a previous layer-level of the current interface of the first display apparatus; or in response to a control instruction corresponding to the fourth option message, display desktop information of the current interface of the first display apparatus; or in response to a control instruction corresponding to the fifth option message, display interface information of any application program other than a current application program from all opened application programs on the first display apparatus.

The second scrollable display apparatus is coupled to the first display apparatus. The first display apparatus is further configured to: in a case that the second connecting part is connected to the first connecting part, and an apparatus of the first scrollable display apparatus and the second scrollable display apparatus is in a start-folded state, obtain display information of the apparatus in the start-folded state; and based on the display information, control an other apparatus of the first scrollable display apparatus and the second scrollable display apparatus to be folded to a designated target state, and to display the display information; or in a case that the second connecting part is connected to the first connecting part, and of the first scrollable display apparatus and the second scrollable display apparatus, an apparatus is in the start-unfolded state, and an other apparatus is in the start-folded state, obtain display information of the apparatus in the start-folded state, and transmit the display information to the apparatus in the start-unfolded state.

Alternatively, the second scrollable display apparatus is coupled to the first scrollable display apparatus. In a case that, of the first scrollable display apparatus and the second scrollable display apparatus, an apparatus is in the start-unfolded state, and an other apparatus is in the start-folded state, the apparatus in the start-unfolded state is configured to obtain and display information of the apparatus in the start-folded state.

In some embodiments, the display system further includes a second scrollable display apparatus.

The second display apparatus is coupled to the first scrollable display apparatus. The second display apparatus is configured to: in a case that the second connecting part is connected to the first connecting part, and the first scrollable display apparatus is in the preset state, display a plurality of second extension option messages, where the preset state includes any one of the folded state and the start-unfolded state. The first scrollable display apparatus is configured to, in response to a control instruction corresponding to a selected second extension option message, display extension display information corresponding to the selected second extension option message.

In some embodiments, the second extension option messages include any one or more of a sixth option message, a seventh option message, an eighth option message, and a ninth option message. The first scrollable display apparatus is configured to: in response to a control instruction corresponding to the sixth option message, display interface information on a next layer-level of a current interface of the second display apparatus; or in response to a control instruction corresponding to the seventh option message, display interface information on a previous layer-level of the current interface of the second display apparatus; or in response to a control instruction corresponding to the eighth option message, display desktop information of the second display apparatus; or in response to a control instruction corresponding to the ninth option message, display interface information of any application program other than a current application program from all opened application programs on the second display apparatus.

In yet another aspect, an interaction method of a display system is provided. A display system includes a first display apparatus and at least one first scrollable display apparatus.

The first display apparatus includes a first connecting part, and a first scrollable display apparatus includes a second connecting part.

The interaction method includes: in a case that the second connecting part is connected to the first connecting part, and the first scrollable display apparatus is in a preset state, displaying, by the first display apparatus, a plurality of first extension option messages, where the preset state includes any one of a folded state and a start-unfolded state; and in response to a control instruction corresponding to a selected first extension option message, displaying, by the first scrollable display apparatus, extension display information corresponding to the selected first extension option message.

In some embodiments, the first scrollable display apparatus includes a flexible display panel, and the flexible display panel includes a fixed display part and at least one scrollable display part.

In response to the control instruction corresponding to the selected first extension option message, displaying, by the first scrollable display apparatus, the extension display information corresponding to the selected first extension option message, includes: if it is determined that the scrollable display part is in a designated target state or upon receipt of a control instruction causing the scrollable display part to be unfolded to the designated target state, in response to the control instruction corresponding to the selected first extension option message, displaying, by the first scrollable display apparatus, the extension display information corresponding to the selected first extension option message, where the designated target state is one of at least one target state.

In some embodiments, the interaction method further includes: in response to the control instruction corresponding to the selected first extension option message, controlling, by the first scrollable display apparatus, the scrollable display part to be unfolded to the designated target state.

In some embodiments, the first extension option messages include any one or more of a first option message, a second option message, a third option message, a fourth option message, and a fifth option message.

In response to the control instruction corresponding to the selected first extension option message, displaying, by the first scrollable display apparatus, the extension display information corresponding to the selected first extension option message, includes: in response to a control instruction corresponding to the first option message, displaying, by the first scrollable display apparatus, a current interface of the first display apparatus together with the first display apparatus; or in response to a control instruction corresponding to the second option message, displaying, by the first scrollable display apparatus, interface information on a next layer-level of the current interface of the first display apparatus; or in response to a control instruction corresponding to the third option message, displaying, by the first scrollable display apparatus, interface information on a previous layer-level of the current interface of the first display apparatus; or in response to a control instruction corresponding to the fourth option message, displaying, by the first scrollable display apparatus, desktop information of the current interface of the first display apparatus; or in response to a control instruction corresponding to the fifth option message, displaying, by the first scrollable display apparatus, interface information of any application program other than a current application program from all opened application programs on the first display apparatus.

In some embodiments, the display system further includes a second scrollable display apparatus.

The second scrollable display apparatus is coupled to the first display apparatus. The interaction method further includes:

in a case that the second connecting part is connected to the first connecting part, and an apparatus of the first scrollable display apparatus and the second scrollable display apparatus is in a start-folded state, obtaining, by the first display apparatus, display information of the apparatus in the start-folded state; and based on the display information, controlling, by the first display apparatus, an other apparatus of the first scrollable display apparatus and the second scrollable display apparatus to be folded to a designated target state, and to displaying, by the first display apparatus, the display information; or in a case that the second connecting part is connected to the first connecting part, and of the first scrollable display apparatus and the second scrollable display apparatus, an apparatus is in the start-unfolded state, and an other apparatus is in the start-folded state, obtaining, by the first display apparatus, display information of the apparatus in the start-folded state, and transmitting, by the first display apparatus, the display information to the apparatus in the start-unfolded state.

Alternatively, the second scrollable display apparatus is coupled to the first scrollable display apparatus. The interaction method further includes: in a case that, of the first scrollable display apparatus and the second scrollable display apparatus, an apparatus is in the start-unfolded state, and an other apparatus is in the start-folded state, obtaining and displaying, by the apparatus in the start-unfolded state, display information of the apparatus in the start-folded state.

In some embodiments, the display system further includes a second display apparatus. The interaction method further includes: in a case that the second connecting part is connected to the first connecting part, and the first scrollable display apparatus is in the preset state, displaying, by the second display apparatus, a plurality of second extension option messages, where the preset state includes any one of the folded state and the start-unfolded state. In response to a control instruction corresponding to a selected second extension option message, displaying, by the first scrollable display apparatus, extension display information corresponding to the selected second extension option message.

In some embodiments, the second extension option messages include any one or more of a sixth option message, a seventh option message, an eighth option message, and a ninth option message. In response to the control instruction corresponding to the selected second extension option message, displaying, by the first scrollable display apparatus, the extension display information corresponding to the selected second extension option message, includes: in response to a control instruction corresponding to the sixth option message, displaying, by the first scrollable display apparatus, interface information on a next layer-level of a current interface of the second display apparatus; or in response to a control instruction corresponding to the seventh option message, displaying, by the first scrollable display apparatus, interface information on a previous layer-level of the current interface of the second display apparatus; or in response to a control instruction corresponding to the eighth option message, displaying, by the first scrollable display apparatus, desktop information of the second display apparatus; or in response to a control instruction corresponding to the ninth option message, displaying, by the first scrollable display apparatus, interface information of any application program other than a current application program from all opened application programs on the second display apparatus.

In yet another aspect, a non-transitory computer-readable storage medium is provided. The computer-readable storage medium has stored a computer program instruction. When run on the scrollable display apparatus, the computer program instruction causes the scrollable display apparatus to perform the control method of the scrollable display apparatus as described in any of the above embodiments; or when run on the first display apparatus, the computer program instruction causes the first display apparatus to perform a method performed by the first display apparatus as described in any of the above embodiments; or when run on the second display apparatus, the computer program instruction causes the second display apparatus to perform a method performed by the second display apparatus as described in any of the above embodiments; or when run on the first scrollable display apparatus, the computer program instruction causes the first scrollable display apparatus to perform a method performed by the first scrollable display apparatus as described in any of the above embodiments; or when run on a second scrollable display apparatus, the computer program instruction causes the second scrollable display apparatus to perform a method performed by the second scrollable display apparatus as described in any of the above embodiments.

In yet another aspect, a computer program product is provided. The computer program product includes a computer program instruction. When run on the scrollable display apparatus, the computer program instruction causes the scrollable display apparatus to perform the control method of the scrollable display apparatus as described in any of the above embodiments; or when run on the first display apparatus, the computer program instruction causes the first display apparatus to perform a method performed by the first display apparatus as described in any of the above embodiments; or when run on the second display apparatus, the computer program instruction causes the second display apparatus to perform a method performed by the second display apparatus as described in any of the above embodiments; or when run on the first scrollable display apparatus, the computer program instruction causes the first scrollable display apparatus to perform a method performed by the first scrollable display apparatus as described in any of the above embodiments; or when run on a second scrollable display apparatus, the computer program instruction causes the second scrollable display apparatus to perform a method performed by the second scrollable display apparatus as described in any of the above embodiments.

In yet another aspect, a computer program is provided, which is stored on a non-transitory computer-readable storage medium. When run on the scrollable display apparatus, the computer program causes the scrollable display apparatus to perform the control method of the scrollable display apparatus as described in any of the above embodiments; or when run on the first display apparatus, the computer program causes the first display apparatus to perform a method performed by the first display apparatus as described in any of the above embodiments; or when run on the second display apparatus, the computer program causes the second display apparatus to perform a method performed by the second display apparatus as described in any of the above embodiments; or when run on the first scrollable display apparatus, the computer program causes the first scrollable display apparatus to perform a method performed by the first scrollable display apparatus as described in any of the above embodiments; or when run on a second scrollable display apparatus, the computer program causes the second scrollable display apparatus to perform a method performed by the second scrollable display apparatus as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION

Figure 1:
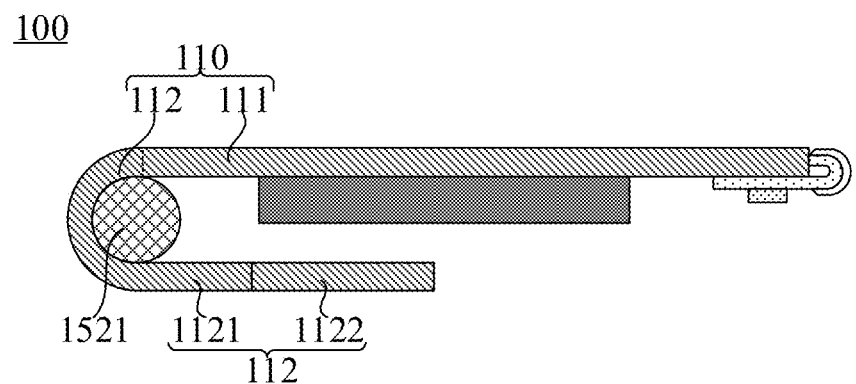
FIG. 1 is a structural diagram of a scrollable display apparatus, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the specification and the claims are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, features defined with "first" or "second" may explicitly or implicitly include one or more of the features. In the description of the embodiments of the present disclosure, the term "a plurality of/the plurality of" means two or more unless otherwise specified.

In the description of some embodiments, terms "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when" or "in a case that" or "in response to determining" or "in response to detecting", depending on the context. Similarly, depending on the context, the phrase "if it is determined . . . " or "if [a stated condition or event] is detected" is optionally construed as "in a case that it is determined . . . ", "in response to determining . . . ", "in a case that [the stated condition or event] is detected" or "in response to detecting [the stated condition or event]".

The use of the phrase "configured to" herein means an open and inclusive expression, which does not exclude devices that are adapted to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

The terms "parallel", "perpendicular" and "equal" as used herein include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

It should be understood that when a layer or element is referred to as being on another layer or substrate, it may be that the layer or element is directly on the other layer or substrate, or it may be that there is an intermediate layer between the layer or element and the other layer or substrate.

Exemplary embodiments are described herein with reference to sectional views and/or plan views that are schematic illustrations of idealized embodiments. In the accompanying drawings, thicknesses of layers and regions are enlarged for clarity. Therefore, variations in shapes with respect to the accompanying drawings due to, for example, manufacturing technologies and/or tolerances may be envisaged. Thus, the exemplary embodiments should not be construed as limited to the shapes of the regions illustrated herein but include deviations in shape due to, for example, manufacturing. For example, etched areas shown as rectangles will typically have curved features. Therefore, the regions shown in the accompanying drawings are schematic in nature, and their shapes are not intended to show actual shapes of regions in a device, and are not intended to limit the scope of the exemplary embodiments.

Utilizing advantages of flexible display screens being bendable and foldable, a scrollable display apparatus has become an innovative application field of the flexible display screens, enabling users to freely adjust an area of a display region of the flexible display screen according to their own needs. In this way, it is not only convenient for the users to carry around, but also provides the users with a good experience effect, which enables the scrollable display apparatus is an important direction for the development of the flexible display screens.

The scrollable display apparatus can be unfolded or rolled up to at least one side, so as to adjust the display area of the scrollable display apparatus.

In some implementations, the user needs to determine a state of the scrollable display apparatus by himself (or herself), and then interacts with the scrollable display apparatus after the scrollable display apparatus is stable, resulting in low user experience.

In light of this, as shown in FIG. 1, some embodiments of the present disclosure provide a scrollable display apparatus 100. The scrollable display apparatus 100 may be an appliance or device for visually displaying electronic information.

The scrollable display apparatus 100 may be any apparatus that can displays images whether in motion (e.g., a video) or stationary (e.g., a still image), and whether textual or graphical. More specifically, it is expected that the embodiments may be implemented in or associated with a plurality of electronic apparatuses. The plurality of electronic apparatuses may include (but is not limit to), for example, mobile telephones, wireless devices, personal data assistants (PDA), hand-held or portable computers, GPS receivers/navigators, cameras, MP4 video players, video cameras, game consoles, watches, clocks, calculators, TV monitors, flat panel displays, computer monitors, car displays (such as odometer displays, etc.), navigators, cockpit controllers and/or displays, camera view displays (such as rear view camera displays in vehicles), electronic photos, electronic billboards or indicators, projectors, building structures, packagings and aesthetic structures (such as a display for an image of a piece of jewelry), etc.

As shown in FIG. 1, the scrollable display apparatus 100 includes a flexible display panel 110, and the flexible display panel 110 includes a fixed display part 111 and at least one scrollable display part 112.

In some examples, the flexible display panel 110 may be an organic light-emitting diode (OLED) display panel, which may be bent according to application requirements.

The fixed display part 111 is not scrolled, and a display area of a portion of the fixed display part 111 exposed to an outside of the scrollable display apparatus 100 is fixed. The scrollable display part 112 can be scrolled, and the scrollable display part 112 may be unfolded through being scrolled, so that a hidden portion of the scrollable display part 112 inside the scrollable display apparatus 100 is exposed, thereby increasing the display area of the scrollable display apparatus 100.

Figure 2:
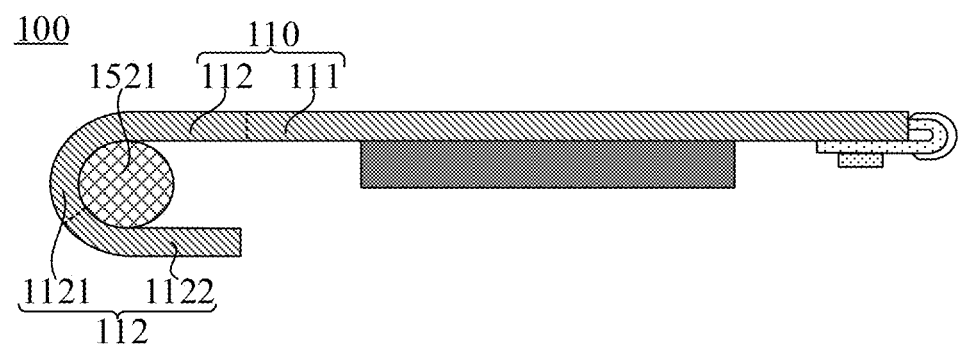
FIG. 2 is a structural diagram of a scrollable display apparatus, in accordance with some embodiments.

The scrollable display part 112 has at least two states, which are a folded state and an unfolded state, respectively. As shown in FIG. 1, the scrollable display part 112 is in the folded state, and in this case, the entire scrollable display part 112 is hidden in the scrollable display apparatus 100. As shown in FIG. 2, the scrollable display part 112 is in the unfolded state, and at least a portion of the scrollable display part 112 is pulled out.

In some examples, the flexible display panel 110 includes at least one scrollable display part 112.

In some possible designs, referring to FIG. 1 and FIG. 2, the flexible display panel 110 includes a fixed display part 111 and a scrollable display part 112 located on a side of the fixed display part 111.

Figure 3A:
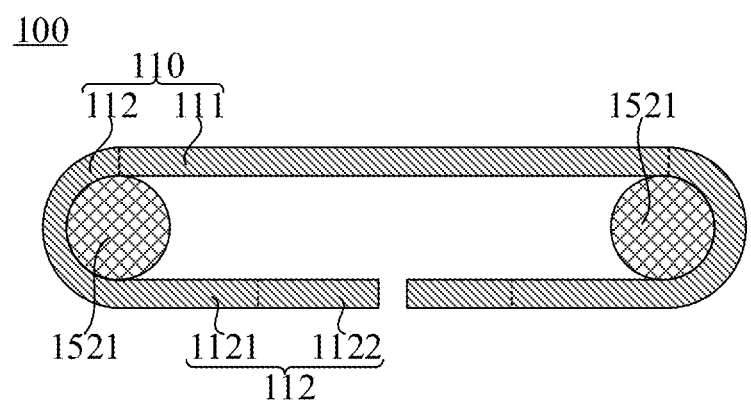
FIG. 3A is a structural diagram of a scrollable display apparatus, in accordance with some embodiments.
Figure 3B:
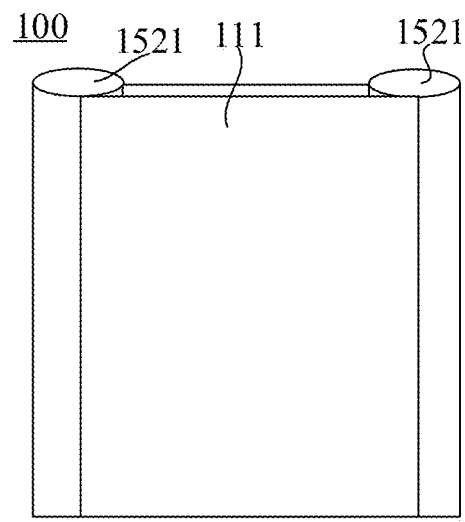
FIG. 3B is a structural diagram of a scrollable display apparatus, in accordance with some embodiments.
Figure 4A:
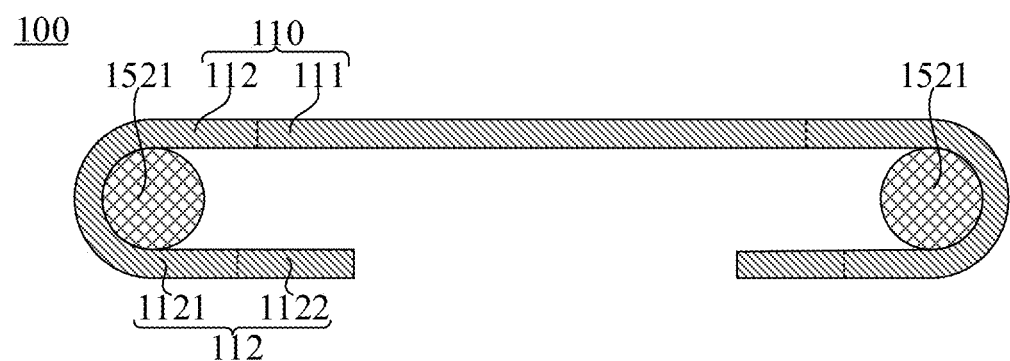
FIG. 4A is a structural diagram of a scrollable display apparatus, in accordance with some embodiments.
Figure 4B:
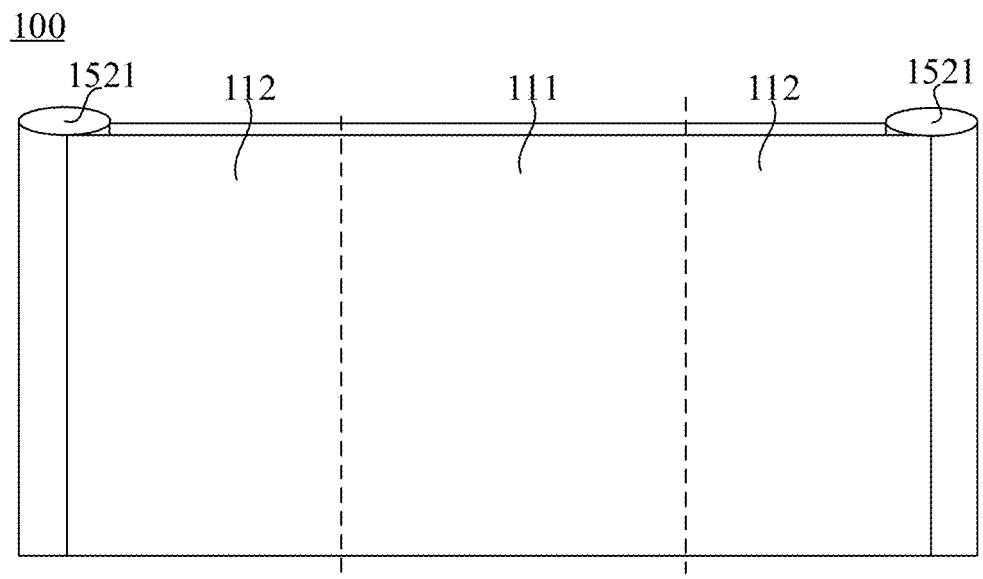
FIG. 4B is a structural diagram of a scrollable display apparatus, in accordance with some embodiments.

In some other possible designs, referring to FIG. 3A, FIG. 3B, FIG. 4A and FIG. 4B, the flexible display panel 110 includes a fixed display part 111 and two scrollable display parts 112, and the two scrollable display parts 112 are located at opposite sides of the fixed display part 111. Here, FIG. 3A and FIG. 3B illustrate the folded state, and FIG. 4A and FIG. 4B illustrate the unfolded state.

Figure 5A:
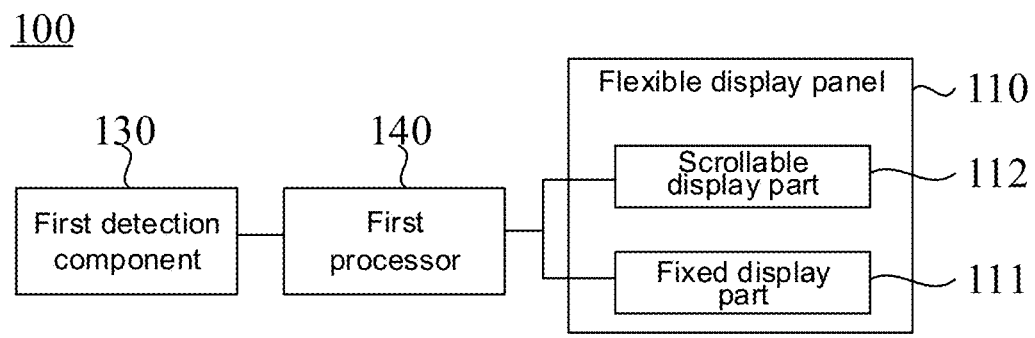
FIG. 5A is a structural diagram of a scrollable display apparatus, in accordance with some embodiments.

As shown in FIG. 5A, the scrollable display apparatus 100 provided by some embodiments of the present disclosure further includes at least one first detection component 130 and one or more first processors 140. A first detection component 130 is configured to detect position information of a scrollable display part 112.

Here, the first processor 140 may be, for example, a central processor (Central Processing Unit, CPU), a general-purpose processor, a digital signal processor (DSP), an application-specific integrated circuit (ASIC), a field programmable gate array (FPGA) or other programmable logic devices, transistor logic devices, hardware components, or any combination thereof. It may implement or execute various illustrative logical blocks, modules and circuits described in content of the present disclosure. The processor 140 may also be a combination that implements computing functions, for example, a combination including one or more microprocessors, a combination of a DSP and a microprocessor, or the like.

Figure 5B:
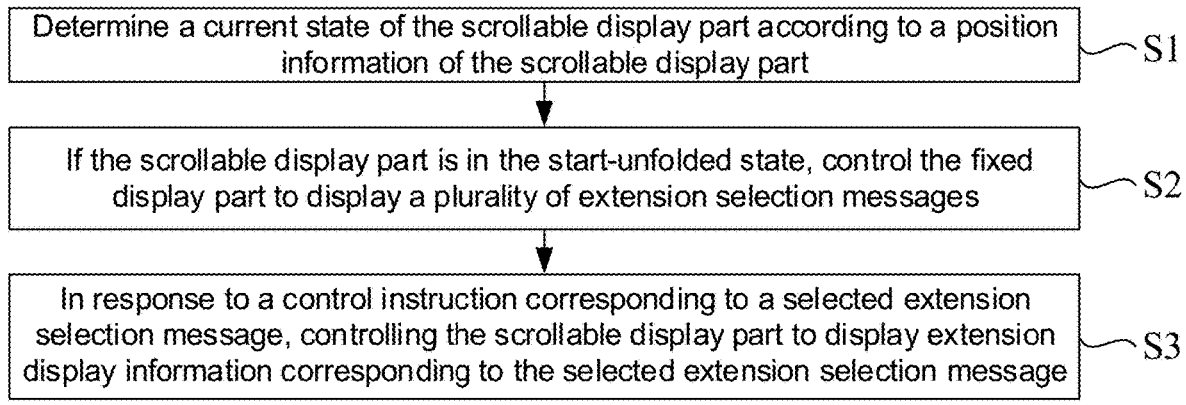
FIG. 5B is a flow diagram of a control method of a scrollable display apparatus, in accordance with some embodiments.

As shown in FIG. 5B, the one or more first processors 140 are configured to perform the following steps S1 to S3.

S1, determining a current state of the scrollable display part 112 according to the position information of the scrollable display part 112 detected by the first detection component 130, where the current state includes a start-unfolded state;

S2, if it is determined that the scrollable display part 112 is in the start-unfolded state, controlling the fixed display part 111 to display a plurality of extension selection messages; and S3, in response to a control instruction corresponding to a selected extension selection message, controlling the scrollable display part 112 to display extension display information corresponding to the selected extension selection message.

It will be noted that the first detection component 130 is coupled to the first processor 140, so as to transmit the detected position information of the scrollable display part 112 to the first processor 140. In some examples, the first detection component 130 and the first processor 140 may be physically and electrically connected through signal wires. In some other examples, there is no physical connection between the first detection component 130 and the first processor 140, but a signal coupling, so as to realize transmission and reception of signals between the first detection component 130 and the first processor 140 and receive.

After receiving the position information of the scrollable display part 112, the first processor 140 may determine the current state of the scrollable display part 112 according to the position information of the scrollable display part 112. For example, the current state may include a folded state, an unfolded state, and a start-unfolded state.

As shown in FIG. 1 and FIG. 3A, in the folded state, the entire scrollable display part 112 is hidden in the scrollable display apparatus 100.

In the unfolded state, at least a portion of the scrollable display part 112 is pulled out, that is, the at least a portion of the scrollable display part 112 is exposed. In some examples, according to an area of the pulled-out portion of the scrollable display part 112, the unfolded state may be divided into at least a partially unfolded state and a fully unfolded state. As shown in FIG. 1 to FIG. 4A, the scrollable display part 112 includes a display portion 1121 and a connecting portion 1122, where the display portion 1121 can be used to display an image, and the connecting portion 1122 cannot display images. In the partially unfolded state, a portion of the display portion 1121 is pulled out, and in the fully unfolded state, the entire display portion 1121 is pulled out.

In the start-unfolded state, the scrollable display part 112 is just out of the folded state; and in the start-unfolded state, an area of the portion of the scrollable display part 112 exposed to the outside of the scrollable display apparatus 100 gradually increases.

If the first processor 140 determines that the scrollable display part 112 is in the start-unfolded state, the first processor 140 may control the fixed display part 111 to display the plurality of extension selection messages.

The plurality of extension selection messages may appear in a form of a pop-up window; or a current page on the fixed display part 111 jumps to an extension selection page, and the plurality of extension selection messages appear on the extension selection page.

The user may select the extension selection message by operating the scrollable display apparatus 100 through touch operations or using other input apparatuses. The plurality pieces of extension display information correspond to different control instructions, and the first processor 140 may control the scrollable display part 112 to display different extension display information according to a control instruction corresponding to different extension selection messages. Furthermore, the user may select any one from the plurality of extension selection messages according to his (or her) own needs.

For example, a plurality pieces of extension display information corresponding to the plurality of extension selection messages may include any two or more of the following pieces of information: desktop information of the fixed display part 111, interface information on a previous layer-level of a current interface of the fixed display part 111, interface information on a next layer-level of the current interface of the fixed display part 111, partial information of the current interface of the fixed display part 111, and the like. In a case that extension selection message selected by the user corresponds to the partial information of the current interface of the fixed display part 111, the first processor 140 may control the scrollable display part 112 and the fixed display part 111 to display the current interface of the fixed display part 111 together, thereby enlarging the current interface of the fixed display part 111 to bring good visual effects to the user.

Hereinafter, considering example in which the scrollable display apparatus 100 is a mobile phone, the extension selection message, the extension display information, and so on will be illustratively described.

Figure 6A:
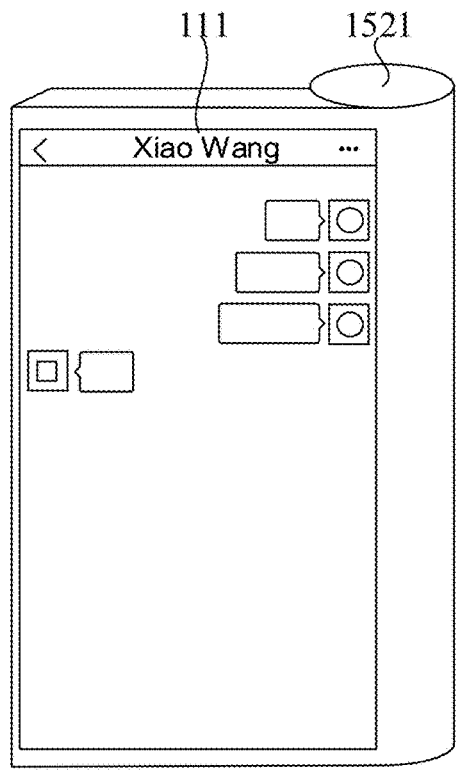
FIG. 6A is a structural diagram of a scrollable display apparatus, in accordance with some embodiments.

For example, referring to FIG. 6A, in a case that the scrollable display part 112 is in the folded state, current display information of the fixed display part 111 may be a certain chat software page.

Figure 6B:
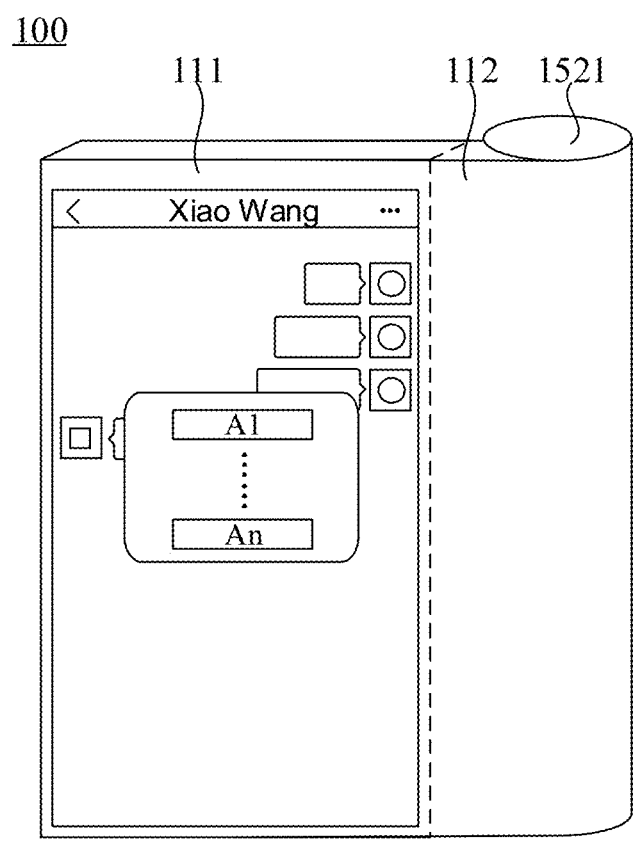
FIG. 6B is a structural diagram of a scrollable display apparatus, in accordance with some embodiments.

Then the scrollable display part 112 is unfolded, and the first detection component 130 transmits the detected position information of the scrollable display part 112 to the first processor 140, and the first processor 140 determines that the scrollable display part 112 is in the start-unfolded state according to the position information of the scrollable display part 112. Referring to FIG. 6B, in this case, the first processor 140 controls an interface of the fixed display part 111 to appear a pop-up window, in which the plurality of extension selection messages are displayed. A1 to An are used in FIG. 6B to refer to the plurality of extension selection messages. It will be noted here that in addition to the form of the pop-up window, the plurality of extension selection messages A1 to An may also be displayed on the current interface of the scrollable display part 112 in other forms, and the present disclosure is not limited thereto.

Figure 6C:
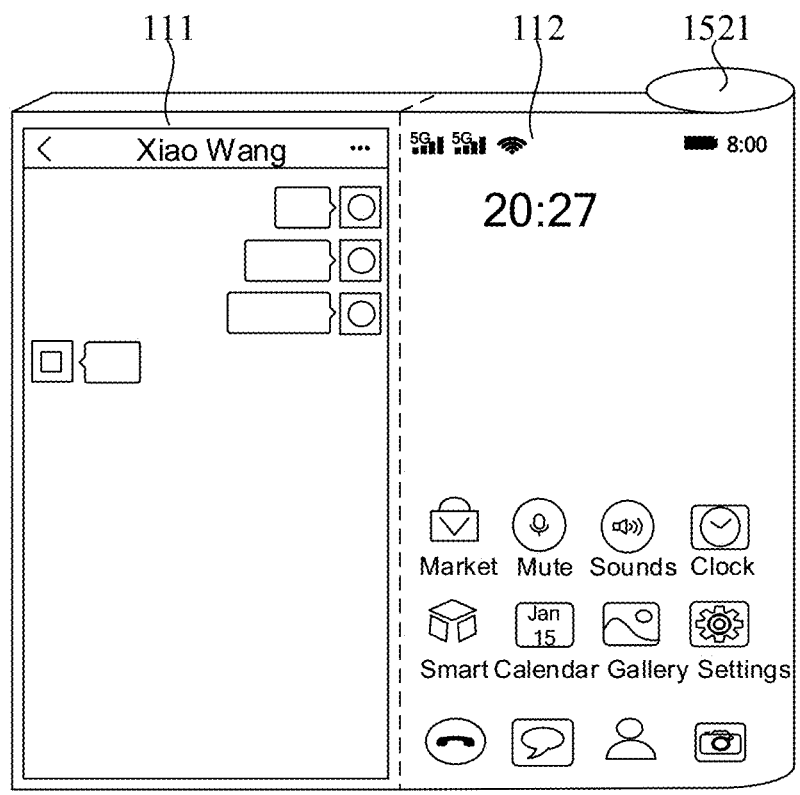
FIG. 6C is a structural diagram of a scrollable display apparatus, in accordance with some embodiments.

For example, one extension selection message among A1 to An corresponds to the desktop information of the fixed display part 111. If the user selects the extension selection message, in response to a control instruction corresponding to the extension selection message, the first processor 140 may control the scrollable display part 112 to display the desktop information of the fixed display part 111. In this case, the interface information of the scrollable display apparatus 100 is shown in FIG. 6C.

In the scrollable display apparatus 100 provided by some embodiments of the present disclosure, the first detection component 130 is provided to detect the state of the scrollable display part 112. In the case that the scrollable display part 112 is in the start-unfolded state, the first processor 140 controls the fixed display part 111 to provide the plurality of extension selection messages for the user to select a message, and then display content of the scrollable display part 112 is controlled according to the extension selection message selected by the user. Therefore, there is no need for the user to determine the state of the scrollable display part 112, and the plurality of extension selection messages are provided for the user in time for selection, which brings a good user experience to the user.

In some embodiments, the current state further includes at least one target state. The first processor 140 is configured to: if it is determined that the scrollable display part 112 is in a designated target state or upon receipt of a control instruction causing the scrollable display part 112 to be unfolded to the designated target state, in response to the control instruction corresponding to the selected extension selection message, control the scrollable display part 112 to display the extension display information corresponding to the selected extension selection message, where the designated target state is one of the at least one target state.

In some examples, there may be one or more target states, and any one of the at least partially unfolded state and the fully unfolded state may be a target state. In a case that there is one target state, the target state may be the fully unfolded state.

In some examples, different extension selection messages may correspond to different target states. In some other examples, some extension selection messages may correspond to a same target state.

In some examples, after receiving the control instruction causing the scrollable display part 112 to be unfolded to the designated target state, the first processor 140 controls the scrollable display part 112 to display the extension display information corresponding to the selected extension selection message. Therefore, before the scrollable display part 112 is unfolded to the designated target state, the scrollable display part 112 has displayed a corresponding image, and the display image may be gradually exposed during a process of unfolding the scrollable display part 112. Therefore, continuous experience of the user will not be interrupted during the process of unfolding the scrollable display part 112, and the user may get a strong sense of fashion and technology, thereby bringing the user a good visual and user experience.

In some other examples, after the scrollable display part 112 is in the designated target state, the first processor 140 controls the scrollable display part 112 to display the extension display information corresponding to the selected extension selection message. Before the scrollable display part 112 is unfolded to the designated target state, the scrollable display part 112 does not display images, thereby reducing load on a battery of the scrollable display apparatus 100.

In some embodiments, the first processor 140 is further configured to, based on the control instruction causing the scrollable display part 112 to be unfolded to the designated target state, control the scrollable display part 112 to be unfolded to the designated target state.

In some examples, "the control instruction causing the scrollable display part 112 to be unfolded to the designated target state" is the control instruction corresponding to the selected extension selection message. If the user selects a different extension selection message, the first processor 140 may control the scrollable display part 112 to be unfolded to a different target state. In this case, the plurality of extension selection messages may have a one-to-one correspondence with a plurality of target states. In addition, in some other examples, some extension selection messages may correspond to a same target state.

In some examples, different extension selection messages correspond to different display images, and for the different display images, the scrollable display part 112 needs to provide different display areas to make the display images present good display effect.

Different target states correspond to different unfolded states of the scrollable display part 112, and the scrollable display apparatus 100 has different display areas in the different unfolded states. It can be understood that, in the different unfolded states, the fixed display part 111 and an exposed portion of the scrollable display part 112 display an image, and a portion of the scrollable display part 112 hidden in the scrollable display apparatus 100 does not display images.

The first processor 140 may control the scrollable display part 112 to be unfolded to different target states according to a display image corresponding to the extension selection message, and the scrollable display part 112 has different display areas in the different target states. Therefore, the first processor 140 may control the scrollable display part 112 to have different display areas according to the extension selection message, not only a display area may be adjusted according to the display image, so that the scrollable display apparatus 100 has a good display effect, but also battery power of the scrollable display apparatus 100 may be used reasonably.

Figure 7A:
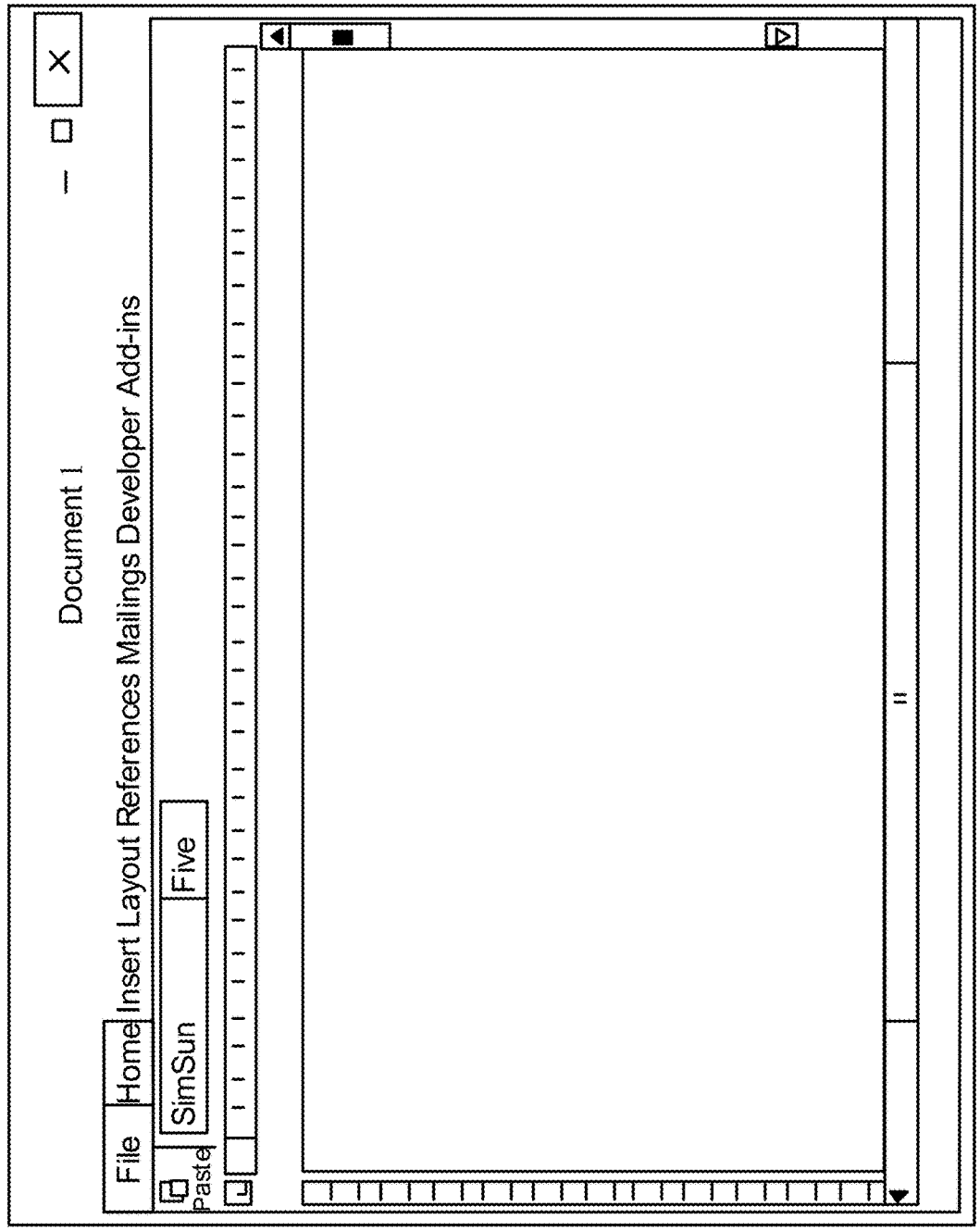
FIG. 7A is an interface diagram of a scrollable display apparatus, in accordance with some embodiments.
Figure 7B:
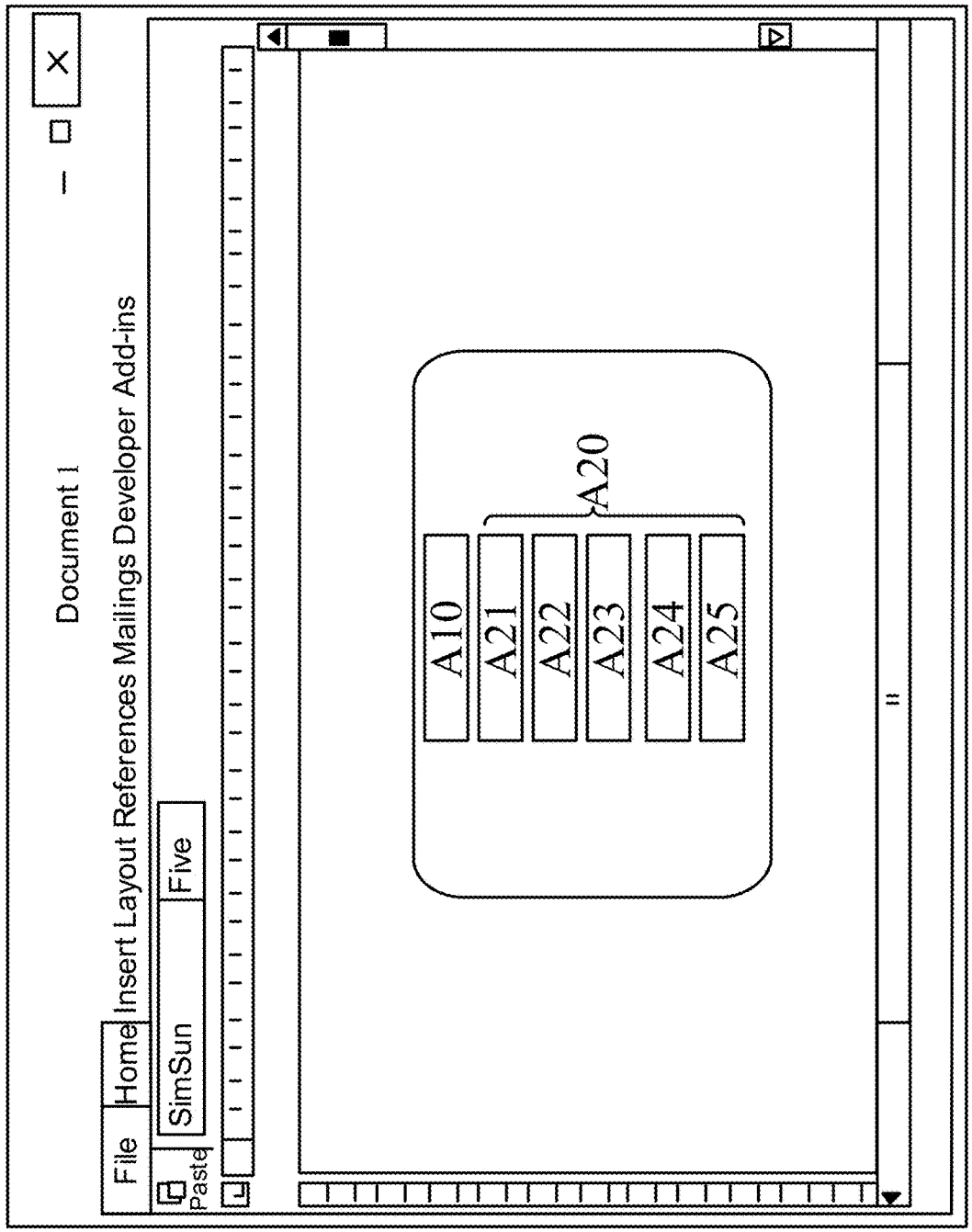
FIG. 7B is an interface diagram of a scrollable display apparatus, in accordance with some embodiments.
Figure 7C:
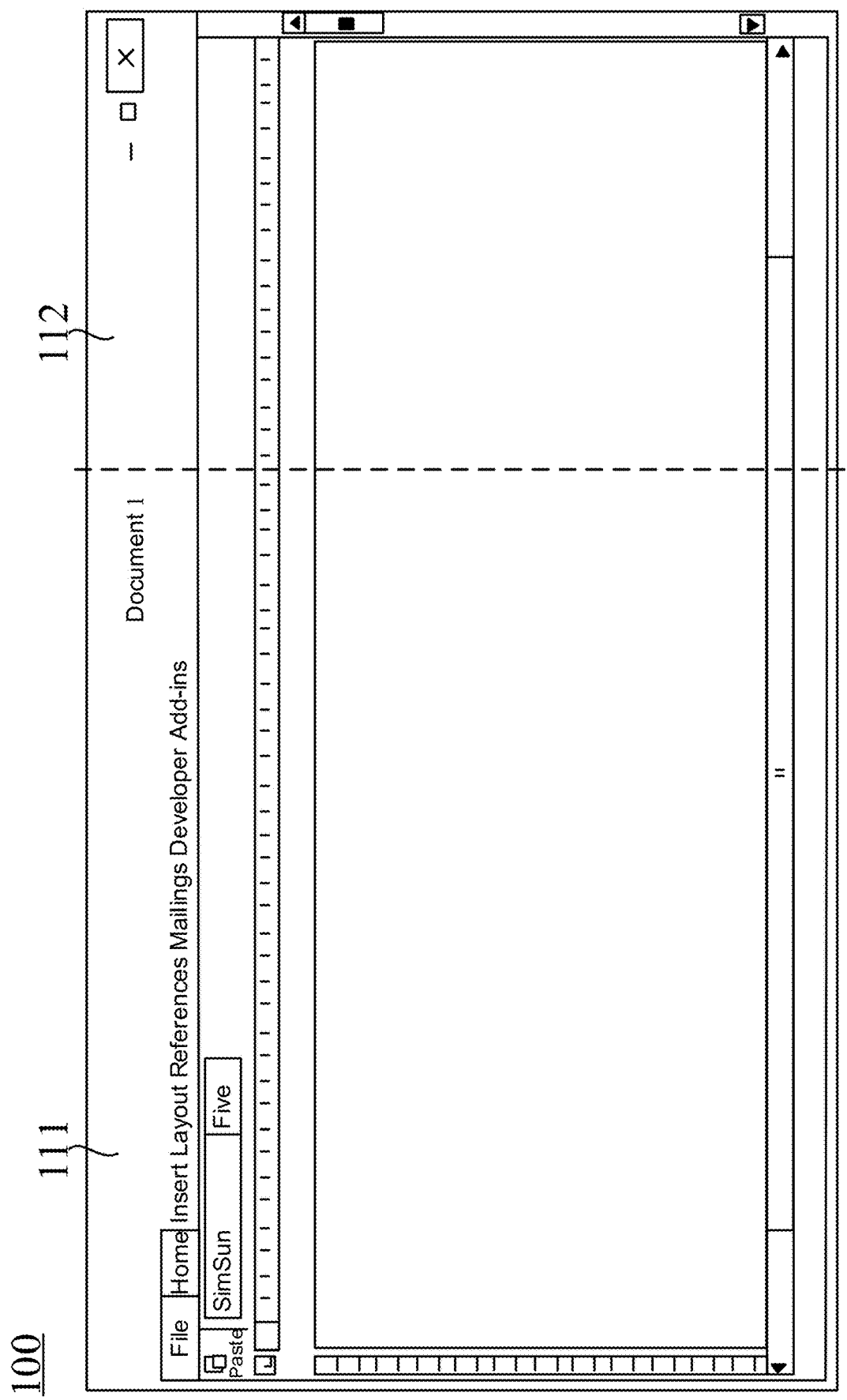
FIG. 7C is an interface diagram of a scrollable display apparatus, in accordance with some embodiments.
Figure 8A:
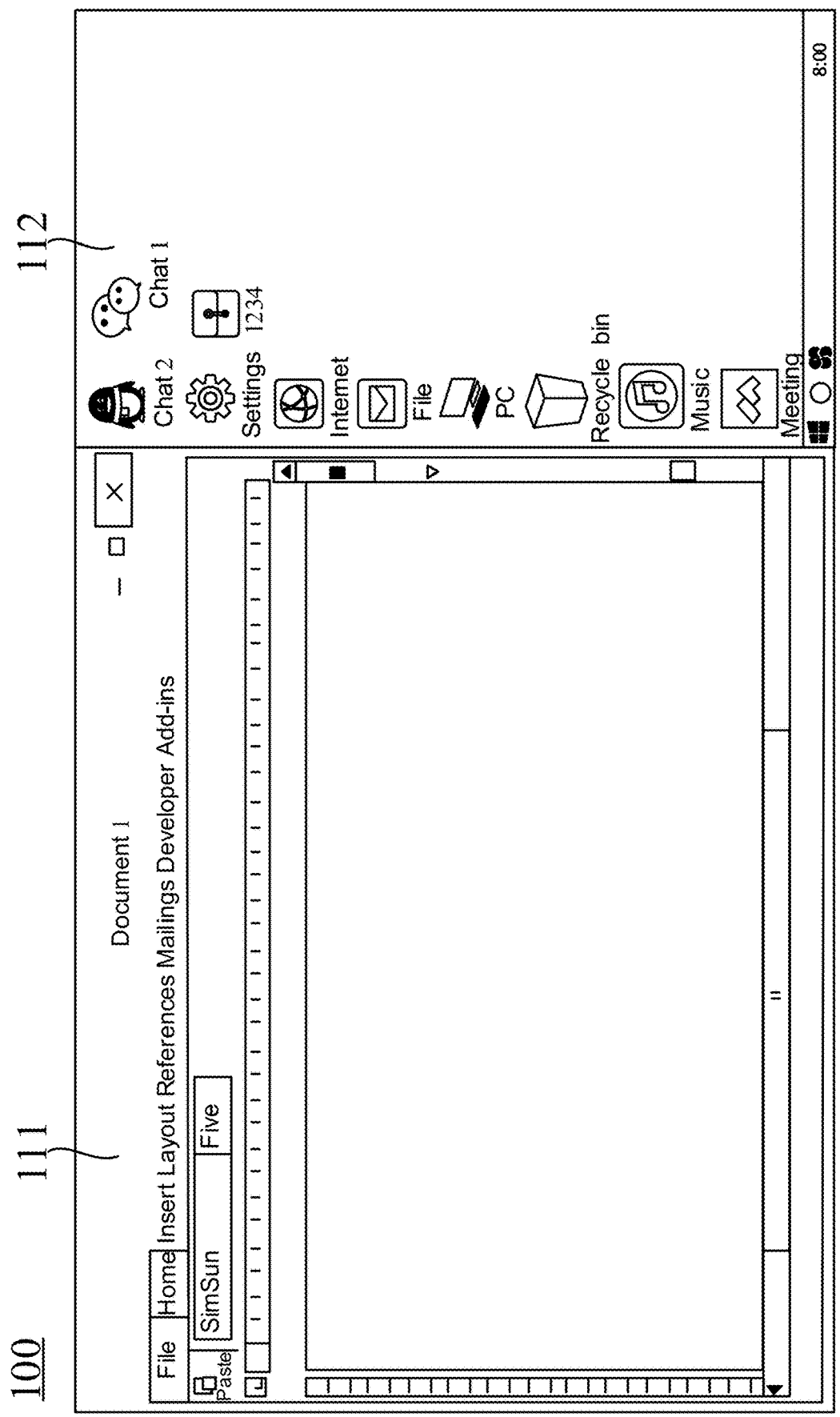
FIG. 8A is an interface diagram of a scrollable display apparatus, in accordance with some embodiments.
Figure 8B:
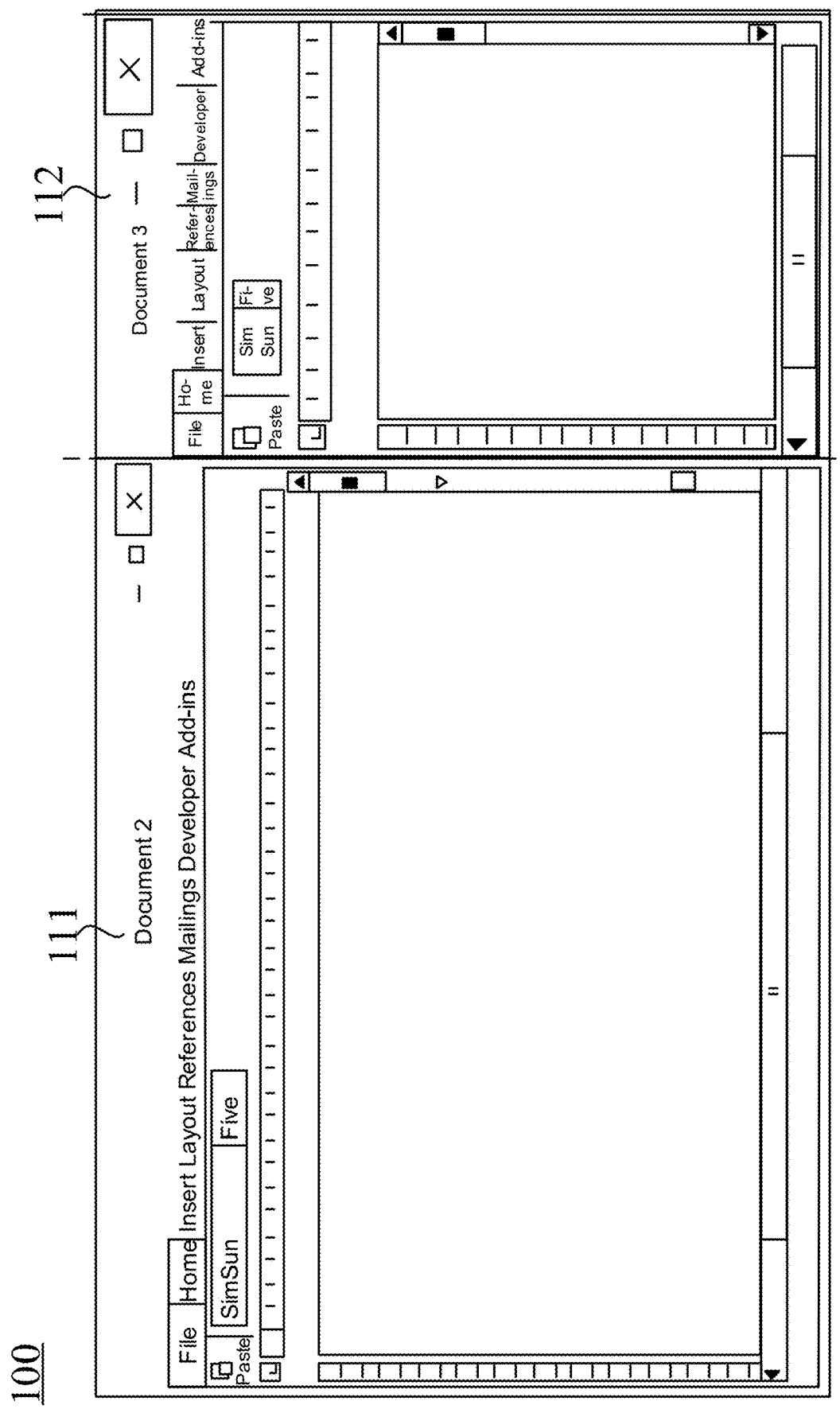
FIG. 8B is an interface diagram of a scrollable display apparatus, in accordance with some embodiments.
Figure 8C:
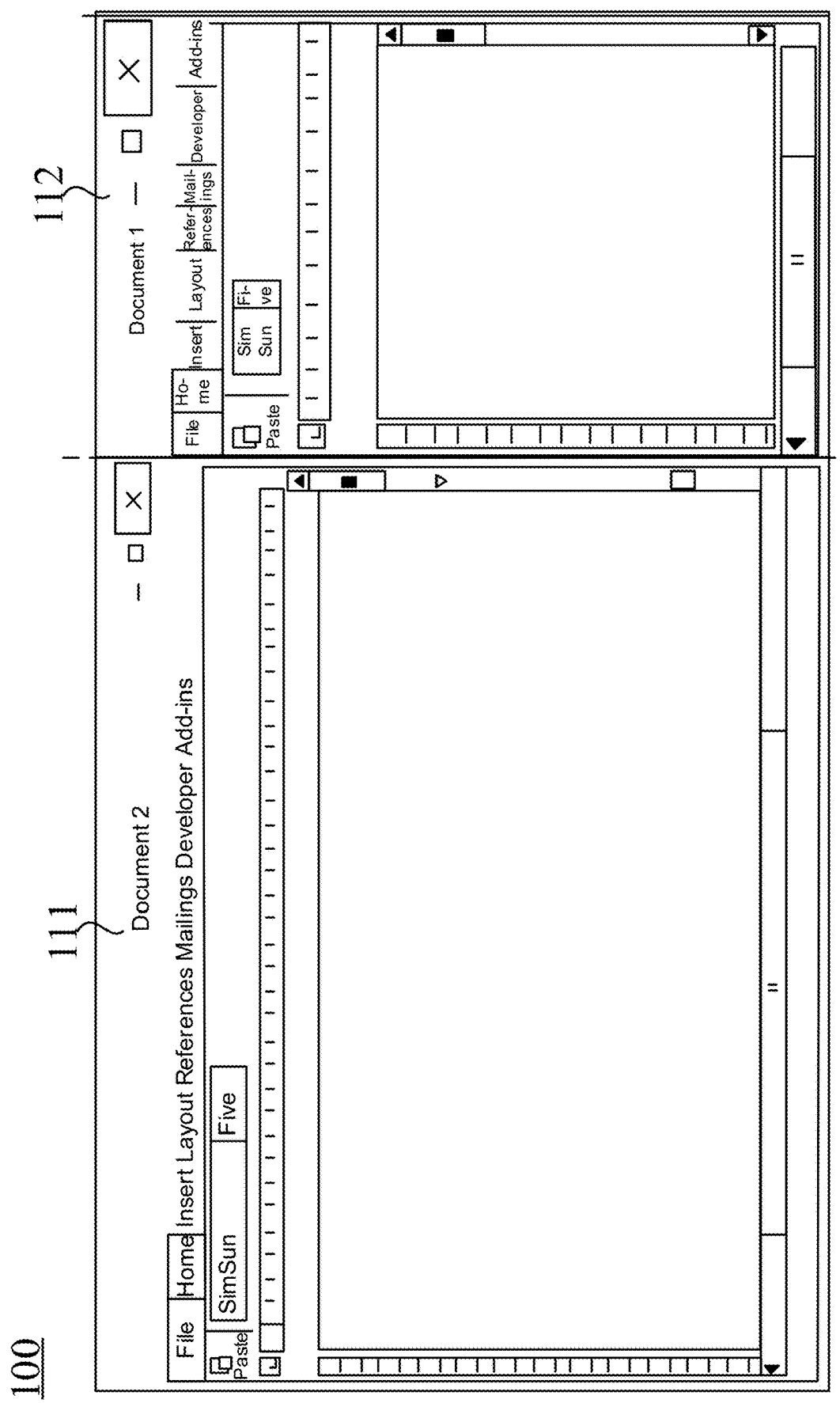
FIG. 8C is an interface diagram of a scrollable display apparatus, in accordance with some embodiments.
Figure 8D:
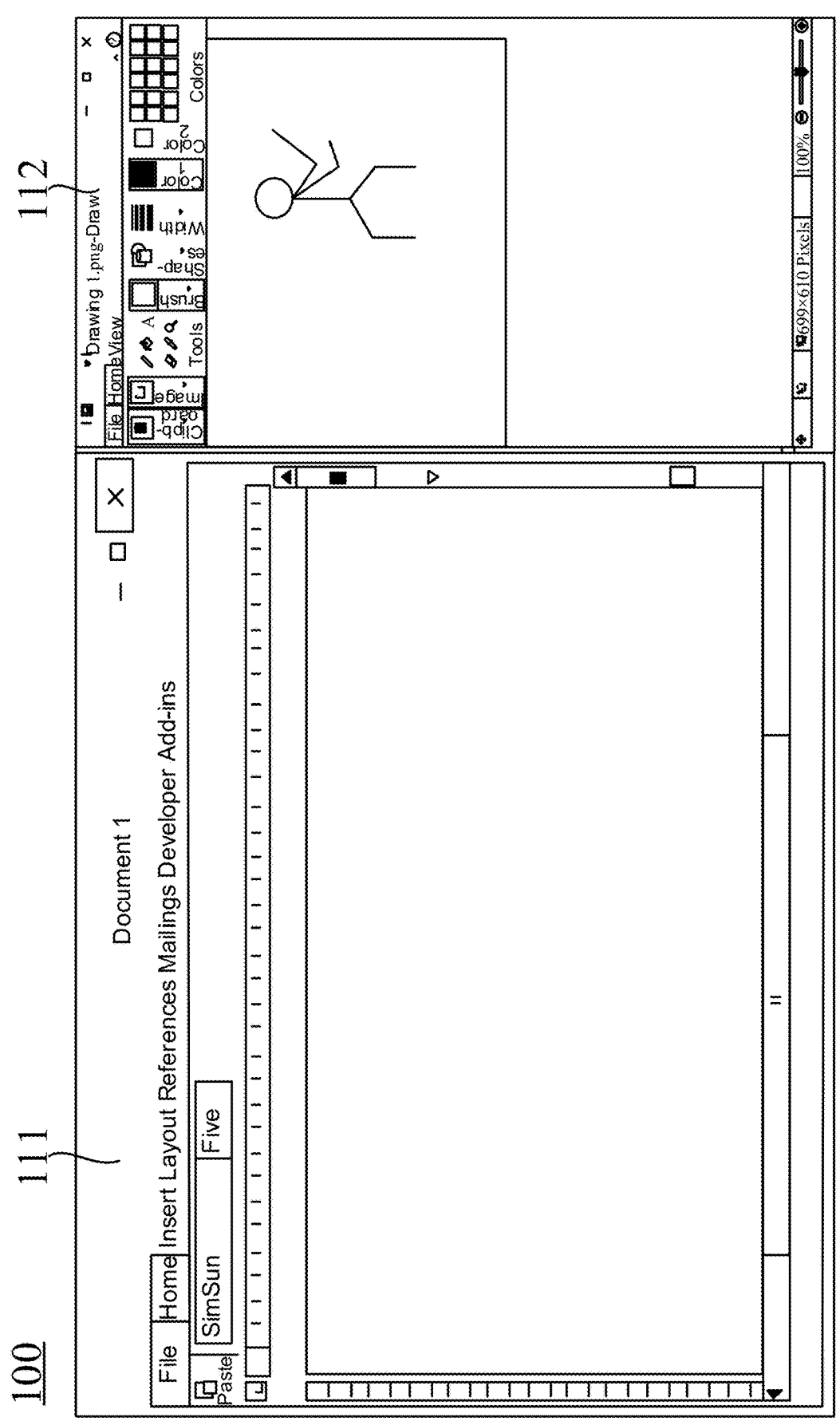
FIG. 8D is an interface diagram of a scrollable display apparatus, in accordance with some embodiments.

In some examples, the scrollable display apparatus 100 is provided with an input component. The input component is coupled to the first processor 140, and the input component may transmit the control instruction causing the scrollable display part 112 to be unfolded to the designated target state to the first processor 140. After receiving the control instruction causing the scrollable display part 112 to be unfolded to the designated target state, the first processor 140 controls the scrollable display part 112 to start to be unfolded, and controls the scrollable display part 112 to be unfolded to the designated target state. For example, the input component may be a button, a key, or the like provided on a first housing component 150. In addition, the input component may also be a virtual key displayed on the fixed display part 111. In some embodiments, referring to FIG. 7A and FIG. 7B, the plurality of extension selection messages include a first selection message A10 and a second selection message A20. The first processor 140 is configured to: in response to a control instruction corresponding to the first selection message A10, control the scrollable display part 112 and the fixed display part 111 to display a current interface of the fixed display part 111 together, as shown in FIG. 7C; or in response to a control instruction corresponding to the second selection message A20, control the scrollable display part 112 to display a display image different from the current interface of the fixed display part 111, as shown in FIG. 8B to FIG. 8D.

In some examples, the scrollable display apparatus 100 may be a monitor of a desktop computer, a tablet computer, a mobile phone, an all-in-one machine, or the like. Hereinafter, considering example in which the scrollable display apparatus 100 is an all-in-one machine, the plurality of extension selection messages, and designated target states corresponding different extension selection messages selected by the user will be illustratively described.

For example, in a case that the scrollable display part 112 is in the folded state, a text editing interface is currently on the fixed display part 111. In this case, an interface of the fixed display part 111 is shown in FIG. 7A.

In this case, the scrollable display part 112 starts to be unfolded, and the first processor 140 controls the interface of the fixed display part 111 to display the first selection message A10 and the second selection message A20. In this case, the interface of the fixed display part 111 is shown in FIG. 7B.

For example, in a case that the user selects the first selection message A10, in response to the control instruction corresponding to the first selection message A10, the first processor 140 controls the scrollable display part 112 and the fixed display part 111 to display the current interface of the fixed display part 111 together. The current interface of the fixed display part 111 is enlarged, which is convenient for the user to view and operate. In addition, the first processor 140 may further control the scrollable display part 112 to be unfolded to a first target state, and in the case that the user selects the first selection message A10, the first target state is the designated target state. In the example, the current interface of the fixed display part 111 is the text editing interface. In this case, the scrollable display part 112 and the fixed display part 111 display the text editing interface together. In this case, an interface of the scrollable display apparatus 100 is shown in FIG. 7C. The first target state is the partially unfolded state or the fully unfolded state.

For example, in a case that the user selects the second selection message A20, in response to the control instruction corresponding to the second selection message A20, the first processor 140 controls the scrollable display part 112 to display the display image different from the current interface of the fixed display part 111. In the example, the current interface of the fixed display part 111 is the text editing interface. In this case, the first processor 140 controls the scrollable display part 112 to display interfaces other than the text editing interface, such as desktop information of the fixed display part 111, interface information on a previous layer-level of the text editing interface, interface information on a next layer-level of the text editing interface, and interface information of any application program other than a text editing application program from all opened application programs on the scrollable display apparatus 100.

In some embodiments, the second selection message A20 includes any one or more of a first selection sub-message A21, a second selection sub-message A22, a third selection sub-message A23 and a fourth selection sub-message A24.

Hereinafter, again considering the example in which the scrollable display apparatus 100 is the all-in-one machine, the first selection sub-message A21, the second selection sub-message A22, the third selection sub-message A23 and the fourth selection sub-message A24 will be illustratively described.

For example, the current interface of the fixed display part 111 is a certain text editing interface. The scrollable display part 112 starts to be unfolded, and the first processor 140 controls the interface of the fixed display part 111 to display the first selection message A10, the first selection sub-message A21, the second selection sub-message A22, the third selection sub-message A23 and the fourth selection sub-message A24. In this case, the interface of the scrollable display apparatus 100 is shown in FIG. 7B.

In some embodiments, the first processor 140 is configured to: in response to a control instruction corresponding to the first selection sub-message A21, control the scrollable display part 112 to display desktop information of the fixed display part 111; or in response to a control instruction corresponding to the second selection sub-message A22, control the scrollable display part 112 to display interface information on a next layer-level of the current interface of the fixed display part 111; or in response to a control instruction corresponding to the third selection sub-message A23, control the scrollable display part 112 to display interface information on a previous layer-level of the current interface of the fixed display part 111; or in response to a control instruction corresponding to the fourth selection sub-message A24, control the scrollable display part 112 to display interface information of any application program other than a current application program from all opened application programs.

The case that the user selects the first selection message A10 has been described above, and will not be repeated here.

For example, in a case that the user selects the first selection sub-message A21, the first processor 140 controls the scrollable display part 112 to be unfolded to a second target state, where the second target state is the partially unfolded state or the fully unfolded state. In this case, the second target state is the designated target state. The first processor 140 controls the scrollable display part 112 to display the desktop information of the fixed display part 111. In this case, the interface information of the scrollable display apparatus 100 is shown in FIG. 8A. In this case, the user may open his (or her) desired application program in the desktop information displayed on the scrollable display part 112, such as a chat application program, a browser, a photo viewing program, and the like.

In a case that the user selects the second selection sub-message A22, the first processor 140 controls the scrollable display part 112 to be unfolded to a third target state, where the third target state is the partially unfolded state or the fully unfolded state. In this case, the first processor 140 controls the scrollable display part 112 to display the interface information on the next layer-level of the fixed display part 111. In this case, the interface of the scrollable display apparatus 100 is shown in FIG. 8B.

In a case that the user selects the third selection sub-message A23, the first processor 140 controls the scrollable display part 112 to be unfolded to a fourth target state, where the fourth target state is the partially unfolded state or the fully unfolded state. In this case, the first processor 140 controls the scrollable display part 112 to display the interface information on the previous layer-level of the fixed display part 111. In this case, the interface of the scrollable display apparatus 100 is shown in FIG. 8C.

For example, three documents are currently opened in the text editing application program. The three documents are Document 1, Document 2 and Document 3, respectively, where Document 1 is in a previous layer-level of Document 2, and Document 3 is in a next layer-level of Document 2. Document 2 is the current interface information of the fixed display part 111. If the user selects the second selection sub-message A22, the first processor 140 may control the scrollable display part 112 to display Document 3, and the interface of the scrollable display apparatus 100 is shown in FIG. 8B. If the user selects the third selection sub-message A23, the first processor 140 may control the scrollable display part 112 to display Document 1, and the interface of the scrollable display apparatus 100 is shown in FIG. 8C. To sum up, by displaying the extension display information on the scrollable display part 112, more files may be displayed on the interface, which is convenient for the user to check the information in a plurality of files.

In a case that the user selects the fourth selection sub-message A24, the first processor 140 controls the scrollable display part 112 to be unfolded to a fifth target state, where the fifth target state is the partially unfolded state or the fully unfolded state. In this case, the first processor 140 controls the scrollable display part 112 to display the interface information of any application program other than the current application program from all opened application programs on the fixed display part 111. In some of the examples, the current application program is the text editing program. In addition to the text editing program, a plurality of application programs such as a chat program, a photo editing program, and a browser are opened on the scrollable display apparatus 100. The user may open any one of the programs according to his (or her) own needs. For example, the user selects the photo editing program, in this case, the interface information of the scrollable display apparatus 100 is shown in FIG. 8D.

In some examples, if the user selects the fourth selection sub-message A24, the fourth selection sub-message A24 may be clicked, and then the first processor 140 may control the fixed display part 111 to display interface information of one or more application programs other than the current application program from all opened application programs, for the user to select information. For example, the current application program is the text editing program, and after the user clicks on the fourth selection sub-message A24, the first processor 140 controls the fixed display part 111 to display icons of application programs such as the chat program, the photo editing program, and the browser, for the user to select a program.

To sum up, if the user selects any one from the first selection sub-message A21 to the fourth selection sub-message A24, display information different from that of the current interface of the fixed display part 111 may be displayed on the scrollable display part 112, and the user may simultaneously browse a plurality of pages, which is convenient for the user to operate.

In some examples, the first processor 140 may control the fixed display part 111 to display the first selection message A10 and any two or more of the first selection sub-message A21 to the fourth selection sub-message A24.

In some of the above-mentioned embodiments, the scrollable display part 112 displays display information of the scrollable display apparatus 100. In addition, the scrollable display apparatus 100 may also display interface information of an external display apparatus. In some embodiments, the scrollable display apparatus 100 further includes a communication interface. The communication interface is coupled to the first processor 140, and configured to be coupled to the external display apparatus. The second selection message A20 includes a fifth selection sub-message A25. The first processor 140 is configured to, in response to a control instruction corresponding to the fifth selection sub-message A25, control the scrollable display part 112 to display a current interface information of the external display apparatus.

In some examples, the communication interface may be a communication port, and a data cable may be plugged into the communication port, so that the external display apparatus and the scrollable display apparatus 100 may be communicatively connected. For example, the communication port may be a Type-A port, a Type-B port, a Type-C port, or the like, which are not listed one by one here.

In some other examples, the communication interface may be a Bluetooth communication interface, a Wi-Fi communication interface, or the like, which are not listed one by one here.

In some examples, the external display apparatus may be a display apparatus with a display function such as a mobile phone, a tablet computer, or an all-in-one machine, which are not listed one by one here.

Hereinafter, again considering example in which the scrollable display apparatus 100 is the all-in-one machine and the current interface of the fixed display part 111 is a certain text editing interface, the fifth selection sub-message A25 will be described.

Figure 9A:
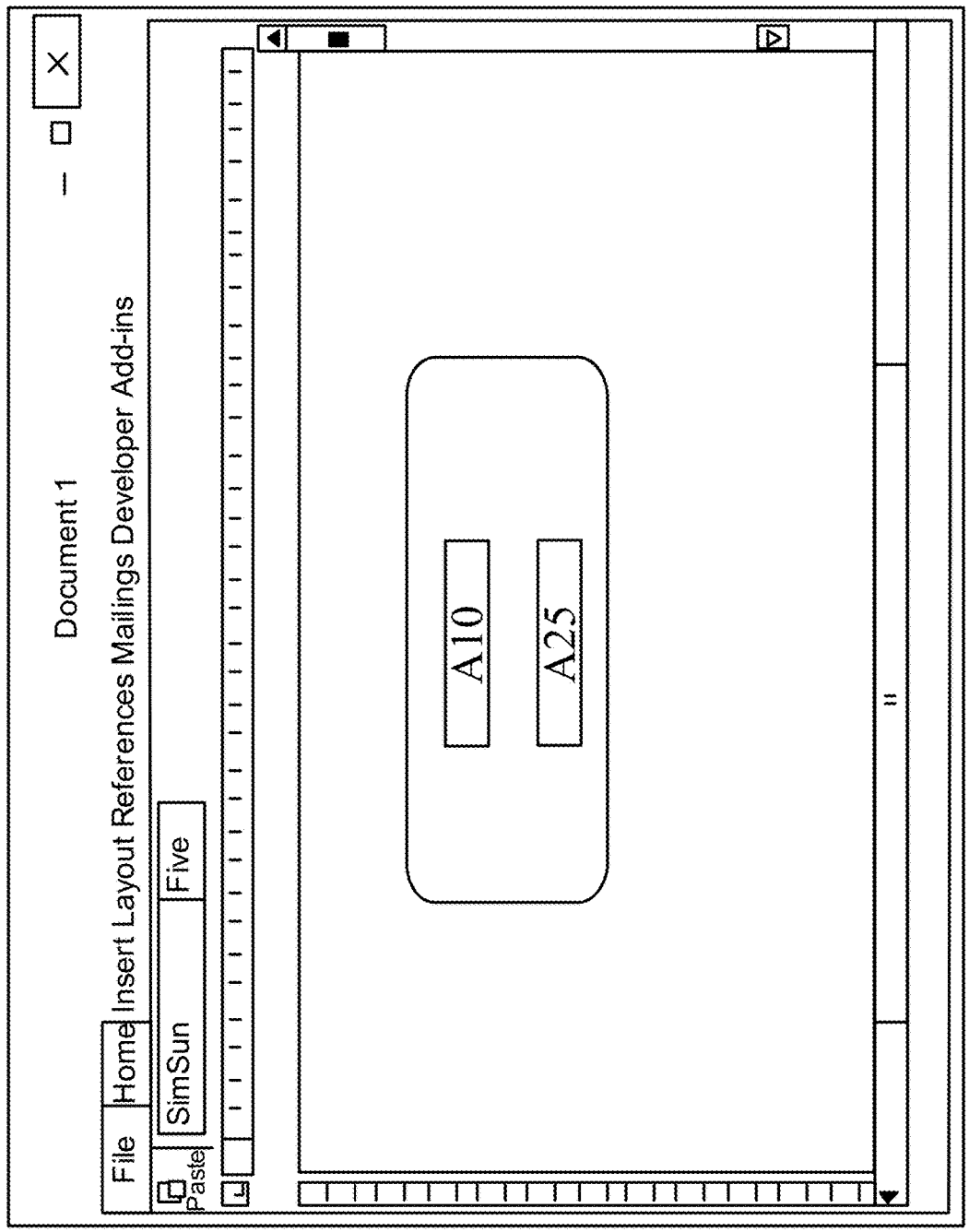
FIG. 9A is an interface diagram of a scrollable display apparatus, in accordance with some embodiments.

For example, referring to FIG. 9A, in a case that the scrollable display part 112 is in the start-unfolded state, the first processor 140 controls the fixed display part 111 to display the first selection message A10 and the fifth selection sub-message A25.

In a case that the user selects the fifth selection sub-message A25, the first processor 140 controls the scrollable display part 112 to be unfolded to a sixth target state, where, the sixth target state is the partially unfolded state or the fully unfolded state. In this case, the first processor 140 controls the scrollable display part 112 to display the current interface information of the external display apparatus.

Figure 9B:
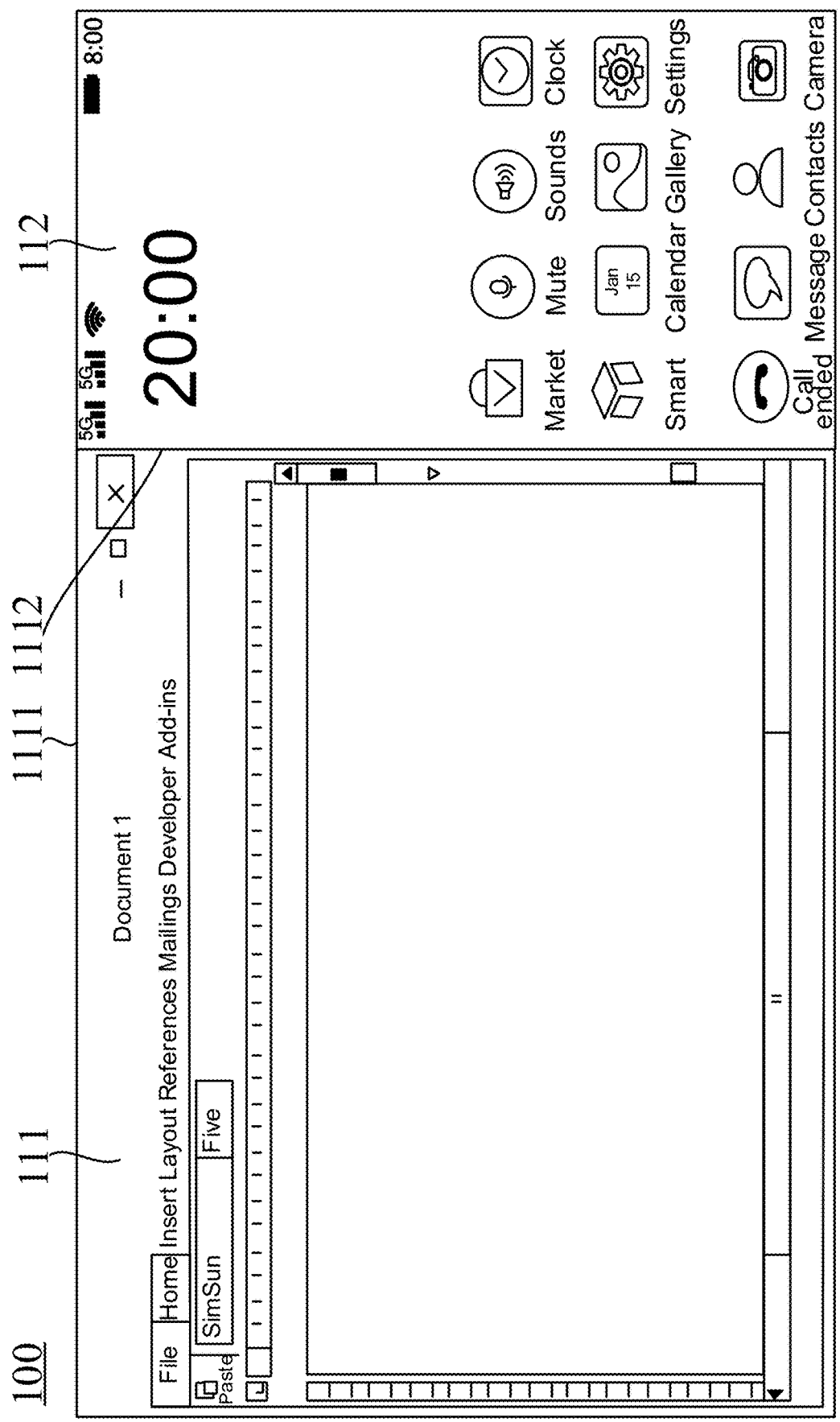
FIG. 9B is an interface diagram of a scrollable display apparatus, in accordance with some embodiments.

For example, the external display apparatus is a mobile phone, and the current interface information of the mobile phone is desktop information. The first processor 140 controls the scrollable display part 112 to display the desktop information of the mobile phone. In this case, the interface information of the scrollable display apparatus 100 is shown in FIG. 9B. In this way, it enables the user to operate the interface of the fixed display part 111 while browsing other interfaces without changing the apparatus, greatly improving the convenience of the user's work.

It will be noted here that, in some other implementations, the first processor 140 may control the fixed display part 111 to display the first selection message A10 and any one or more of the first selection sub-message A21 to the fifth selection sub-message A25, there are many implementable embodiments in these implementations, which are not listed one by one here.

In the above embodiments, the extension selection message and the unfolded state of the scrollable display part 112 are described, and the first detection component 130 will be described below.

Figure 10A:
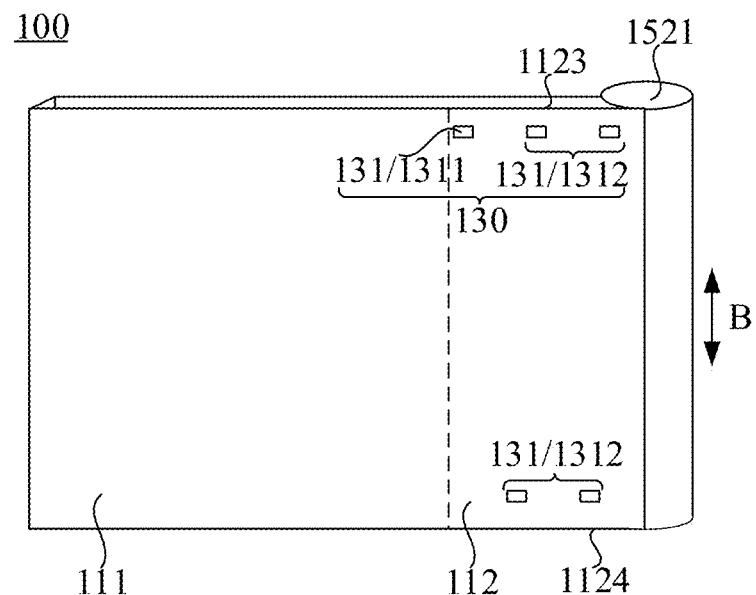
FIG. 10A is a structural diagram of a scrollable display apparatus, in accordance with some embodiments.

In some embodiments, referring to FIG. 10A, the first detection component 130 includes at least two photosensitive elements 131 that are disposed on the scrollable display part 112 and coupled to the first processor 140, any photosensitive element 131 is configured to detect intensity of external ambient light. The photosensitive element 131 may transmit information of the detected intensity of external ambient light to the first processor 140.

The at least two photosensitive elements 131 include a first photosensitive element 1311 and at least one second photosensitive element 1312. The first processor 140 is configured to: if an intensity of external ambient light detected by the first photosensitive element 1311 is within a first preset intensity range, and an intensity of external ambient light detected by all second photosensitive elements 1312 is within a second preset intensity range, determine that the scrollable display part 112 is in the start-unfolded state, where any light intensity value in the first preset intensity range is greater than any light intensity value in the second preset intensity range; and if the intensity of the external ambient light detected by the first photosensitive element 1311 is within the first preset intensity range, and an intensity of the external ambient light detected by a designated number of second photosensitive elements 1312 is within the second preset intensity range, determine that the scrollable display part 112 is in the designated target state.

In some examples, referring to FIG. 10A, among all the photosensitive elements 131, a distance between the first photosensitive element 1311 and the fixed display part 111 is the shortest.

In a case that the scrollable display part 112 is in the folded state, all the photosensitive elements 131 are hidden in the scrollable display apparatus 100, and in this case, the intensity of external ambient light detected by all the photosensitive elements 131 is within the first preset intensity range. As the scrollable display part 112 is unfolded, a plurality of photosensitive elements 131 are exposed one by one. The intensity of external ambient light detected by photosensitive elements 131 exposed outside is greater than the intensity of external ambient light detected by photosensitive element(s) 131 hidden in the scrollable display apparatus 100.

Figure 10B:
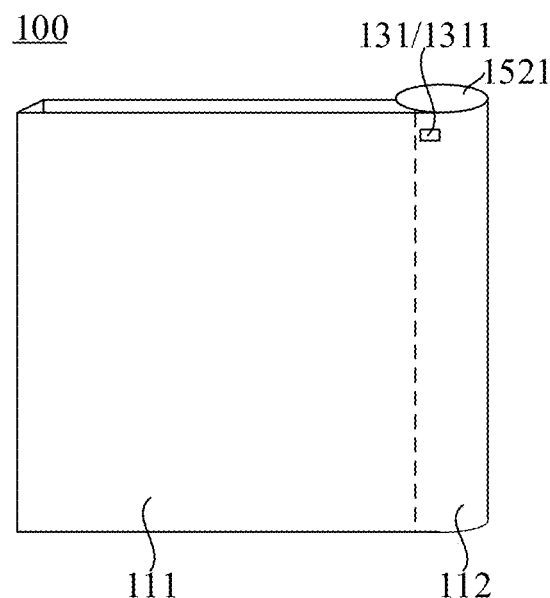
FIG. 10B is a structural diagram of a scrollable display apparatus, in accordance with some embodiments.

Referring to FIG. 10B, in a case that the scrollable display part 112 is in the start-unfolded state, only the first photosensitive element 1311 is exposed, and all the second photosensitive elements 1312 are hidden in the scrollable display apparatus 100. In this case, the intensity of external ambient light detected by the first photosensitive element 1311 is within the first preset intensity range and greater than the intensity of external ambient light detected by any second photosensitive element 1312, and the intensity of external ambient light detected by all the second photosensitive elements 1312 is within the second preset intensity range.

In a case that the scrollable display part 112 is in the designated target state, in addition to the first photosensitive element 1311, there are also a specific number of second photosensitive elements 1312 are exposed. Therefore, the first photosensitive element 1311 and the specific number of second photosensitive elements 1312 are in a same environment, and in this case, the intensities of external ambient light detected by the first photosensitive element 1311 and external ambient light detected by the specific number of second photosensitive elements 1312 are all in the first preset intensity range. The designated number of second photosensitive elements 1312 are still hidden in the scrollable display apparatus 100. Therefore, the intensity of external ambient light detected by the designated number of second photosensitive elements 1312 is within the second preset intensity range. A sum of the specific number and the designated number is a number of all the second photosensitive elements 1312.

In a case that a value of the designated number is zero, it means that all the second photosensitive elements 1312 are exposed. In this case, the intensity of external ambient light detected by all the second photosensitive elements 1312 is within the first preset intensity range. In this case, the scrollable display part 112 is in the fully unfolded state. In a case that the designated number is the number of all the second photosensitive elements 1312, all the second photosensitive elements 1312 are hidden in the scrollable display apparatus 100. In this case, the scrollable display part 112 is in the folded state or the start-unfolded state. In a case that the designated number is greater than zero and less than the number of all the second photosensitive elements 1312, the scrollable display part 112 is in the partially unfolded state.

For example, referring to FIG. 10A, the first photosensitive element 1311 and four second photosensitive elements 1312 are disposed on the scrollable display part 112. FIG. 10A illustrates a structural diagram of the scrollable display part 112 in the fully unfolded state. In this case, the first photosensitive element 1311 and the four second photosensitive elements 1312 are all exposed. Based on this example, the target state of the scrollable display part 112 will be illustratively described below.

Figure 10C:
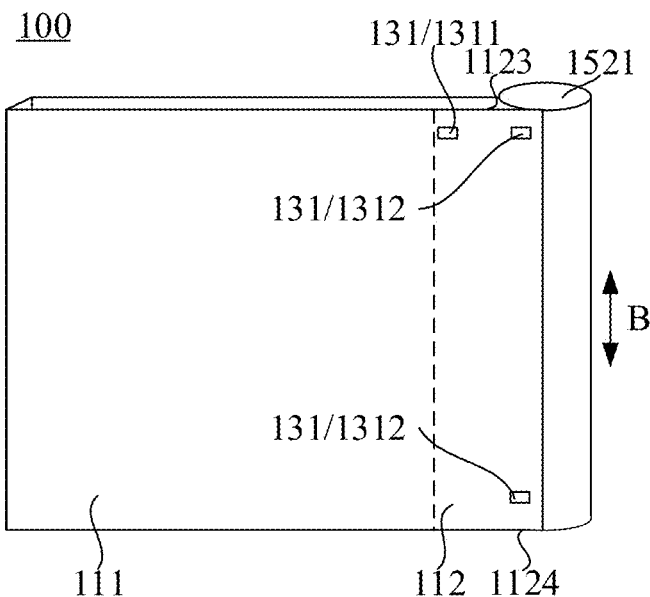
FIG. 10C is a structural diagram of a scrollable display apparatus, in accordance with some embodiments.

In the start-unfolded state, as the scrollable display part 112 is gradually unfolded, the second photosensitive elements 1312 are exposed one by one, and finally the scrollable display part 112 is unfolded to a certain target state. For example, referring to FIG. 10C, in this target state, in addition to the first photosensitive element 1311 being exposed, there are two second photosensitive elements 1312 exposed, and the remaining two second photosensitive elements 1312 are hidden in the scrollable display apparatus 100. In this case, the intensity of external ambient light detected by the first photosensitive element 1311 and the two second photosensitive elements 1312 is within the first preset intensity range, while the intensity of external ambient light detected by the another two second photosensitive elements 1312 is within the second preset intensity range. If the above target state is the designated target state, then the designated number is two.

In some examples, referring to FIG. 10A, the scrollable display part 112 includes two opposite edges arranged in a setting direction B, where the direction indicated by the arrow B is the setting direction. In the fully unfolded state, the setting direction B is perpendicular to a direction from the fixed display part 111 to the scrollable display part 112, and is in a plane where the fixed display part 111 is located.

In some examples, referring to FIG. 10A, the two opposite edges of the scrollable display part 112 arranged in the setting direction B are a first edge 1123 and a second edge 1124, respectively. Some of the photosensitive elements 131 are arranged along the first edge 1123, and the remaining photosensitive elements 131 are arranged along the second edge 1124. The photosensitive elements 131 arranged along the first edge 1123 and the photosensitive elements 131 arranged along the second edge 1124 are arranged in a staggered manner in the setting direction B. In this way, more photosensitive elements 131 may be arranged within a same distance, and the unfolded state may be more finely divided. Two different photosensitive elements 131 are not exposed at a same time.

Figure 10D:
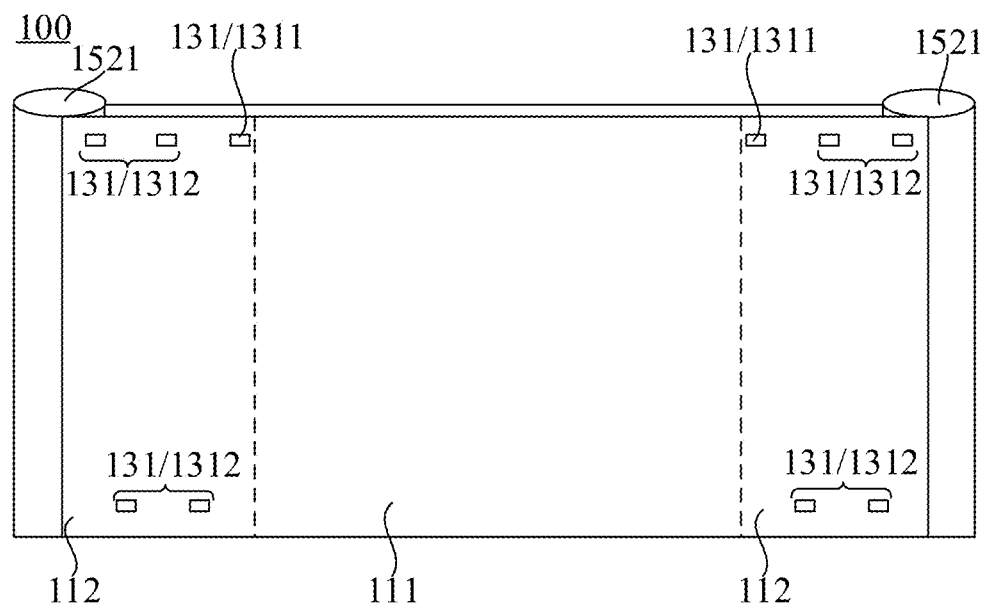
FIG. 10D is a structural diagram of a scrollable display apparatus, in accordance with some embodiments.
Figure 10E:
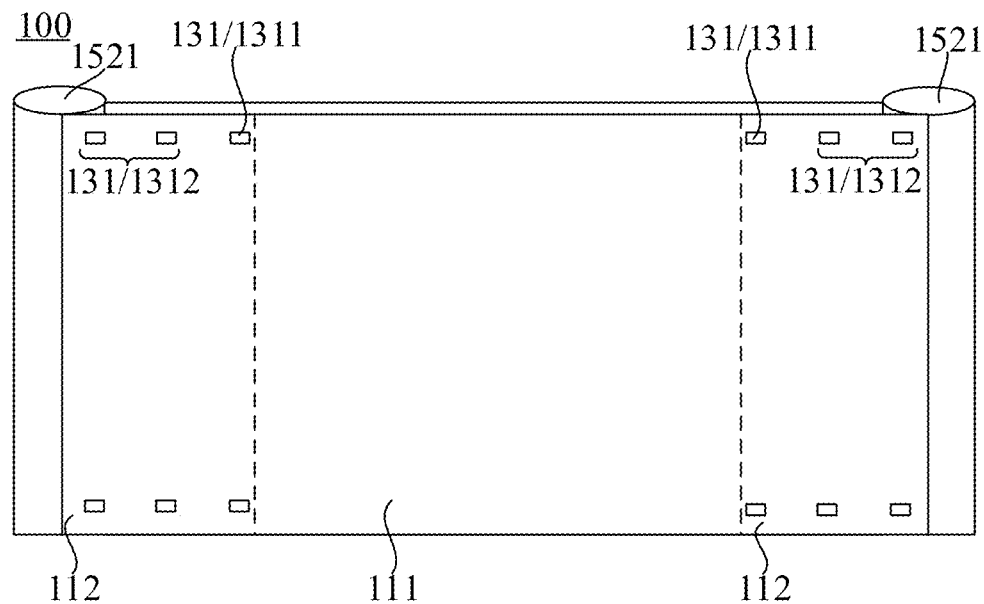
FIG. 10E is a structural diagram of a scrollable display apparatus, in accordance with some embodiments.
Figure 10F:
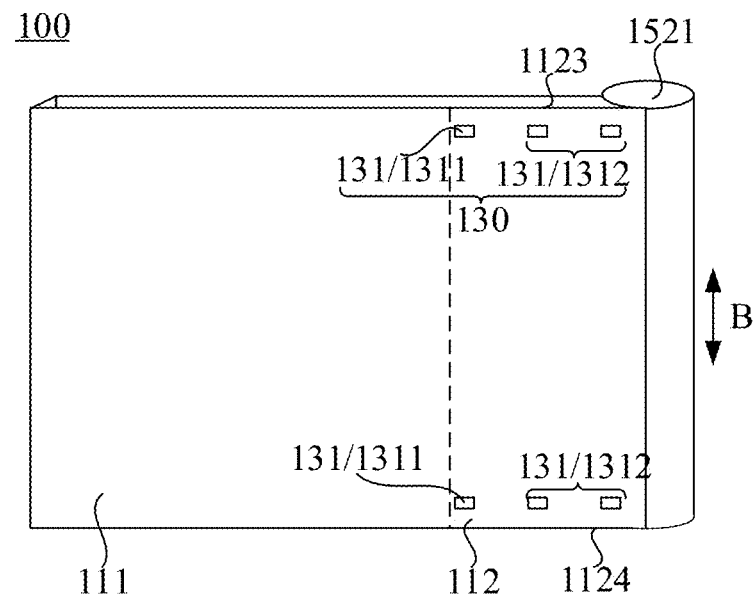
FIG. 10F is a structural diagram of a scrollable display apparatus, in accordance with some embodiments.

In some other examples, as shown in FIG. 10E and FIG. 10F, the photosensitive elements 131 arranged along the first edge 1123 and the photosensitive elements 131 arranged along the second edge 1124 may be symmetrically arranged. In this case, the plurality of photosensitive elements 131 may include two initial photosensitive elements (i.e., first photosensitive elements) 1311, and in a case that the scrollable display part 112 is unfolded to the designated target state, two target photosensitive elements (i.e., second photosensitive elements) 1312 may be simultaneously exposed.

Referring to FIG. 10D, in some examples, the scrollable display apparatus 100 includes two scrollable display parts 112, and the two scrollable display parts 112 are respectively arranged on two opposite sides of the fixed display part 111. The two scrollable display parts 112 may each be provided thereon a plurality of photosensitive elements 131. First photosensitive elements 1311 on the two scrollable display parts 112 are arranged symmetrically, and second photosensitive elements 1312 on the two scrollable display parts 112 are arranged symmetrically.

In some other examples, in a case that the scrollable display apparatus 100 includes the two scrollable display parts 112, all the photosensitive elements 131 may be disposed on only one scrollable display part 112.

In some examples, the photosensitive element 131 may be a photosensitive thin film transistor (TFT), and the photosensitive TFT may be integrated in the flexible display panel 110.

In some other examples, the photosensitive element 131 may be an element independent of the flexible display panel 110, which is disposed on a display surface of the flexible display panel 110.

In addition to the photosensitive element 131 mentioned above, the first detection component 130 may also have other implementations. In some embodiments, referring to FIG. 11A to FIG. 11D, the scrollable display apparatus 100 further includes a first housing component 150. The first housing component 150 includes a fixed member 151 and a sliding member 152 that are connected in a sliding manner, the fixed member 151 is connected to the fixed display part 111, and the sliding member 152 is connected to the scrollable display part 112. The first detection component 130 includes an induction member 132 and at least one detection member 133, the induction member 132 is disposed on the sliding member 152 or the scrollable display part 112, the at least one detection member 133 is disposed on the fixed member 151 and coupled to the first processor 140, and the at least one detection member 133 is configured to detect position information of the induction member 132 to obtain the position information of the scrollable display part 112.

The induction member 132 is disposed on the sliding member 152 or the scrollable display part 112, so a position of the induction member 132 may change as the scrollable display part 112 is unfolded or folded. The detection member 133 is disposed on the fixed member 151, so a position of the fixed member 151 will not change as the scrollable display part 112 is unfolded. In this way, the detection member 133 may obtain the position information of the scrollable display part 112 by detecting the position information of the induction member 132.

In some embodiments, referring to FIG. 11A to FIG. 11D, the scrollable display part 112 has a display portion 1121 and a connecting portion 1122, the display portion 1121 is adjacent to the fixed display part 111, and the connecting portion 1122 is located on a side of the display portion 1121 away from the fixed display part 111. The induction member 132 is located on the connecting portion 1122.

In some examples, the connecting portion 1122 may be parallel to the fixed display part 111.

In some examples, the display portion 1121 is used for displaying images, while the connecting portion 1122 has no display function.

In some examples, the induction member 132 is disposed on the connecting portion 1122, thereby preventing the induction member 132 from affecting the display of the fixed display part 111. In addition, the connecting portion 1122 is not used for displaying images, so the connecting portion 1122 may provide a large arrangement space for the induction member 132.

Figure 11A:
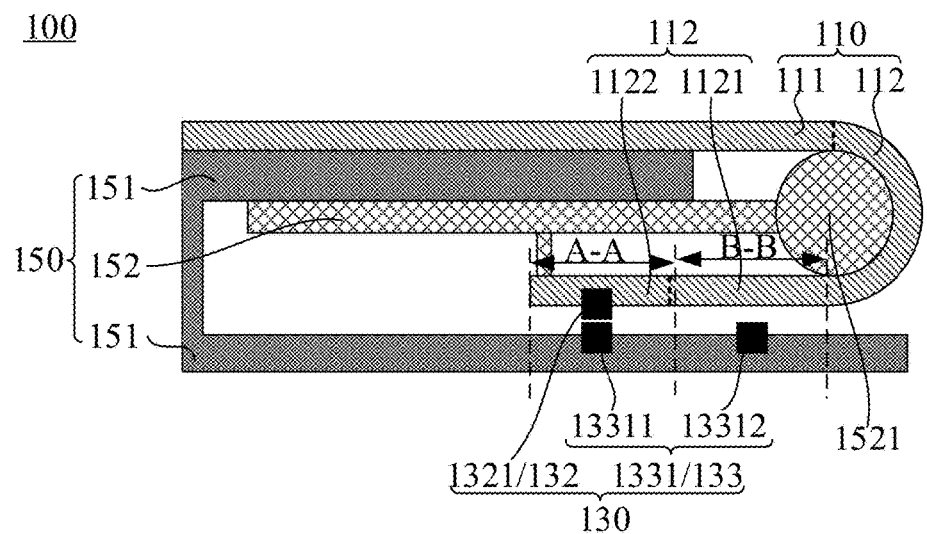
FIG. 11A is a structural diagram of a scrollable display apparatus, in accordance with some embodiments.
Figure 11B:
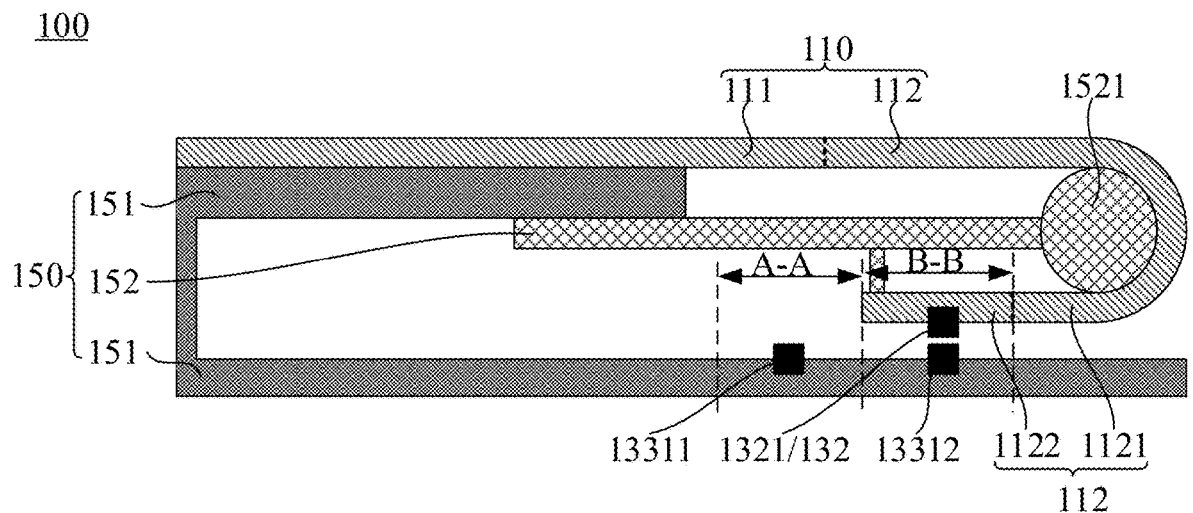
FIG. 11B is a structural diagram of a scrollable display apparatus, in accordance with some embodiments.

In some embodiments, referring to FIG. 11A and FIG. 11B, the induction member 132 includes a magnetic element 1321; and the detection member 133 includes magnetic detection elements 1331, and a number of the magnetic detection elements 1331 is at least two, where at least two of the magnetic detection elements 1331 include an initial magnetic detection element 13311 and at least one target magnetic detection element 13312. The first processor 140 is configured to: if the magnetic element 1321 is out of a detection range of the initial magnetic detection element 13311 and does not enter a detection range of any target magnetic detection element 13312, determine that the scrollable display part 112 is in the start-unfolded state; and if the magnetic element 1321 is located within a detection range of a designated target magnetic detection element, determine that the scrollable display part 112 is in the designated target state, where the designated target magnetic detection element is one of the at least one target magnetic detection element 13312.

In some examples, there are a plurality of target magnetic detection elements 13312, and the plurality of target magnetic detection elements 13312 have a one-to-one correspondence with the plurality of target states of the scrollable display part 112.

In some examples, the magnetic element 1321 is disposed on the sliding member 152 or the scrollable display part 112. Therefore, as the scrollable display part 112 is unfolded, the magnetic element 1321 will move along with the scrollable display part 112. As a position of the magnetic element 1321 changes, different magnetic detection elements 1331 may detect the magnetic element 1321, and then the first processor 140 may determine whether the scrollable display part 112 is in a state corresponding to a magnetic detection element 1331 according to whether the magnetic detection element 1331 detects the magnetic element 1321. The state mentioned here includes one of the start-unfolded state and at least one target state.

In some examples, referring to FIG. 11A, in the folded state, the magnetic element 1321 is located within the detection range A-A of the initial magnetic detection element 13311. In this case, the initial magnetic detection element 13311 may detect the magnetic element 1321, and all the target magnetic detection elements 13312 cannot sense the magnetic element 1321.

As the scrollable display part 112 is unfolded, in a case that the magnetic element 1321 is out of the detection range of the initial magnetic detection element 13311 and does not enter a detection range of any target magnetic detection element 13312, the scrollable display part 112 is in the start-unfolded state.

As the scrollable display part 112 is further folded, referring to FIG. 11B, in a case that the magnetic element 1321 is located within the detection range B-B of any target magnetic detection element 13312, it means that the scrollable display part 112 is in the target state. Any target state may be used as the designated target state, and any target magnetic detection element 13312 may be used as the designated target magnetic detection element.

The magnetic element 1321 is magnetic, and in some examples, the magnetic element 1321 may be a magnet, and the magnetic detection element 1331 may be a Hall switch. If the magnetic element 1321 is within a detection range of the Hall switch, the Hall switch will be closed. If the magnetic element 1321 is out of the detection range of the Hall switch, the Hall switch will be opened. Therefore, the first processor 140 may determine the current state of the scrollable display part 112 according to the closed and opened states of a plurality of Hall switches.

In a case that the magnetic detection elements 1331 are Hall switches, in the folded state, the initial magnetic detection element 13311 is closed, and all the target magnetic detection elements 13312 are opened. In the designated target state, only the designated target magnetic detection element 13312 is closed, while the remaining target magnetic elements 13312 and the initial magnetic detection element 13311 are opened.

In some examples, the first processor 140 may be configured to, in response to that the magnetic element 1321 moves out of the detection range of the initial magnetic detection element 13311 within a preset time, determine the scrollable display part 112 is in an initial unfolded state.

Figure 11C:
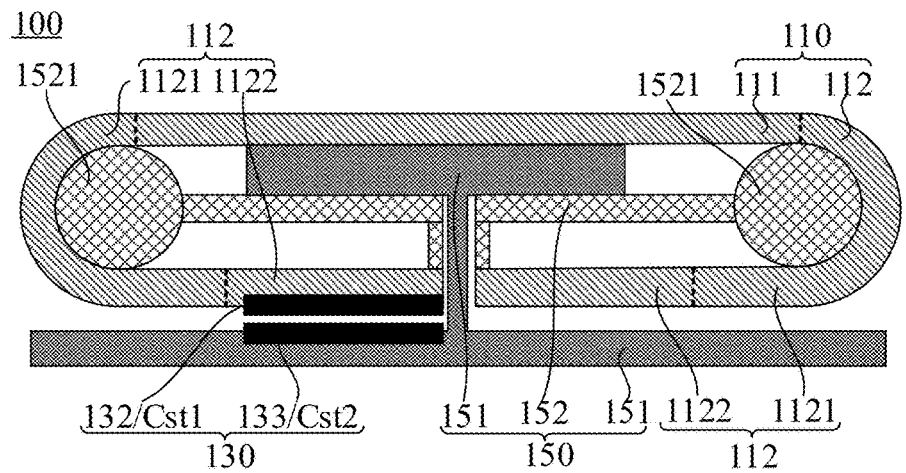
FIG. 11C is a structural diagram of a scrollable display apparatus, in accordance with some embodiments.
Figure 11D:
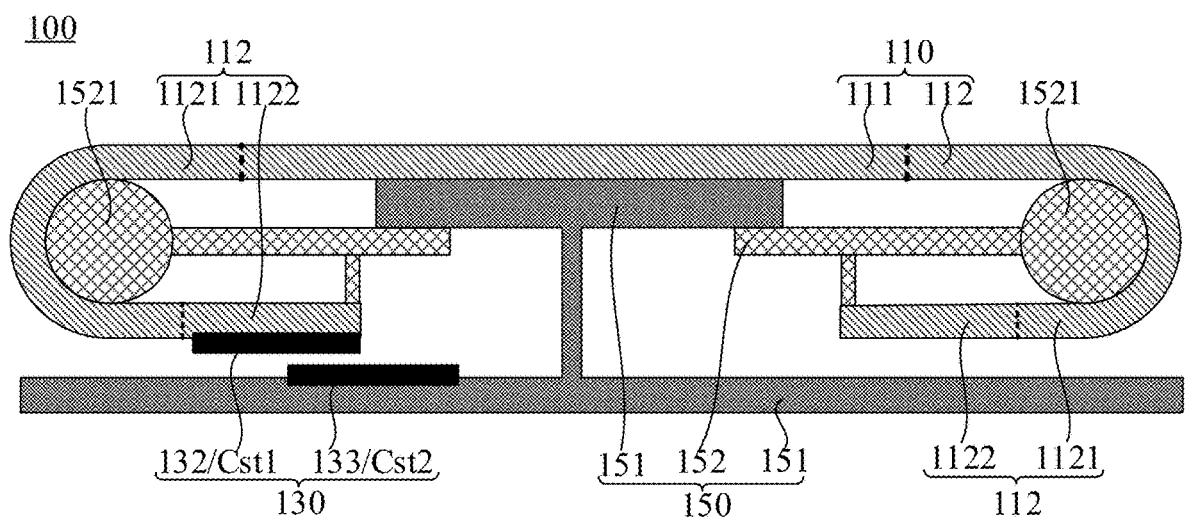
FIG. 11D is a structural diagram of a scrollable display apparatus, in accordance with some embodiments.

In some embodiments, referring to FIG. 11C and FIG. 11D, the induction member 132 includes a first electrode plate Cst1, the detection member 132 includes a second electrode plate Cst2, and the second electrode plate Cst2 and the first electrode plate Cst1 form a capacitor. The first electrode plate Cst1 and the second electrode plate Cst2 are both coupled to the first processor 140. The first processor 140 is configured to: if a capacitance value of the capacitor is within a first capacitance threshold range, determine that the scrollable display part 112 is in the start-unfolded state; and if the capacitance value of the capacitor is within a second capacitance threshold range, determine that the scrollable display part 112 is in the designated target state.

In some examples, the first electrode plate Cst1 is disposed on the scrollable display part 112 or the sliding member 152. Therefore, a position of the first electrode plate Cst1 may change as the scrollable display part 112 is unfolded.

In some examples, the first electrode plate Cst1 and the second electrode plate Cst2 may form the capacitor, and the capacitance value of the capacitor depends on a facing area of the first electrode plate Cst1 and the second electrode plate Cst2. As the first electrode plate Cst1 moves, the facing area of the first electrode plate Cst1 and the second electrode plate Cst2 changes, and then the capacitance value of the capacitor changes. Therefore, the first processor 140 may determine the state of the scrollable display part 112 according to the capacitance value of the capacitor. It will be noted here that the facing area of the first electrode plate Cst1 and the second electrode plate Cst2 is an area of an overlapping portion of an orthographic projection of the first electrode plate Cst1 on a first plane and an orthographic projection of the second electrode plate Cst2 on the first plane, where the first plane is parallel to the first electrode plate Cst1 and/or the second electrode plate Cst2.

In some examples, the scrollable display part 112 has a plurality of target states. In this case, the plurality of target states correspond to a plurality of different second capacitance threshold ranges, and there is no intersection among the plurality of second capacitance threshold ranges.

In some examples, referring to FIG. 11C, in the folded state, the first electrode plate Cst1 and the second electrode plate Cst2 completely overlap, and the facing area is the largest. In this case, the capacitance value of the capacitor is the largest, and the capacitance value is with the first capacitance threshold within range. As the scrollable display part 112 is unfolded, referring to FIG. 11D, the facing area of the first electrode plate Cst1 and the second electrode plate Cst2 gradually decreases, and the capacitance value of the capacitor gradually decreases. In a case that the capacitance value of the capacitor is within the second capacitance threshold range, it is determined that the scrollable display part 112 is in the designated target state. In this example, any capacitance value in the first capacitance threshold range is greater than any capacitance value in the second capacitance threshold range.

In some other examples, in the folded state, the facing area of the first electrode plate Cst1 and the second electrode plate Cst2 is the smallest. In this case, the capacitance value of the capacitor is the smallest, and the capacitance value is within the first capacitance threshold range. As the scrollable display part 112 is unfolded, the facing area of the first electrode plate Cst1 and the second electrode plate Cst2 gradually increases, and the capacitance value of the capacitor gradually increases. In a case that the capacitance value of the capacitor is within the second capacitance threshold range, it is determined that the scrollable display part 112 is in the designated target state. In this example, any capacitance value in the first capacitance threshold range is less than any capacitance value in the second capacitance threshold range.

Figure 12:
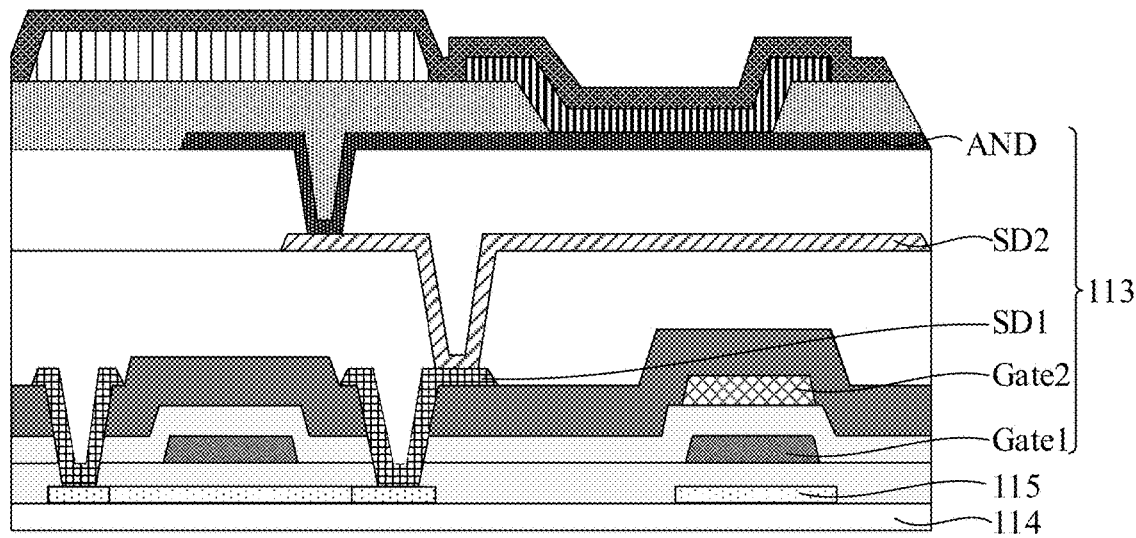
FIG. 12 is a structural diagram of a flexible display panel in a scrollable display apparatus, in accordance with some embodiments.
Figure 13A:
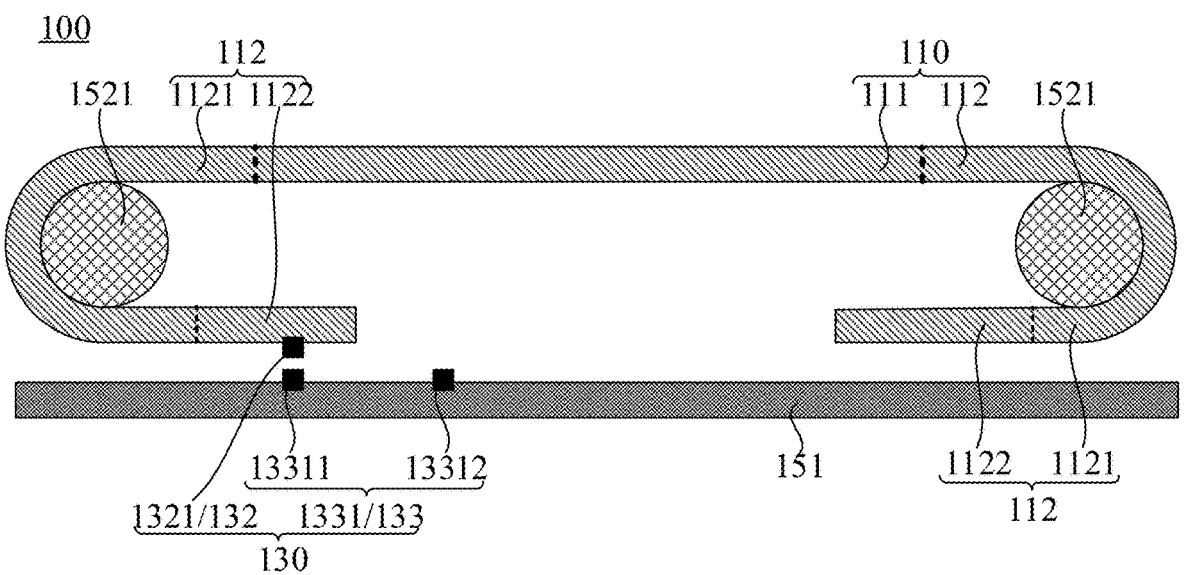
FIG. 13A is a structural diagram of a scrollable display apparatus, in accordance with some embodiments.
Figure 13B:
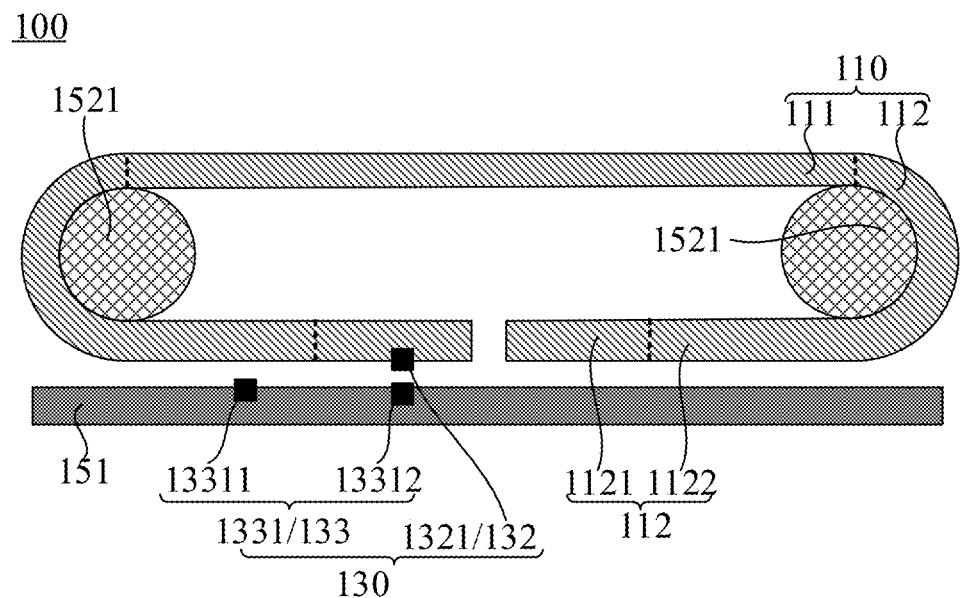
FIG. 13B is a structural diagram of a scrollable display apparatus, in accordance with some embodiments.

In some embodiments, referring to FIG. 12, the flexible display panel 110 includes a plurality of conductive layers 113, and the induction member 132 is located in at least one conductive layer 113.

In some examples, referring to FIG. 12, the flexible display panel 110 includes an active layer 115, at least one gate metal layer, and at least one source-drain metal layer, which are sequentially disposed on a substrate 114. The gate metal layer and the source-drain metal layer are both conductive layers 113.

In some examples, referring to FIG. 12, the at least one gate metal layer includes a first gate metal layer Gate1 and a second gate metal layer Gate2, and the at least one source-drain metal layer includes a first source-drain metal layer SD1 and a second source metal layer. The induction member 132 may be disposed in any one or more layers of the first gate metal layer Gate1, the second gate metal layer Gate2, the first source-drain metal layer SD1 and the second source-drain metal layer SD2.

In some examples, referring to FIG. 12, the flexible display panel 110 further includes an anode layer AND, which is also a conductive layer 113. In some examples, the induction member 132 may be disposed in the anode layer AND.

In some examples, referring to FIG. 11A to FIG. 11D, the sliding member 152 further includes at least one sliding shaft 1521, and a scrollable display part 112 is wound on a portion of an outer peripheral surface of a sliding shaft 1521.

In some examples, referring to FIG. 11A and FIG. 11B, there is one scrollable display part 112, and one sliding shaft 1521.

In some other embodiments, referring to FIG. 11C and FIG. 11D, there are two scrollable display parts 112, and the two scrollable display parts 112 are respectively disposed on two opposite sides of the fixed display part 111. The sliding member 152 further includes two sliding shafts 1521, and a scrollable display part 112 is wound on a portion of an outer peripheral surface of a sliding shaft 1521.

In some examples, the two sliding shafts 1521 have a same diameter.

In some examples, in a case that the number of the scrollable display parts 112 is two, referring to FIG. 11C, FIG. 11D, FIG. 13A and FIG. 13B, the first detection component 130 may only be disposed on one scrollable display part 112.

Figure 14A:
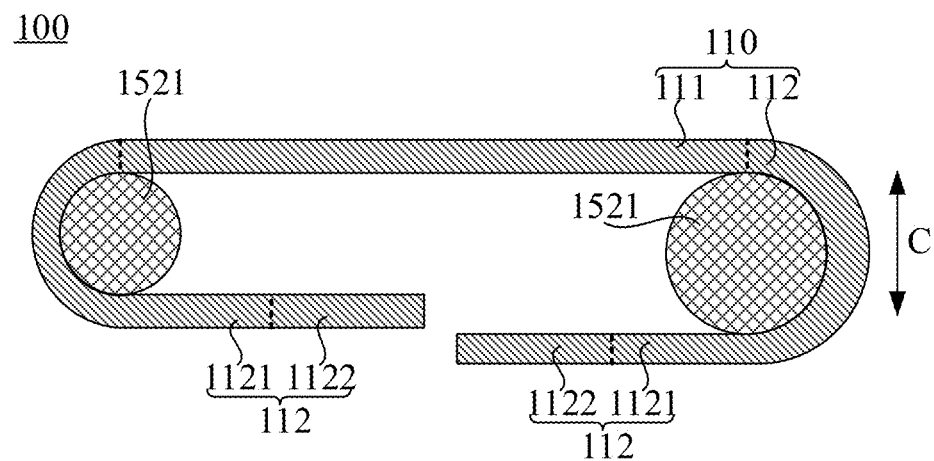
FIG. 14A is a structural diagram of a scrollable display apparatus, in accordance with some embodiments.
Figure 14B:
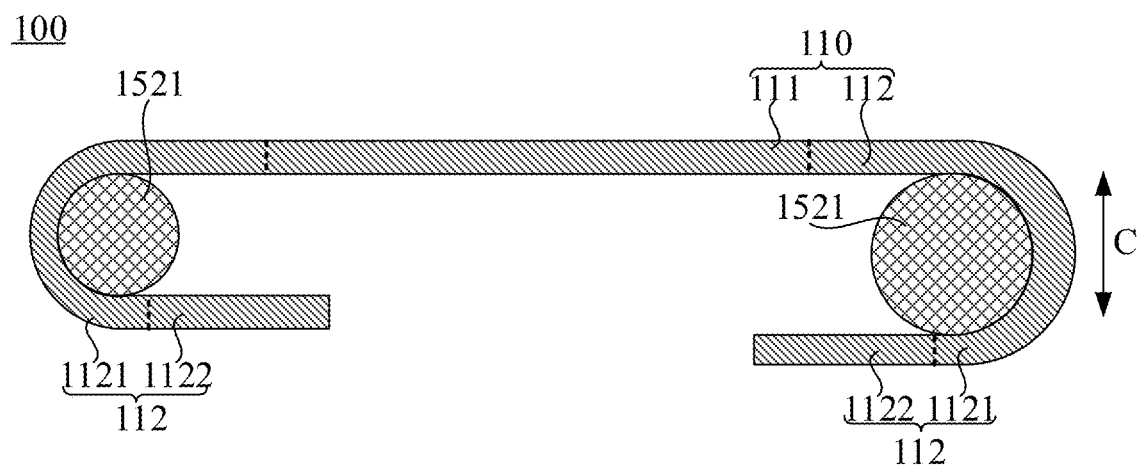
FIG. 14B is a structural diagram of a scrollable display apparatus, in accordance with some embodiments.

In some other embodiments, referring to FIG. 14A and FIG. 14B, diameters of the two sliding shafts 1521 in a first direction are not equal, where the first direction is perpendicular to a display surface of the fixed display part 111. For example, the direction indicated by the arrow C is the first direction.

In some examples, referring to FIG. 14A, in the folded state, two opposite ends of the fixed display part 111 are respectively tangent to the two sliding shafts 1521. Referring to FIG. 14A and FIG. 14B, in the folded state or any target state, connecting parts 1122 of the two scrollable display parts 112 are located on two different planes and arranged in parallel. In addition, the connecting portions 1122 are disposed in parallel with the fixed display part 111.

Since the diameters of the two sliding shafts 1521 in the first direction C are not equal, in the folded state, portions of the two scrollable display parts 112 may be overlapped, thereby reducing a size of the scrollable display apparatus 100.

Figure 14C:
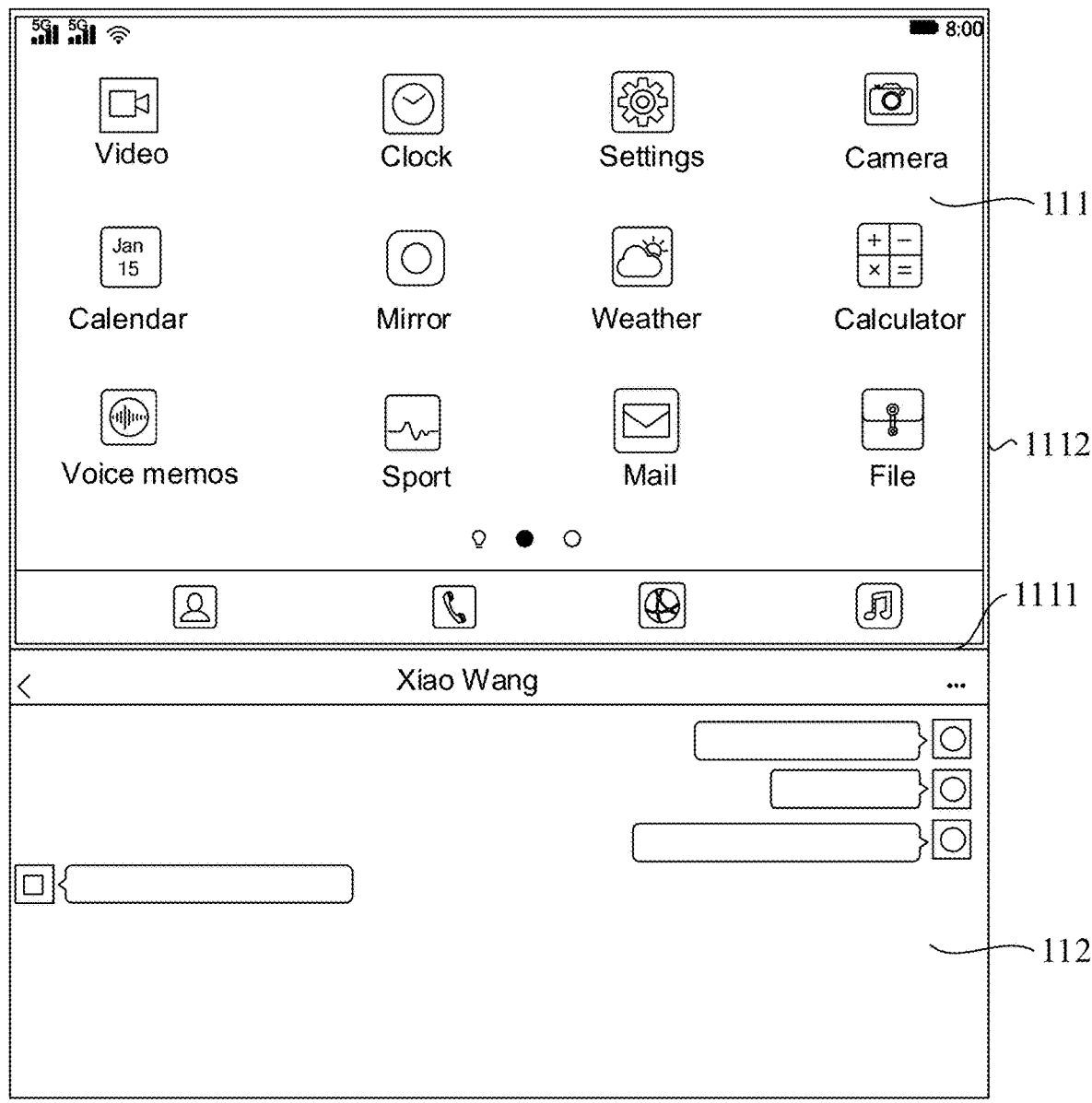
FIG. 14C is an interface diagram of a scrollable display apparatus, in accordance with some embodiments.

In some examples, referring to FIG. 14C, the fixed display part 111 of the scrollable display apparatus 100 includes a first side 1111 and a second side 1112 that are adjacent, where a length of the first side 1111 is greater than a length of the second side 1112. In some examples, the scrollable display part 112 is disposed on the first side 1111. For example, the scrollable display apparatus 100 may be a tablet computer.

In some other examples, referring to FIG. 9B, the scrollable display part 112 is disposed on the second side 1112.

Figure 14D:
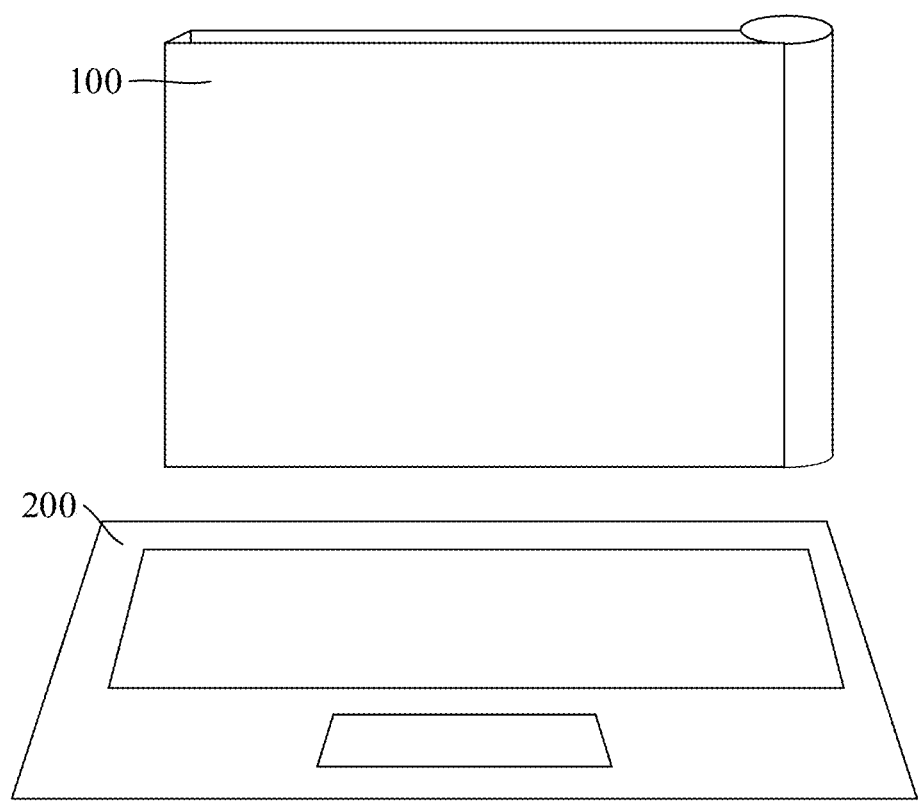
FIG. 14D is a structural diagram of a scrollable display apparatus, in accordance with some embodiments.
Figure 14E:
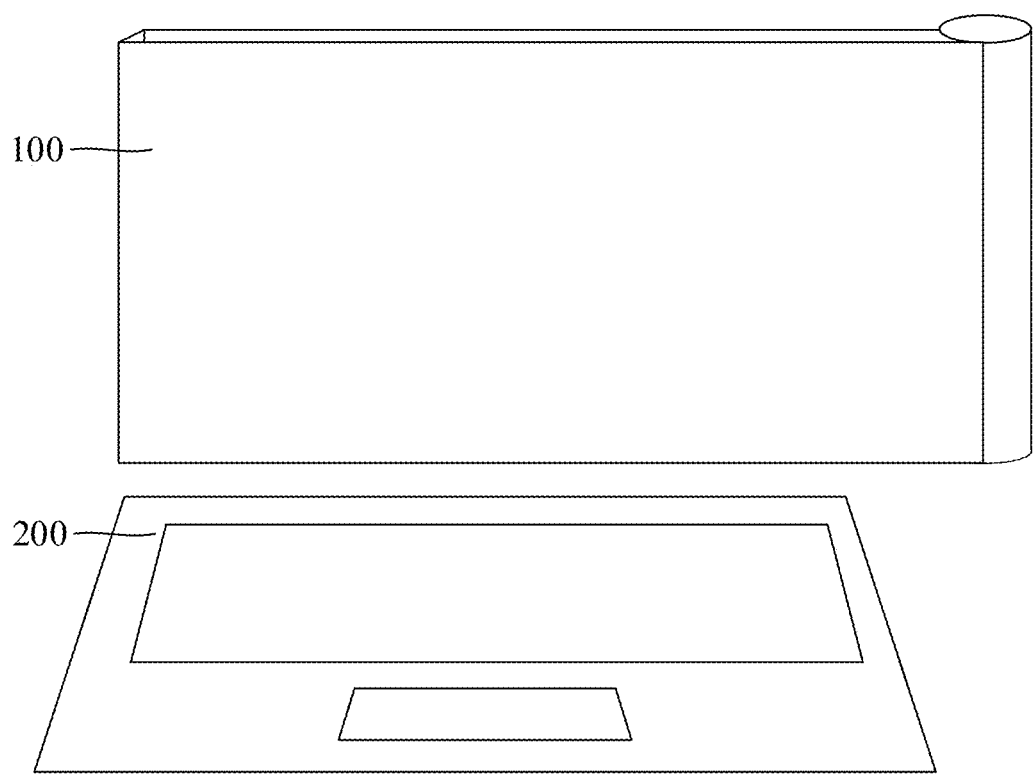
FIG. 14E is a structural diagram of a scrollable display apparatus, in accordance with some embodiments.

In some examples, referring to FIG. 14D and FIG. 14E, the scrollable display apparatus 100 may be coupled to an input apparatus 200 (such as a keyboard), so as to realize a function of a notebook computer. For example, the scrollable display apparatus 100 may be a tablet computer. For example, the control instruction causing the scrollable display part 112 to be unfolded to the designated target state may be input through the input apparatus 200, and the extension selection message may also be selected through the input apparatus 200.

Some embodiments of the present disclosure provide a control method of a scrollable display apparatus, which is used for the scrollable display apparatus 100 provided in some of the above embodiments. In some of the above embodiments, a structure of the scrollable display apparatus 100 has been described and will not be repeated here. Referring to FIG. 5B, FIG. 5B illustrates the control method of the scrollable display apparatus. The method includes the following steps S1 to S3.

S1, determining a current state of the scrollable display part 112 according to a position information of the scrollable display part 112, where the current state includes a start-unfolded state;

S2, if the scrollable display part 112 is in the start-unfolded state, controlling the fixed display part 111 to display a plurality of extension selection messages; and S3, in response to a control instruction corresponding to a selected extension selection message, controlling the scrollable display part 112 to display extension display information corresponding to the selected extension selection message.

In the control method of the scrollable display apparatus provided by some embodiments of the present disclosure, in a case that the scrollable display part 112 is in the start-unfolded state, the fixed display part 111 displays the plurality of extension selection messages for the user to select a message, and then display content of the scrollable display part 112 is controlled according to the extension selection message selected by the user. Therefore, there is no need for the user to determine the state of the scrollable display part 112, and the plurality of extension selection messages are provided for the user in time for selection, which brings a good user experience to the user.

In some embodiments, the current state further includes at least one target state. S3, in response to a control instruction corresponding to a selected extension selection message, controlling the scrollable display part 112 to display extension display information corresponding to the selected extension selection message, includes: if it is determined that the scrollable display part 112 is in a designated target state or upon receipt of a control instruction causing the scrollable display part 112 to be unfolded to the designated target state, in response to the control instruction corresponding to the selected extension selection message, control the scrollable display part 112 to display the extension display information corresponding to the selected extension selection message, where the designated target state is one of the at least one target state.

In some examples, after receiving the control instruction causing the scrollable display part 112 to be unfolded to the designated target state, the first processor 140 controls the scrollable display part 112 to display the extension display information corresponding to the selected extension selection message. Therefore, before the scrollable display part 112 is unfolded to the designated target state, the scrollable display part 112 has displayed a corresponding image, and the display image may be gradually exposed during a process of unfolding the scrollable display part 112. Therefore, continuous experience of the user will not be interrupted during the process of unfolding the scrollable display part 112, and the user may get a strong sense of fashion and technology, thereby bringing the user a good visual and user experience.

In some other examples, after the scrollable display part 112 is in the designated target state, the first processor 140 controls the scrollable display part 112 to display the extension display information corresponding to the selected extension selection message. Before the scrollable display part 112 is unfolded to the designated target state, the scrollable display part 112 does not display images, thereby reducing load on a battery of the scrollable display apparatus 100.

In some embodiments, the control method of the scrollable display apparatus further includes: based on the control instruction corresponding to the selected extension selection message, controlling the scrollable display part 112 to be unfolded to the designated target state.

The scrollable display part 112 may be controlled to be unfolded to different target states according to a display image corresponding to the extension selection message, and the scrollable display part 112 has different display areas in the different target states. Therefore, not only a display area may be adjusted according to the display image, so that the scrollable display apparatus 100 has a good display effect, but also battery power of the scrollable display apparatus 100 may be used reasonably.

In some embodiments, the plurality of extension selection messages include a first selection message A10 and a second selection message A20. S3, in response to a control instruction corresponding to a selected extension selection message, controlling the scrollable display part 112 to display extension display information corresponding to the selected extension selection message, further includes: in response to a control instruction corresponding to the first selection message A10, controlling the scrollable display part 112 and the fixed display part 111 to display a current interface of the fixed display part 111 together; or in response to a control instruction corresponding to the second selection message A20, controlling the scrollable display part 112 to display a display image different from the current interface of the fixed display part 111. In this way, it enables the user to browse other interfaces without changing the current interface of the fixed display part 111, greatly improving the convenience of the user's work.

In some embodiments, the second selection message A20 includes any one or more of a first selection sub-message A21, a second selection sub-message A22, a third selection sub-message A23 and a fourth selection sub-message A24. In response to a control instruction corresponding to the second selection message A20, controlling the scrollable display part 112 to display a display image different from the current interface of the fixed display part 111, includes: in response to a control instruction corresponding to the first selection sub-message A21, controlling the scrollable display part 112 to display desktop information of the fixed display part 111; or in response to a control instruction corresponding to the second selection sub-message A22, controlling the scrollable display part 112 to display interface information on a next layer-level of the current interface of the fixed display part 111; or in response to a control instruction corresponding to the third selection sub-message A23, controlling the scrollable display part 112 to display interface information on a previous layer-level of the current interface of the fixed display part 111; or in response to a control instruction corresponding to the fourth selection sub-message A24, controlling the scrollable display part 112 to display interface information of any application program other than a current application program from all opened application programs.

In a case that the user selects the first selection message A10, the scrollable display part 112 and the fixed display part 111 display the current interface of the fixed display part 111 together, so as to enlarge the current interface of the fixed display part 111, which is convenient for the user to view and operate. If the user selects any one from the first selection sub-message A21 to the fourth selection sub-message A24, display information different from that of the current interface of the fixed display part 111 may be displayed on the scrollable display part 112, and the user may simultaneously browse a plurality of pages, which is convenient for the user to operate.

In some embodiments, the second selection message A20 includes a fifth selection sub-message A25. In response to a control instruction corresponding to the second selection message A20, controlling the scrollable display part 112 to display a display image different from the current interface of the fixed display part 111, includes, in response to a control instruction corresponding to the fifth selection sub-message A25, controlling the scrollable display part 112 to display a current interface information of an external display apparatus. In this way, it enables the user to operate the interface of the fixed display part 111 while browsing other interfaces without changing the apparatus, greatly improving the convenience of the user's work.

In some embodiments, referring to FIG. 10A, the first detection component 130 may include at least two photosensitive elements 131, and the at least two photosensitive elements 131 include a first photosensitive element 1311 and at least one second photosensitive element 1312. S1, determining a current state of the scrollable display part 112 according to a position information of the scrollable display part 112, includes, if an intensity of external ambient light detected by the first photosensitive element 1311 is within a first preset intensity range, and an intensity of external ambient light detected by all second photosensitive elements 1312 is within a second preset intensity range, determining that the scrollable display part 112 is in the start-unfolded state.

In some embodiments, referring to FIG. 11A to FIG. 11D, the first detection component 130 includes an induction member 132 and at least one detection member 133, the induction member 132 is disposed on the sliding member 152 or the scrollable display part 112, and the at least one detection member 133 is disposed on the fixed member 151.

In some examples, referring to FIG. 11A and FIG. 11B, the induction member 132 includes a magnetic element 1321; and the detection member 133 includes magnetic detection elements 1331, and a number of the magnetic detection elements 1331 is at least two, where at least two of the magnetic detection elements 1331 include an initial magnetic detection element 13311 and at least one target magnetic detection element 13312. S1, determining a current state of the scrollable display part 112 according to a position information of the scrollable display part 112, includes: if the magnetic element 1321 is out of a detection range of the initial magnetic detection element 13311 and does not enter a detection range of any target magnetic detection element 13312, determining that the scrollable display part 112 is in the start-unfolded state; and if the magnetic element 1321 is located within a detection range of a designated target magnetic detection element, determining that the scrollable display part 112 is in the designated target state, where the designated target magnetic detection element is one of the at least one target magnetic detection element 13312.

In some embodiments, referring to FIG. 11C and FIG. 11D, the induction member 132 includes a first electrode plate Cst1, the detection member 132 includes a second electrode plate Cst2, and the second electrode plate Cst2 and the first electrode plate Cst1 form a capacitor. S1, determining a current state of the scrollable display part 112 according to the position information of the scrollable display part 112, includes: if a capacitance value of the capacitor is within a first capacitance threshold range, determining that the scrollable display part 112 is in the start-unfolded state; and if the capacitance value of the capacitor is within a second capacitance threshold range, determining that the scrollable display part 112 is in the designated target state.

Figure 15:
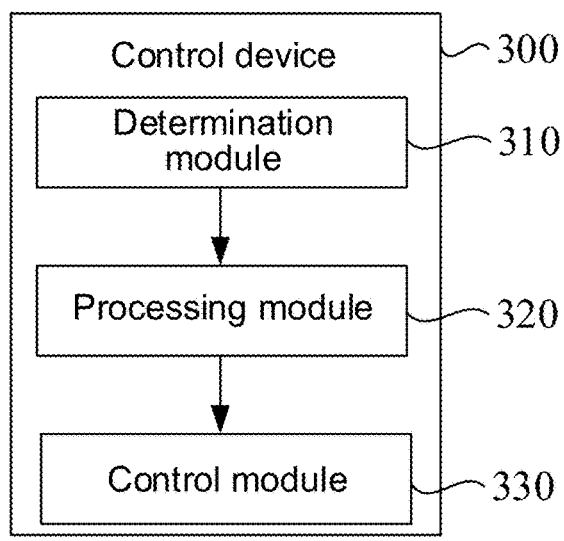
FIG. 15 is a structural diagram of a control device of a scrollable display apparatus, in accordance with some embodiments.

Some embodiments of the present disclosure provide a control device of the scrollable display apparatus. As shown in FIG. 15, the control device 300 includes a determination module 310, a processing module 320 and a control module 330. The determination module 310 is configured to determine a current state of the scrollable display part 112 according to a position information of the scrollable display part 112, where the current state includes a start-unfolded state. The processing module 320 is configured to, if the scrollable display part 112 is in the start-unfolded state, control the fixed display part 111 to display a plurality of extension selection messages. The control device 300 is configured to, in response to a control instruction corresponding to a selected extension selection message, control the scrollable display part 112 to display extension display information corresponding to the selected extension selection message.

In some embodiments, the control module 330 is further configured to: if it is determined that the scrollable display part 112 is in a designated target state or upon receipt of a control instruction causing the scrollable display part 112 to be unfolded to the designated target state, in response to the control instruction corresponding to the selected extension selection message, control the scrollable display part 112 to display the extension display information corresponding to the selected extension selection message, where the designated target state is one of the at least one target state.

In some embodiments, the control module 330 is further configured to, based on the control instruction corresponding to the selected extension selection message, control the scrollable display part 112 to be unfolded to the designated target state.

In some embodiments, the plurality of extension selection messages include a first selection message A10 and a second selection message A20. The control module 330 is configured to: in response to a control instruction corresponding to the first selection message A10, control the scrollable display part 112 and the fixed display part 111 to display a current interface of the fixed display part 111 together; or in response to a control instruction corresponding to the second selection message A20, control the scrollable display part 112 to display a display image different from the current interface of the fixed display part 111.

In some embodiments, the second selection message A20 includes any one or more of a first selection sub-message A21, a second selection sub-message A22, a third selection sub-message A23 and a fourth selection sub-message A24. The control module 330 is configured to: in response to a control instruction corresponding to the first selection sub-message A21, control the scrollable display part 112 to display desktop information of the fixed display part 111; or in response to a control instruction corresponding to the second selection sub-message A22, control the scrollable display part 112 to display interface information on a next layer-level of the current interface of the fixed display part 111; or in response to a control instruction corresponding to the third selection sub-message A23, control the scrollable display part 112 to display interface information on a previous layer-level of the current interface of the fixed display part 111; or in response to a control instruction corresponding to the fourth selection sub-message A24, control the scrollable display part 112 to display interface information of any application program other than a current application program from all opened application programs.

In some embodiments, the second selection message A20 includes a fifth selection sub-message A25. The control module 330 is configured to: in response to a control instruction corresponding to the fifth selection sub-message A25, control the scrollable display part 112 to display a current interface information of an external display apparatus.

In some embodiments, referring to FIG. 10A, the first detection component 130 may include at least two photosensitive elements 131, and the at least two photosensitive elements 131 include a first photosensitive element 1311 and at least one second photosensitive element 1312. The determination module 310 is configured to, if an intensity of external ambient light detected by the first photosensitive element 1311 is within a first preset intensity range, and an intensity of external ambient light detected by all second photosensitive elements 1312 is within a second preset intensity range, determine that the scrollable display part 112 is in the start-unfolded state.

In some embodiments, referring to FIG. 11A to FIG. 11D, the first detection component 130 includes an induction member 132 and at least one detection member 133, the induction member 132 is disposed on the sliding member 152 or the scrollable display part 112, the at least one detection member 133 is disposed on the fixed member 151 and coupled to the first processor 140. The determination module 310 is configured to, obtain the position information of the scrollable display part 112 according to position information of the induction member 132 detected by the detection member 133.

In some embodiments, referring to FIG. 11A and FIG. 11B, the induction member 132 includes a magnetic element 1321; and the detection member 133 includes magnetic detection elements 1331, and a number of the magnetic detection elements 1331 is at least two, where at least two of the magnetic detection elements 1331 include an initial magnetic detection element 13311 and at least one target magnetic detection element 13312. The determination module 310 is configured to: if the magnetic element 1321 is out of a detection range of the initial magnetic detection element 13311 and does not enter a detection range of any target magnetic detection element 13312, determine that the scrollable display part 112 is in the start-unfolded state; and if the magnetic element 1321 is located within a detection range of a designated target magnetic detection element, determine that the scrollable display part 112 is in the designated target state, where the designated target magnetic detection element is one of the at least one target magnetic detection element 13312.

In some embodiments, referring to FIG. 11C and FIG. 11D, the induction member 132 includes a first electrode plate Cst1, the detection member 132 includes a second electrode plate Cst2, and the second electrode plate Cst2 and the first electrode plate Cst1 form a capacitor. The determination module 310 is configured to: if a capacitance value of the capacitor is within a first capacitance threshold range, determine that the scrollable display part 112 is in the start-unfolded state; and if the capacitance value of the capacitor is within a second capacitance threshold range, determine that the scrollable display part 112 is in the designated target state.

From description of the above embodiments, those skilled in the art will clearly understand that, for convenience and brevity of description, a division of various function modules is illustrated as an example only. In practical applications, the above functions are allocated to different function modules as needed. That is, an internal structure of the control device is divided into different function modules to perform all or some of the functions described above.

Figure 16A:
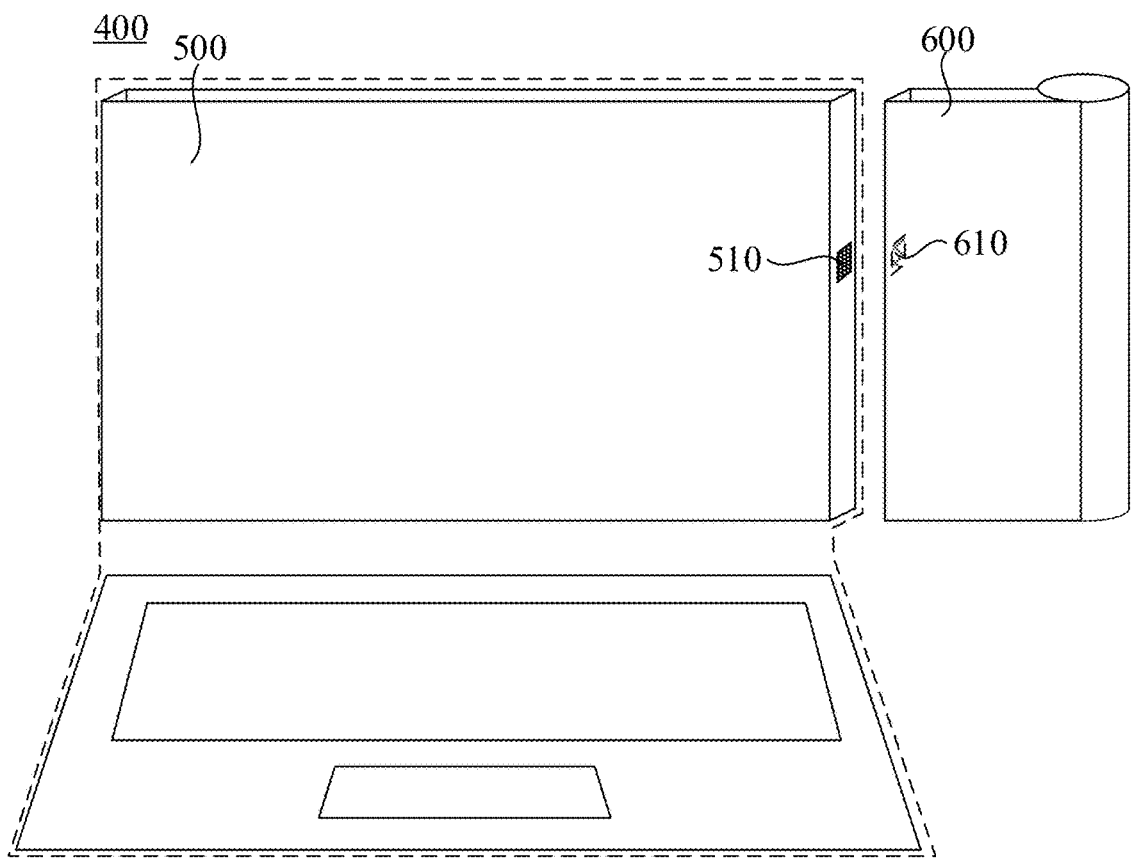
FIG. 16A is a structural diagram of a display system, in accordance with some embodiments.
Figure 16B:
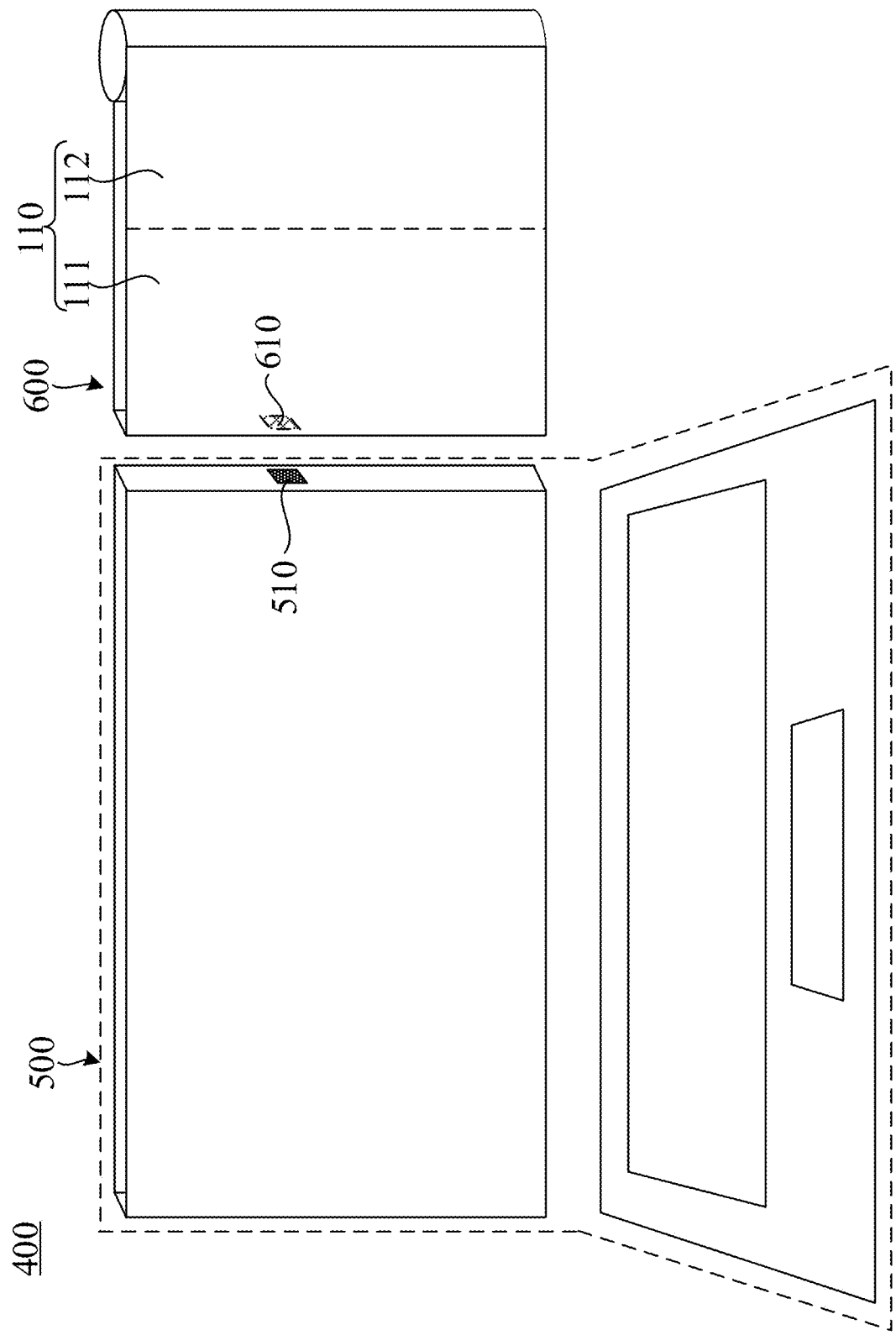
FIG. 16B is a structural diagram of a display system, in accordance with some embodiments.

Some embodiments of the present disclosure provide a display system 400, referring to FIG. 16A and FIG. 16B, the display system 400 includes: a first display apparatus 500 and at least one first scrollable display apparatus 600. The first display apparatus 500 includes a first connecting part 510, and the first scrollable display apparatus 600 includes a second connecting part 610.

The first display apparatus 500 may be any product or component having a display function such as an electronic paper LCD (Liquid Crystal Display), an OLED panel, a mobile phone, a tablet computer, a television, a monitor, a notebook computer, a digital photo frame, or a navigator.

The first connecting part 510 and the second connecting part 610 are connected in a demountable manner. There are many ways to detachably connect the first connecting part 510 and the second connecting part 610, two of which will be described below.

In some possible designs, both the first connecting part 510 and the second connecting part 610 may be magnetic, and the first connecting part 510 and the second connecting part 610 may be attached and connected through magnetism.

In some other possible designs, one of the first connecting part 510 and the second connecting part 610 is a slot, and the other is a plug-in part, and the plug-in part may be inserted into the slot.

In some examples, the first connecting part 510 and the second connecting part 610 may only be physically connected, but not electrically connected. In some other examples, the first connecting part 510 and the second connecting part 610 are physically and electrically connected, so that the first display apparatus 500 is electrically coupled to the first scrollable display apparatus 600. For example, one of the first connecting part 510 and the second connecting part 610 may be a male connector of a communication connector, and the other may be a female connector of the communication connector. For example, the communication connector may be a Lightning connector, a Type-C connector, a Micro USB connector, or the like.

Figure 16C:
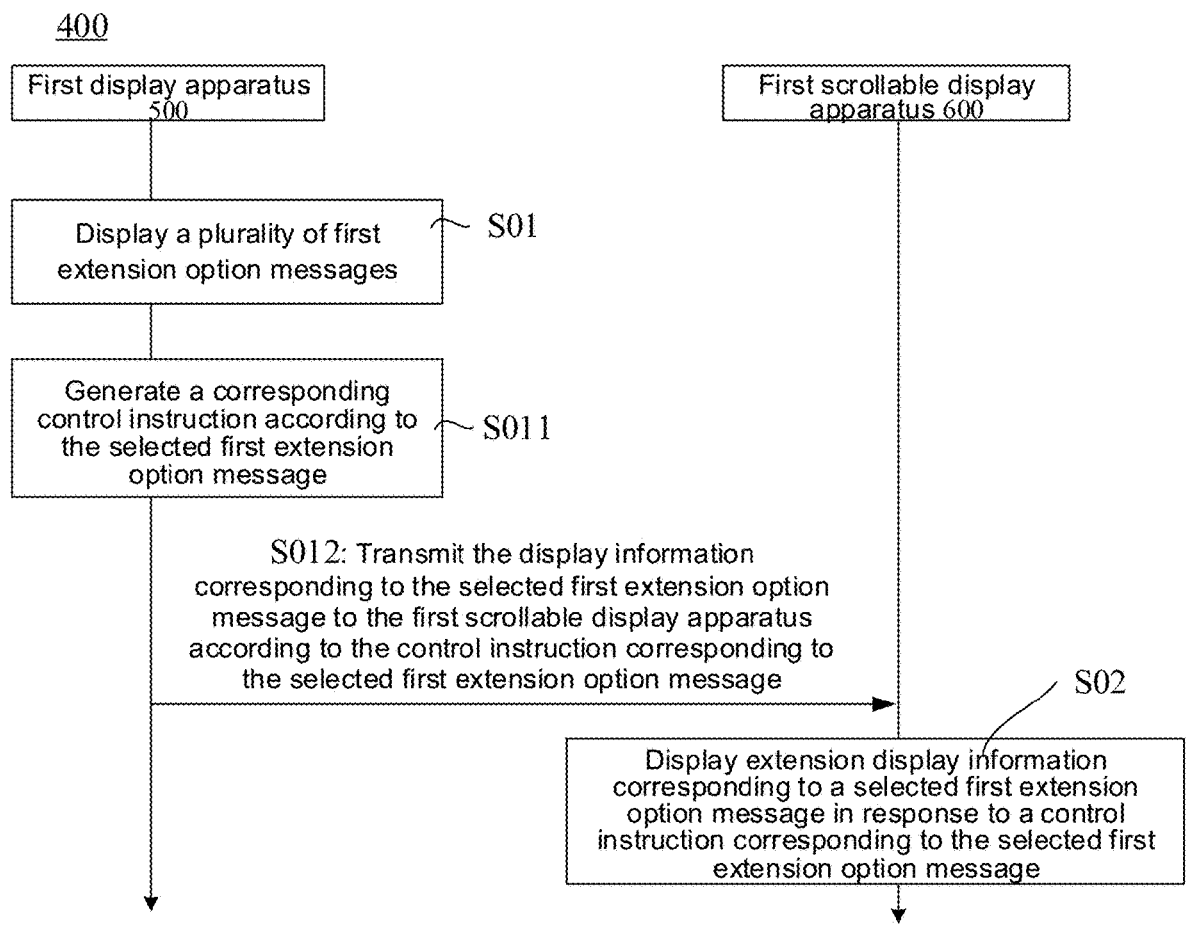
FIG. 16C is a flow diagram of an interaction method of a display system, in accordance with some embodiments.

In some embodiments, referring to FIG. 16C, the first display apparatus 500 is configured to, in a case that the second connecting part 610 is connected to the first connecting part 510, and the first scrollable display apparatus 600 is in a preset state, display a plurality of first extension option messages, where the preset state includes any one of a folded state and a start-unfolded state. The first scrollable display apparatus 600 is configured to, in response to a control instruction corresponding to a selected first extension option message, display extension display information corresponding to the selected first extension option message.

Figure 16D:
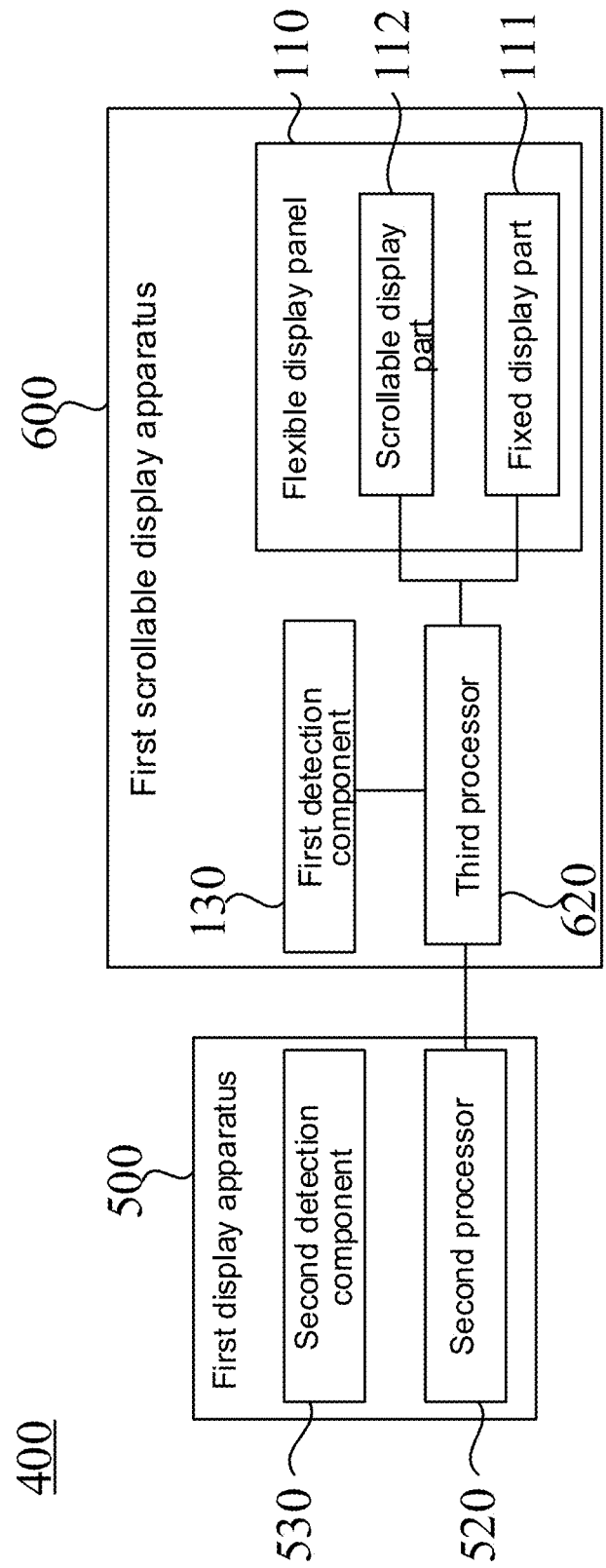
FIG. 16D is a structural diagram of a display system, in accordance with some embodiments.

In some examples, referring to FIG. 16D, the first display apparatus 500 may include a second processor 520 and a second detection component 530, and the second detection component 530 is configured to detect whether the first connecting part 510 is connected to the second connecting part 610, and the is coupled to the second processor 520.

In some examples, in a case that the first connecting part 510 and the second connecting part 610 are physically and electrically connected, the second processor 520 is coupled to the first connecting part 510.

For example, the second detection component 530 may be a pressure sensor, and the pressure sensor may transmit detected pressure information to the second processor 520. The second processor 520 is configured to: if a pressure value detected by the second detection component 530 is within a first preset pressure range, determine that the first connecting part 510 is not connected to the second connecting part 610; and if the pressure value detected by the detection component 530 is within a second preset pressure range, determine that the first connecting part 510 is connected to the second connecting part 610.

In some embodiments, the first scrollable display apparatus 600 includes a flexible display panel 110, and the flexible display panel 110 includes a fixed display part 111 and at least one scrollable display part 112.

In some examples, referring to FIG. 16D, the first scrollable display apparatus 600 further includes at least one first detection component 130 and one or more third processors 620.

Here, the second processor 520 and the third processor 620 may each be, for example, a central processor (Central Processing Unit, CPU), a general processor, a digital signal processor (DSP), an application-specific integrated circuit (ASIC), a field programmable gate array (FPGA) or other programmable logic devices, transistor logic devices, hardware components or any combination thereof. It may implement or execute various illustrative logical blocks, modules and circuits described in content of the present disclosure. The processor 140 may also be a combination that implements computing functions, for example, a combination including one or more microprocessors, a combination of a DSP and a microprocessor, or the like.

In the case that the first connecting part 510 and the second connecting part 610 are physically and electrically connected, the third processor 620 is coupled to the second connecting part 610. Since the first connecting part 510 and the second connecting part 610 are physically and electrically connected, the third processor 620 is electrically coupled to the second processor 520.

Structures of the flexible display panel 110 and the first detection component 130 in the first scrollable display apparatus 600 may be the same as those of the flexible display panel 110 and the first detection component 130 in the scrollable display apparatus 100 provided in some of the above embodiments, which will not be described here.

In some examples, a first detection component 130 is configured to detect position information of a scrollable display part 112. The third processor 620 is configured to determine a current state of the first scrollable display apparatus 600 according to the position information of the scrollable display part 112 of the first scrollable display apparatus 600 detected by the first detection component, where the current state includes a start-unfolded state and a folded state.

Here, a process of determining the current state of the scrollable display part 112 by the third processor 620 is the same as a process of determining the current state of the scrollable display part 112 by the first processor 140, and will not be repeated here. Since the first scrollable display apparatus 600 includes the scrollable display part 112, the current state of the scrollable display part 112 is the current state of the first scrollable display apparatus 600. In a case that the first scrollable display apparatus 600 is in the start-unfolded state, the scrollable display part 112 is also in the start-unfolded state, and in a case that the first scrollable display apparatus 600 is in the folded state, the scrollable display part 112 is also in the folded state.

The third processor 620 is coupled to the second processor 520 of the first display apparatus 500, and the third processor 620 may transmit the current state of the scrollable display apparatus 100 to the second processor 520.

In a case that the second connecting part 610 is connected to the first connecting part 510 and the first scrollable display apparatus 600 is in a preset state, the second processor 520 controls the first display apparatus 500 to display a plurality of first extension option messages.

Figure 17A:
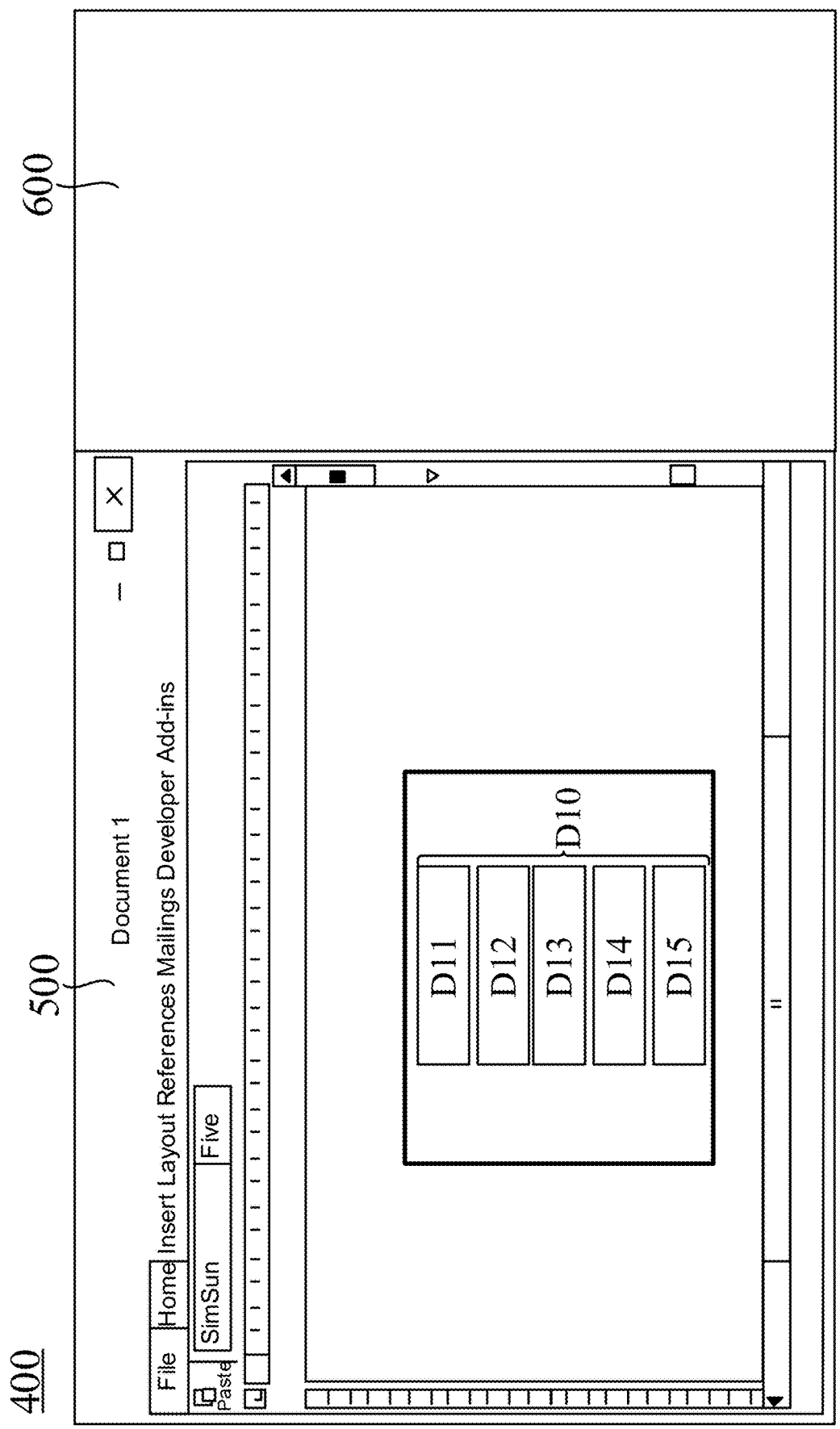
FIG. 17A is an interface diagram of a display system, in accordance with some embodiments.

In some examples, the preset state is the folded state. In this case, in a case that the first connecting part 510 is connected to the second connecting part 610, the first display apparatus 500 will display the plurality of first extension option messages. For example, an interface of the first display apparatus 500 is shown in FIG. 17A, and D11 to D15 in FIG. 17A are the plurality of first extension option messages.

In some other examples, the preset state is the start-unfolded state. In this case, in a case that the first connecting part 510 is connected to the second connecting part 610, and the first scrollable display apparatus 600 starts to be unfolded, the first display apparatus 500 displays the plurality of first extension option messages.

In some examples, different first extension option messages correspond to different extension display information. Referring to FIG. 16C, the first scrollable display apparatus 600 displays the extension display information corresponding to the selected first extension option message, in response to the control instruction corresponding to the selected first extension option message, extension option message the first display apparatus 500 further performs the following operations: in a case that the user selects a first extension option message of the first extension option messages, generating a control instruction corresponding to the first extension option message; and transmitting display information corresponding to the selected first extension option message to the third processor 620 of the first scrollable display apparatus 600 according to the control instruction. Then the first scrollable display apparatus 600 may display the extension display information corresponding to the selected first extension option message according to the display information corresponding to the selected first extension option message.

For example, as shown in FIG. 17B to FIG. 17G, a plurality pieces of extension display information corresponding to the plurality of first extension option messages may include: partial information of a current interface of the first display apparatus 500, interface information on a previous layer-level of the current interface of the first display apparatus 500, interface information on a next layer-level of the current interface of the first display apparatus 500, desktop information of the current interface of the first display apparatus 500, and interface information of any application program other than a current application program from all opened application programs on the first display apparatus 500.

In the display system 400 provided by some embodiments of the present disclosure, in a case that the first connecting part 510 is connected to the second connecting part 610, and the first scrollable display apparatus 600 is in the preset state, the first display apparatus 500 provides the plurality of first extension option messages for the user to select a message, and then the first scrollable display apparatus 600 is controlled to display a corresponding information according to a first extension option message selected by the user. Therefore, there is no need for the user to determine the state of the first scrollable display apparatus 600, and according to a connection state of the first connecting part 510 and the second connecting part 610, and the state of the first scrollable display apparatus 600, the first display apparatus 500 may provide the plurality of first extension option messages for the user in time for selection, which brings a good user experience to the user.

In some embodiments, the first scrollable display apparatus 600 is configured to, if it is determined that the scrollable display part 112 is in a designated target state or upon receipt of a control instruction causing the scrollable display part 112 to be unfolded to the designated target state, in response to the control instruction corresponding to the selected first extension option message, display the extension display information corresponding to the selected first extension option message, where the designated target state is one of at least one target state.

In some examples, in a case that the user selects different first extension option messages, designated target states corresponding to the first scrollable display apparatus 600 may be different.

In some of the above embodiments, the plurality of target states and the designated target state of the scrollable display part 112 have been described in detail, and will not be repeated here.

In some examples, a target state of the scrollable display part 112 of the first scrollable display apparatus 600 is a target state of the first scrollable display apparatus 600, where the target state of the first scrollable display apparatus 600 includes the folded state. For example, as shown in FIG.

16A, a certain first extension option message corresponds to the folded state of the first scrollable display apparatus 600.

In some examples, in a case that the first scrollable display apparatus 600 is unfolded to the designated target state, in response to the control instruction corresponding to the first extension option message selected by the user, the first scrollable display apparatus 600 will display the extension display information corresponding to the selected first extension option message. It can be understood that the first scrollable display apparatus 600 is controlled by the third processor 620 to extension display information. Before the scrollable display part 112 is unfolded to the designated target state, the scrollable display part 112 does not display images, thereby reducing load on a battery of the scrollable display apparatus 600.

Figure 18A:
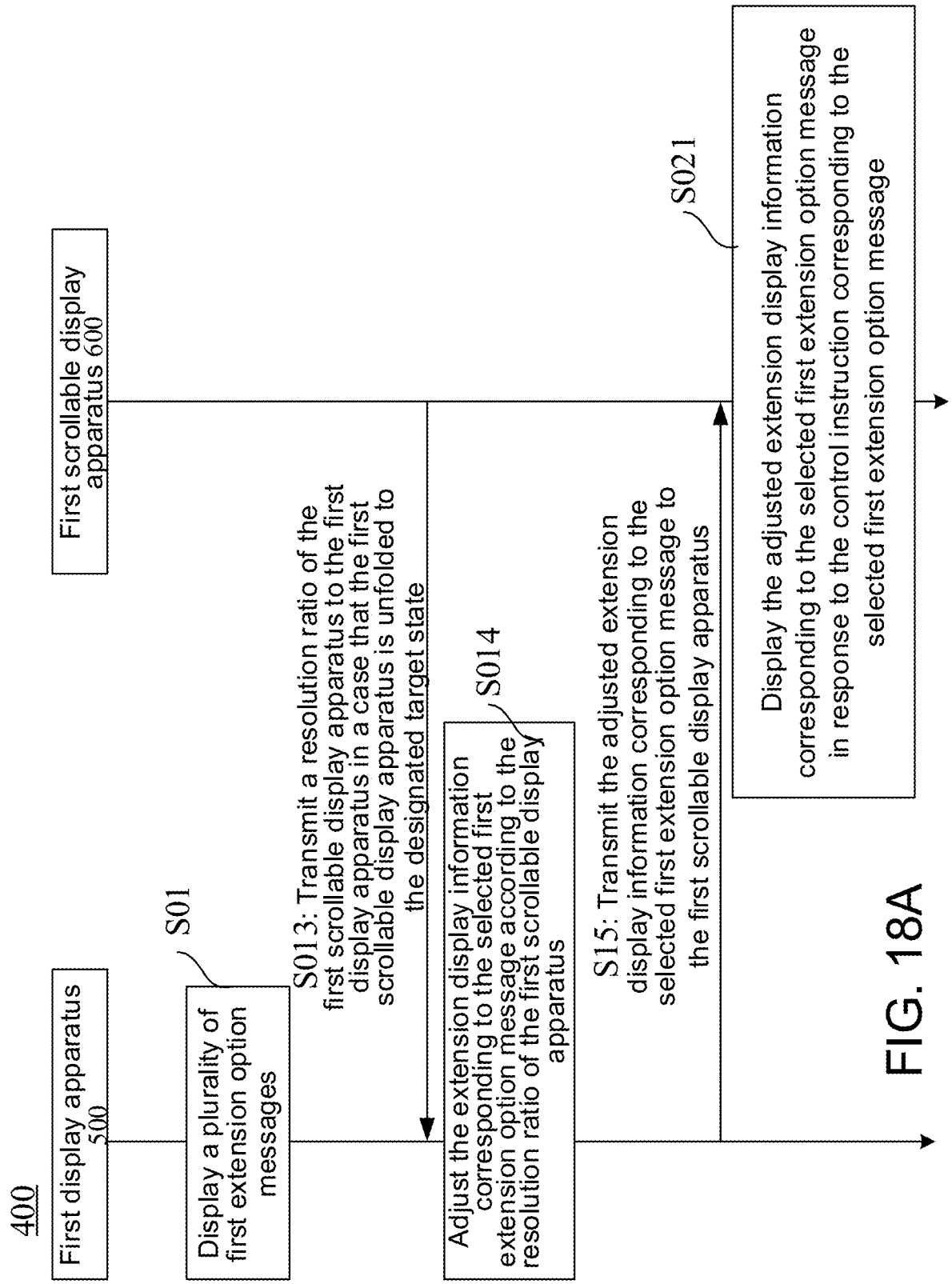
FIG. 18A is a flow diagram of an interaction method of a display system, in accordance with some embodiments.

In some examples, referring to FIG. 18A, the first scrollable display apparatus 600 is further configured to, in a case that the first scrollable display apparatus 600 is unfolded to the designated target state, transmit a resolution ratio of the first scrollable display apparatus 600 to the first display apparatus 500.

The first display apparatus 500 is further configured to: adjust the extension display information corresponding to the selected first extension option message according to the resolution ratio of the first scrollable display apparatus 600; and transmit the adjusted extension display information corresponding to the selected first extension option message to the first scrollable display apparatus 600.

The first scrollable display apparatus 600 is further configured to, in response to the control instruction corresponding to the selected first extension option message, display the adjusted extension display information corresponding to the selected first extension option message.

Here, the extension display information may be adjusted according to the resolution ratio of the first scrollable display apparatus 600, so in a case that the resolution ratio of the first scrollable display apparatus 600 is different from that of the first display apparatus 500, the resolution ratio of the first scrollable display apparatus 600 may adapt to the interface information of the first display apparatus 500, thereby making the interface of the first display apparatus 500 displayed on the first scrollable display apparatus 600 appropriate.

In some other examples, after receiving the control instruction causing the scrollable display part 112 to be unfolded to the designated target state, in response to the control instruction corresponding to the first extension option message selected by the user, the first scrollable display apparatus 600 displays the extension display information corresponding to the selected first extension option message. Therefore, before the scrollable display part 112 is unfolded to the designated target state, the scrollable display part 112 has displayed a corresponding image, and the display image may be gradually exposed during a process of unfolding the scrollable display part 112. Therefore, continuous experience of the user will not be interrupted during the process of unfolding the scrollable display part 112, and the user may get a strong sense of fashion and technology, thereby bringing the user a good visual and user experience.

In some examples, the first scrollable display apparatus 600 is further configured to, after receiving the control instruction causing the scrollable display part 112 to be unfolded to the designated target state, transmit the resolution ratio of the first scrollable display apparatus 600 to the first display apparatus 500.

In some embodiments, the first scrollable display apparatus 600 is further configured to, based on the control instruction causing the scrollable display part 112 to be unfolded to the designated target state, control the scrollable display part 112 to be unfolded to the designated target state.

In some examples. "the control instruction causing the scrollable display part 112 to be unfolded to the designated target state" is the control instruction corresponding to the selected first extension option message.

Different first extension option messages correspond to different display images, and for the different display images, the scrollable display part 112 needs to provide different display areas to make the display images present good display effect.

In some examples, the third processor 620 may control the scrollable display part 112 to be unfolded to the designated target state according to the selected first extension option message. It can be understood that if the user selects a different first extension option message, the third processor 620 may control the scrollable display part 112 to be unfolded to a different target state. Therefore, the plurality of first extension option messages may have a one-to-one correspondence with a plurality of target states, that is, each first extension option message corresponds to a different target state. In addition, in some other examples, some first extension option messages may correspond to a same target state.

The third processor 620 may control the scrollable display part 112 to be unfolded to different target states according to a display image corresponding to the first extension option message, and the scrollable display part 112 has different display areas in the different target states. Therefore, the third processor 620 may control the scrollable display part 112 to have different display areas according to the first extension option message, not only a display area may be adjusted according to the display image, so that the first scrollable display apparatus 600 has a good display effect, but also battery power of the first scrollable display apparatus 600 may be used reasonably.

In some other examples, a first extension option message of the plurality of first extension option messages may correspond to the folded state. If the user selects the first extension option message, the third processor 620 may make the scrollable display part 112 in the folded state according to a control instruction corresponding to the first extension option message, and control the fixed display part 111 to display extension display information corresponding to the first extension option message.

In some embodiments, referring to FIG. 17A, the plurality of first extension option messages D10 include any one or more of a first option message D11, a second option message D12, a third option message D13, a fourth option message D14, and a fifth option message D15. The first scrollable display apparatus 600 is configured to: in response to a control instruction corresponding to the first option message D11, display a current interface of the first display apparatus 500 together with the first display apparatus 500; or in response to a control instruction corresponding to the second option message D12, display interface information on a next layer-level of the current interface of the first display apparatus 500; or in response to a control instruction corresponding to the third option message D13, display interface information on a previous layer-level of the current interface of the first display apparatus 500; or in response to a control instruction corresponding to the fourth option message D14, display desktop information of the current interface of the first display apparatus 500; or in response to a control instruction corresponding to the fifth option message D15, display interface information of any application program other than a current application program from all opened application programs on the first display apparatus 500.

In some examples, the first display apparatus 500 may be a computer. Hereinafter, considering example in which the first display apparatus 500 is a computer, the first option message D11, the second option message D12, the third option message D13, the fourth option message D14 and the fifth option message D15 will be illustratively described.

For example, the current interface of the first display apparatus 500 is a certain text editing interface. In a case the second connecting part 610 of the first scrollable display apparatus 600 is connected to the first connecting part 510 of the first display apparatus 500, and the first scrollable display apparatus 600 is in the preset state, the current interface of the first display apparatus 500 is shown as FIG. 17A.

Figure 17B:
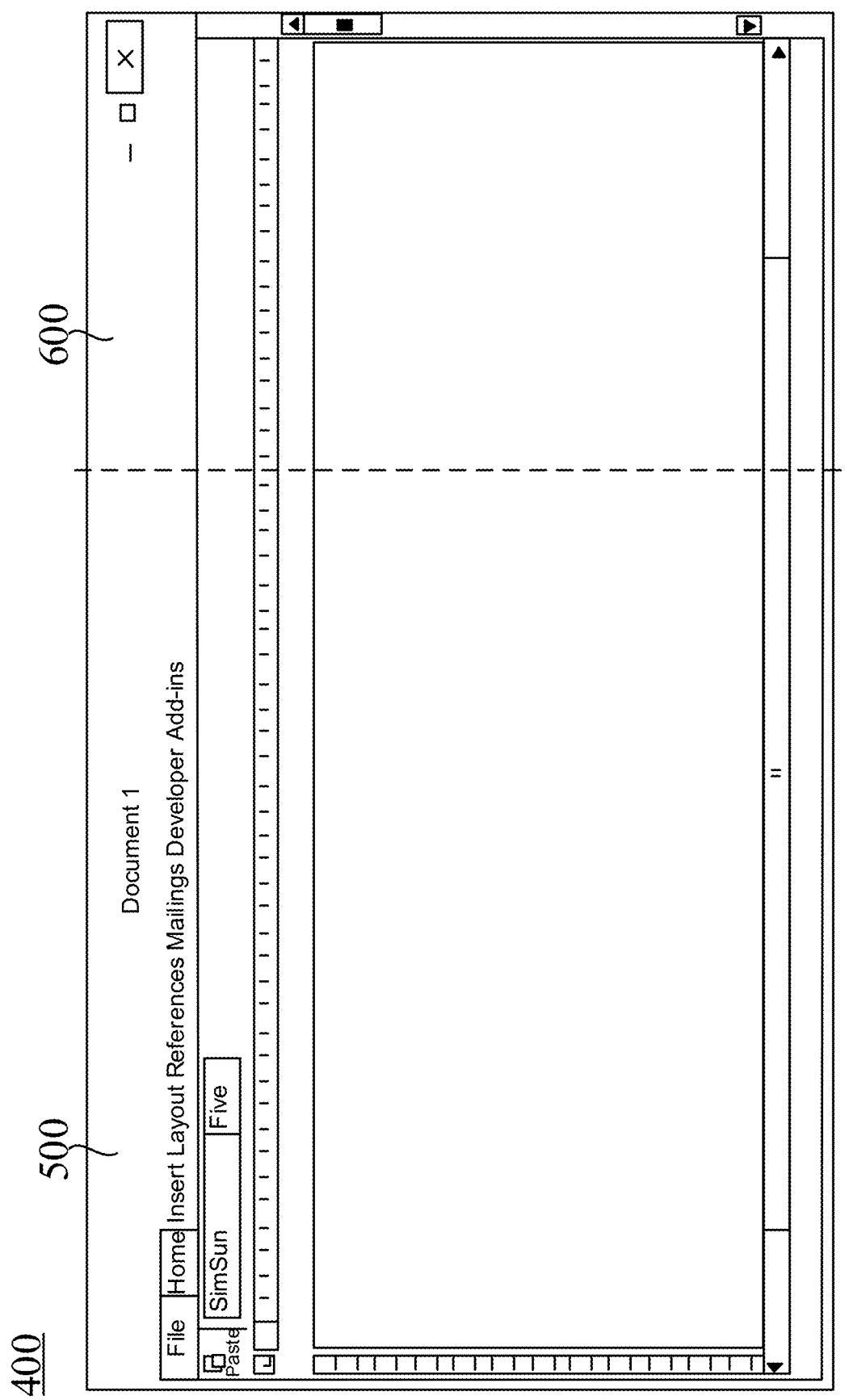
FIG. 17B is an interface diagram of a display system, in accordance with some embodiments.

If the user selects the first option message D11, in response to the control instruction corresponding to the first option message D11, the second processor 520 of the first display apparatus 500 may transmit the partial information of the current interface of the first display apparatus 500 to the third processor 620 of the first scrollable display apparatus 600. The third processor 620 controls a display of the first scrollable display apparatus 600 according to the received partial information of the current interface of the first display apparatus 500, so that the first scrollable display apparatus 600 and the first scrollable display apparatus 500 display the current interface of the first display apparatus 500 together. In this case, display interfaces of the first display apparatus 500 and the first scrollable display apparatus 600 are shown in FIG. 17B. In this case, the third processor 620 may further control the first scrollable display apparatus 600 to be unfolded to a target state corresponding to the first option message D11. Since the first scrollable display apparatus 600 and the first display apparatus 500 display the current interface of the first display apparatus 500 together, the current interface of the first display apparatus 500 is enlarged, which is convenient for the user to view and browse the current interface of the first display apparatus 500.

Figure 17C:
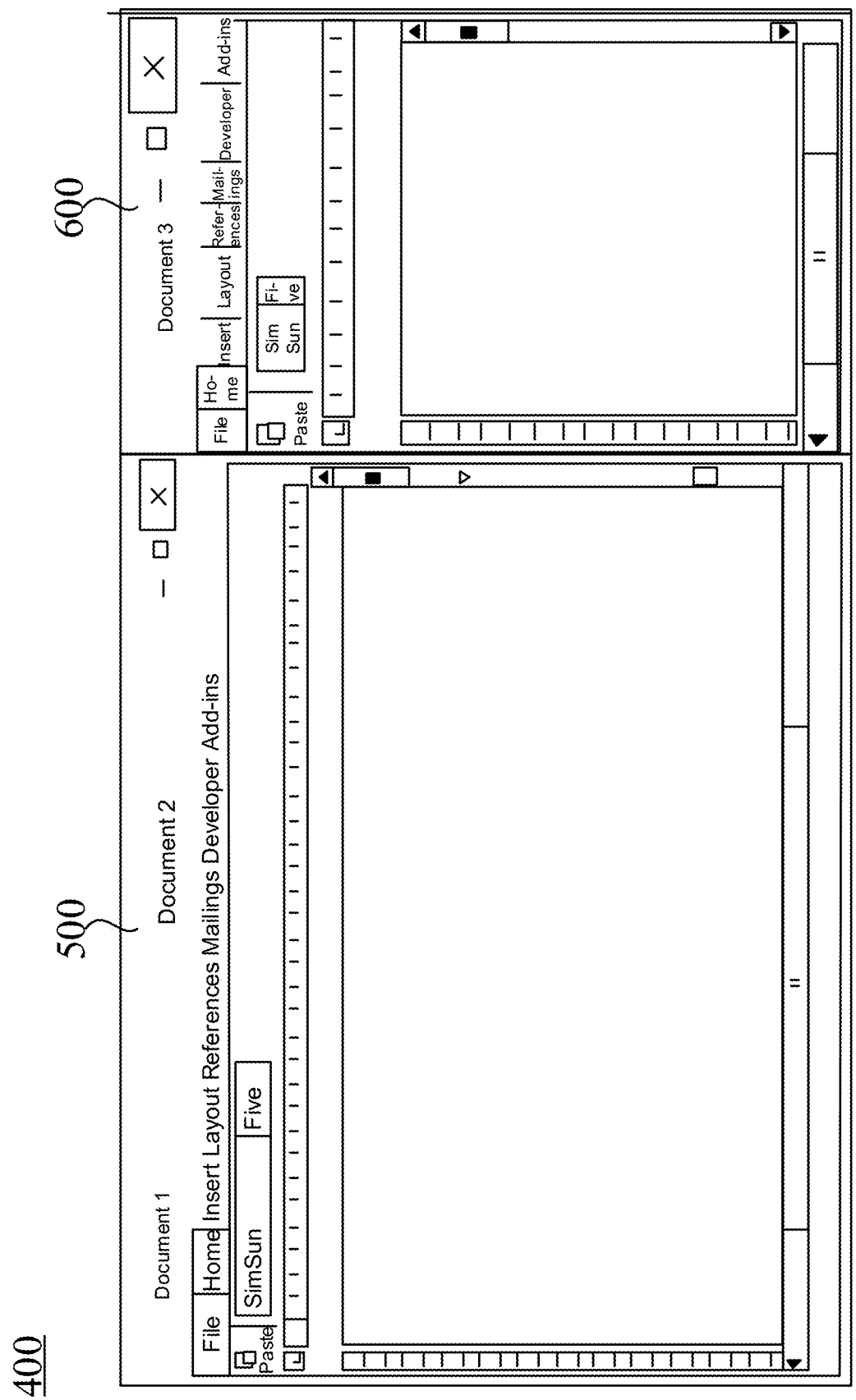
FIG. 17C is an interface diagram of a display system, in accordance with some embodiments.

If the user selects the second option message D12, in response to the control instruction corresponding to the second option message D12, the second processor 520 may transmit the interface information on the next layer-level of the current interface of the first display apparatus 500 to the third processor 620. In this case, an interface of the display system 400 is shown in FIG. 17C. If the user selects the third option message D13, in response to the control instruction corresponding to the third option message D13, the second processor 520 may transmit the interface information on the previous layer-level of the current interface of the first display apparatus 500 to the third processor 620. In this case, an interface of the display system 400 is shown in FIG. 17D.

For example, three documents are currently opened in the text editing application program. The three documents are Document 1, Document 2 and Document 3, respectively, where Document 1 is in a previous layer-level of Document 2, and Document 3 is in a next layer-level of Document 2. Document 2 is the current interface information of the first display apparatus 500. If the user selects the second option message D12, the second processor 520 may control the first scrollable display apparatus to display Document 3, and the interface of the display system 400 is shown in FIG. 17C.

Figure 17D:
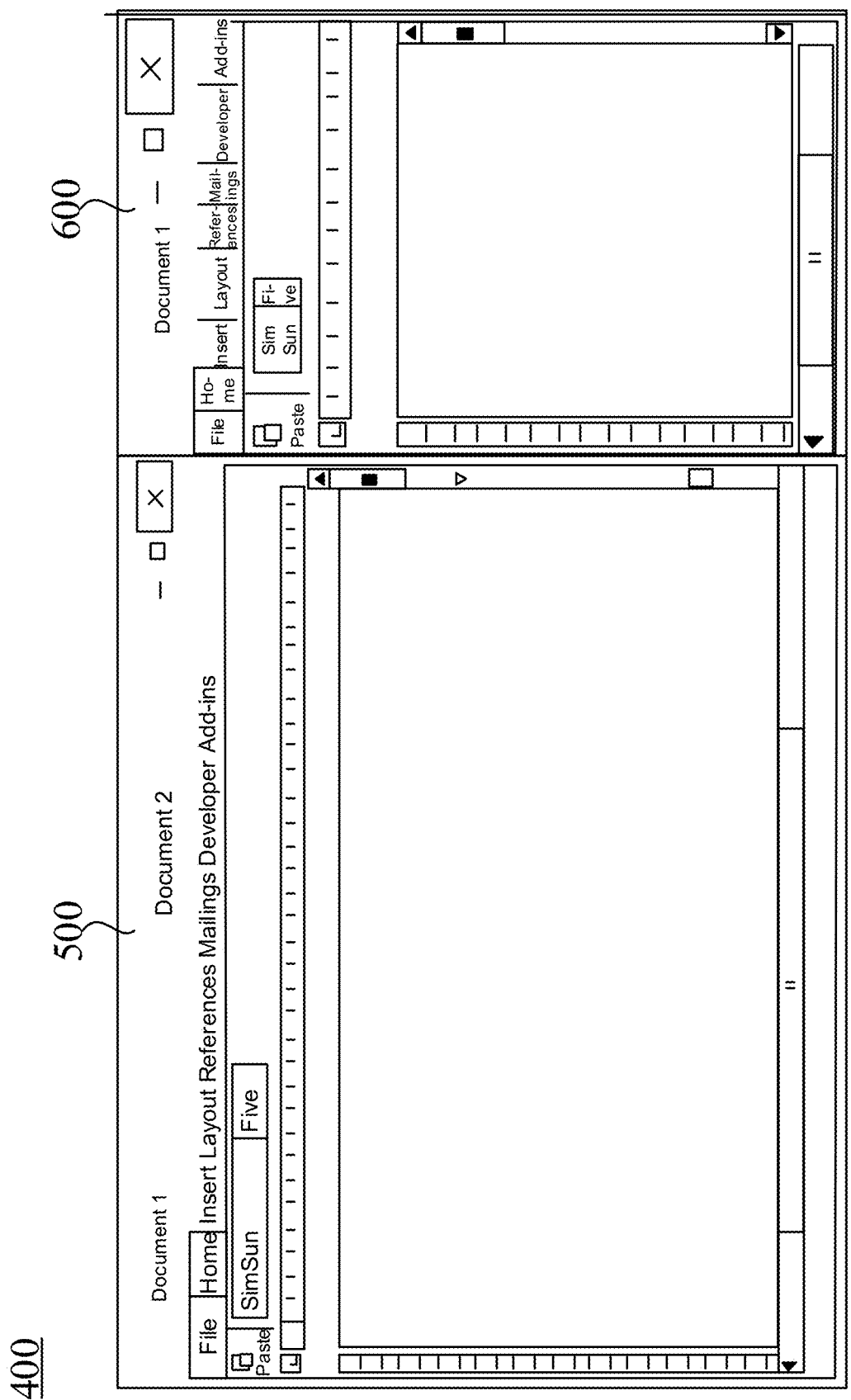
FIG. 17D is an interface diagram of a display system, in accordance with some embodiments.

If the user selects the third option message D13, the second processor 520 may control the first scrollable display apparatus 600 to display Document 1, and the interface of the display system 400 is shown in FIG. 17D. To sum up, by displaying the extension display information on the first scrollable display apparatus 600, more files may be displayed on the interface, which is convenient for the user to check the information in a plurality of files.

Figure 17E:
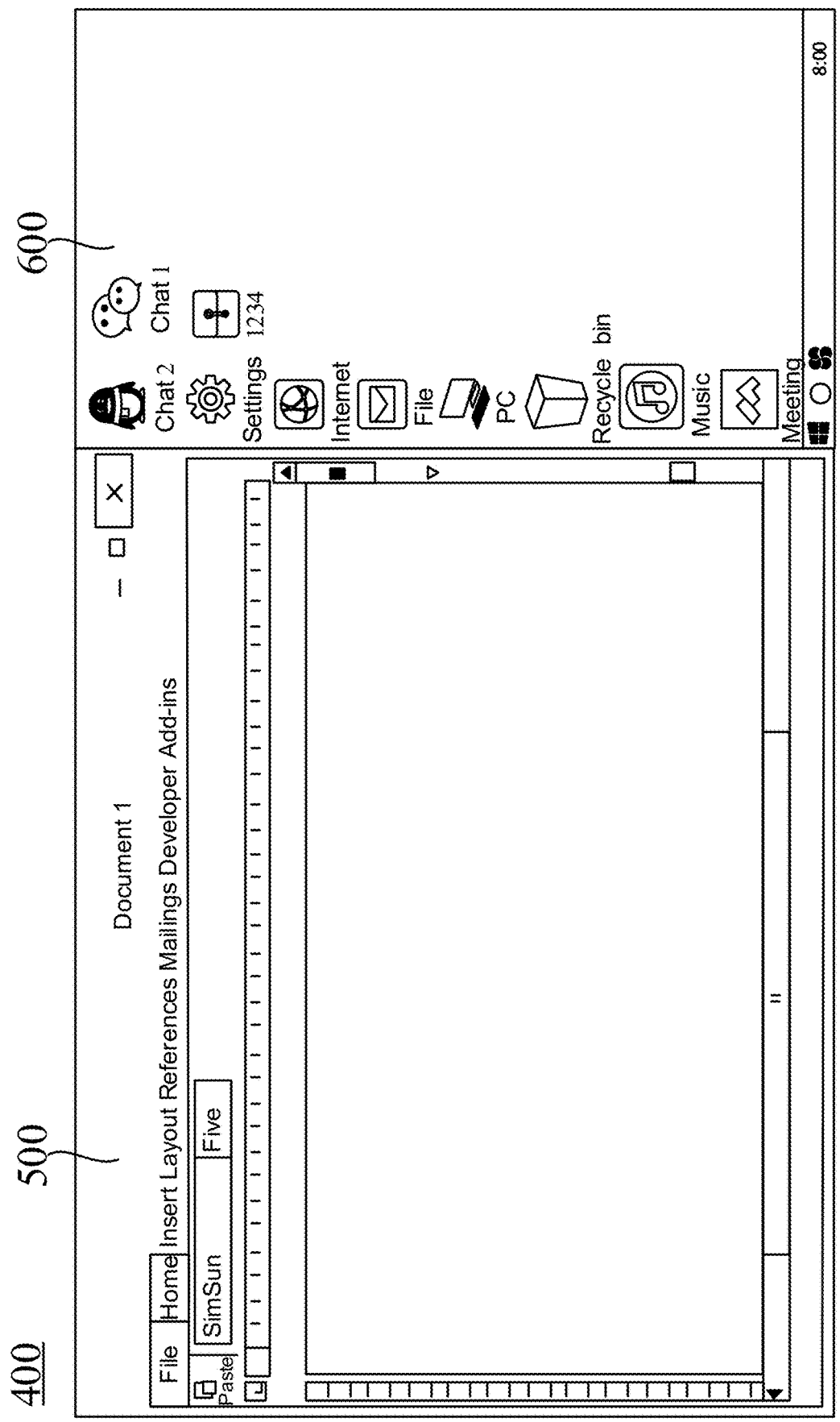
FIG. 17E is an interface diagram of a display system, in accordance with some embodiments.

If the user selects the fourth option message D14, in response to the control instruction corresponding to the fourth option message D14, the second processor 520 may transmit the desktop information of the first display apparatus 500 to the third processor 620. In this case, the interface of the display system 400 is shown in FIG. 17E.

Figure 17F:
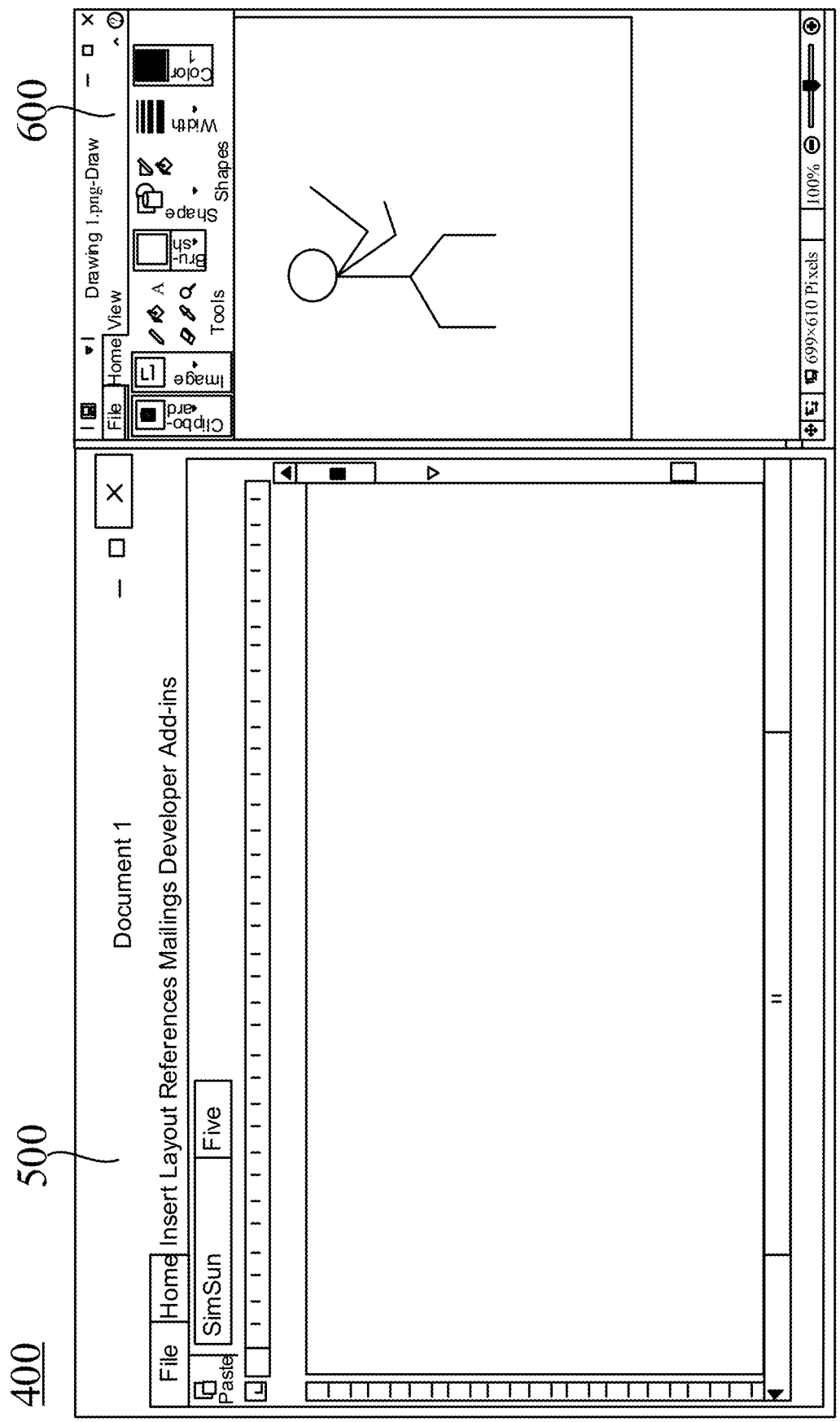
FIG. 17F is an interface diagram of a display system, in accordance with some embodiments.

In some examples, if the user selects the fifth option message D15, the fifth option message D15 may be clicked, and then the second processor 520 may control the first display apparatus 500 to display interface information of one or more application programs other than the current application program from all opened application programs, for the user to select information. For example, the current application program is the text editing program, and after the user clicks on the fifth option message D15, the second processor 520 controls the first display apparatus 500 to display icons of application programs such as a chat program, a photo editing program, and a browser, for the user to select a program. For example, if the user selects the photo editing program, the second processor 520 may transmit interface information of the photo editing program to the third processor 620, and the third processor 620 controls the first scrollable display apparatus 600 to display the interface information of the photo editing program. In this case, the interface of the display system 400 is shown in FIG. 17F.

In a case that the user selects any one from the first option message D11 to the fifth option message D15, the first scrollable display apparatus 600 may display information other than the current interface of the first display apparatus 500, thereby facilitating the user to simultaneously viewing and browsing a plurality of interfaces without changing the current interface of the first display apparatus 500, which is convenient for users to operate. In some examples, the second processor 520 may control the first display apparatus 500 to display any two or more of the first option message D11, the second option message D12, the third option message D13, the fourth option message D14 and the fifth option message D15.

Figure 17G:
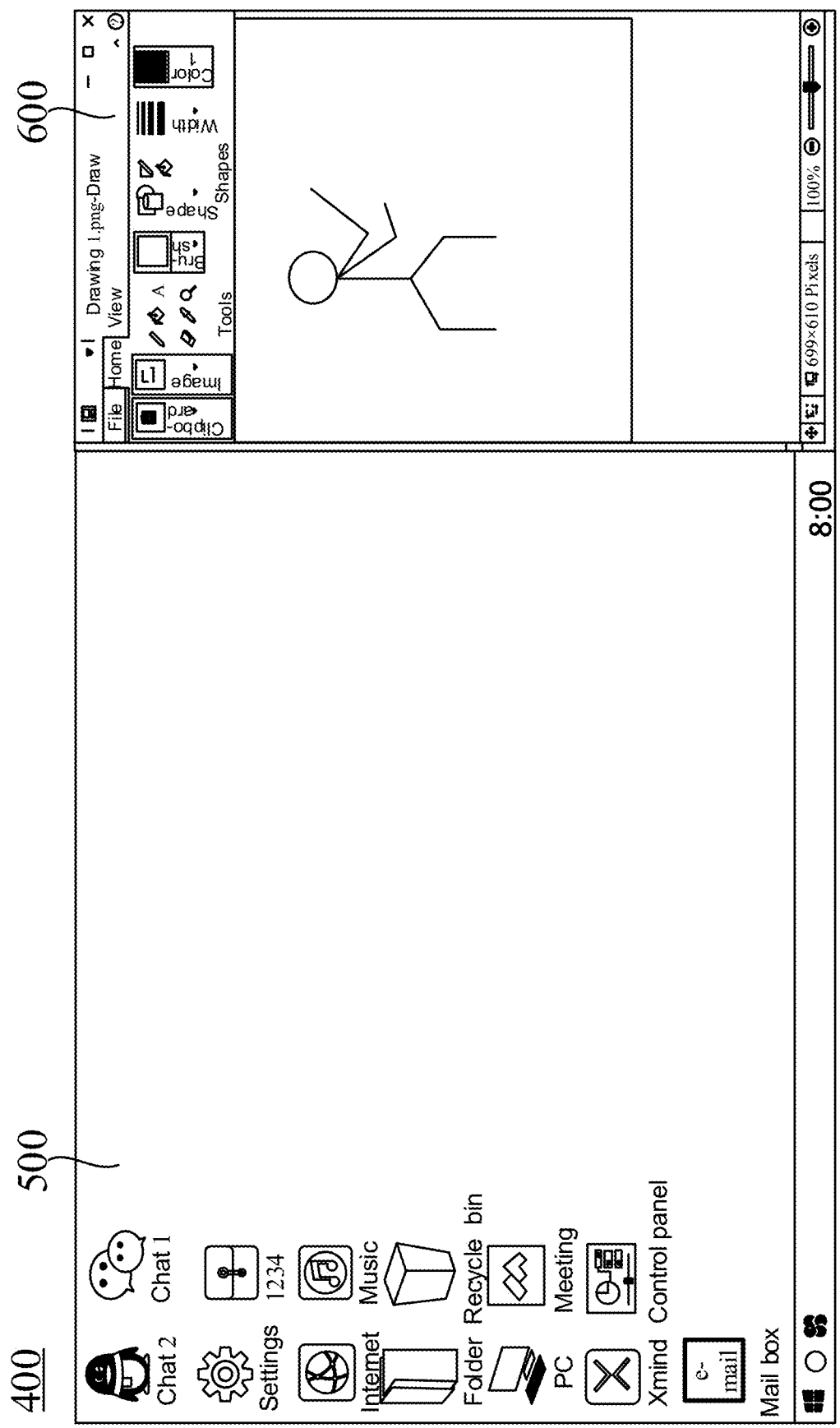
FIG. 17G is an interface diagram of a display system, in accordance with some embodiments.

In the above, the plurality of first extension option messages are illustratively described considering example in which the current interface of the first display apparatus 500 is a certain text editing interface. In some other examples, the current interface of the first display apparatus 500 is desktop information, and interface information on a next layer-level of the current interface is a certain photo editing interface. If the user selects the third option message D13, in response to the control instruction corresponding to the third option message D13, the second processor 520 may transmit interface information of the photo editing interface to the first scrollable display apparatus 600. In this case, the interface of the display system 400 is shown in FIG. 17G.

Figure 18B:
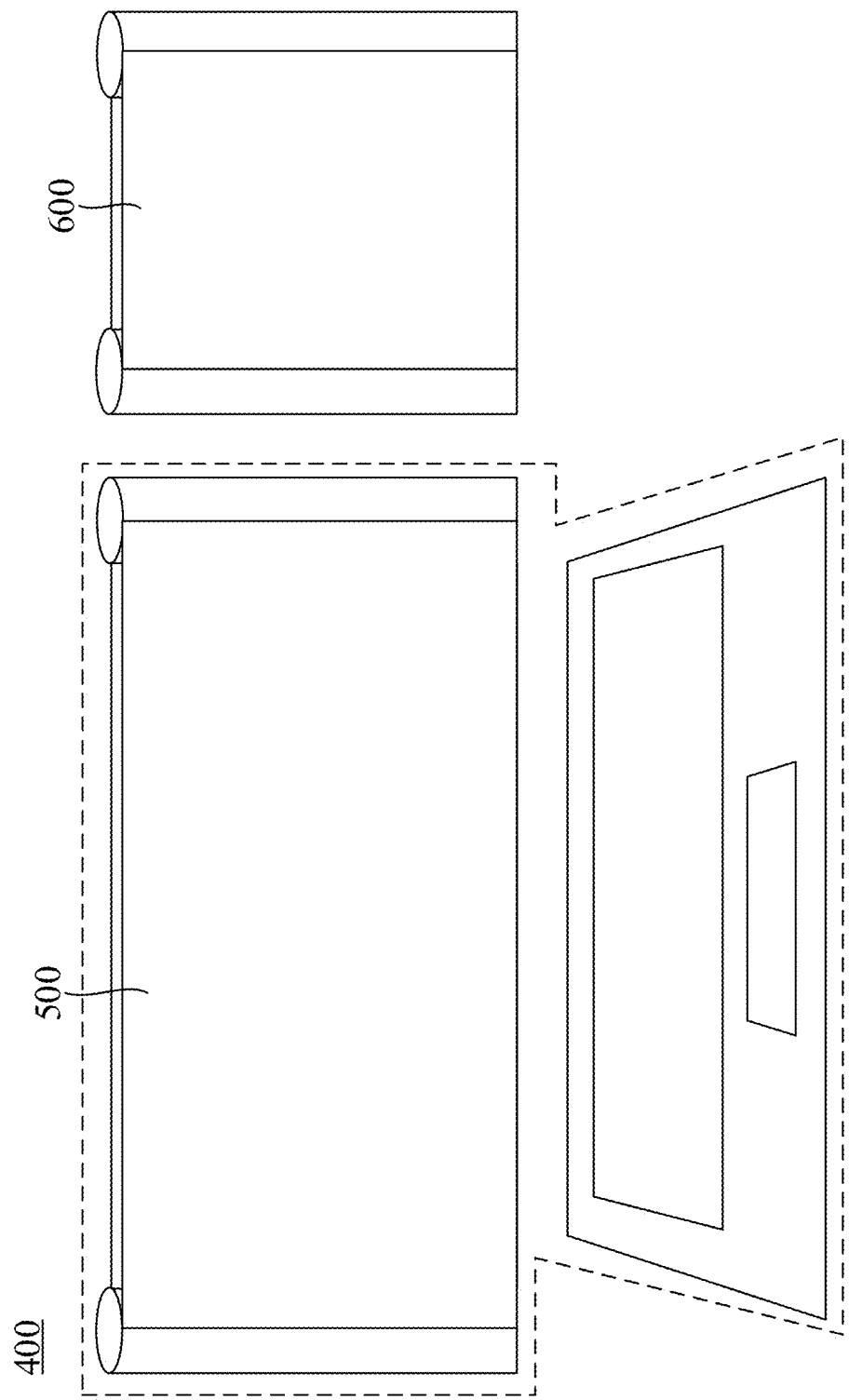
FIG. 18B is a structural diagram of a display system, in accordance with some embodiments.

In some examples, referring to FIG. 18B, the first display apparatus 500 may be a notebook computer, and a display screen of the notebook computer may be a scrollable display apparatus. For example, the display screen may be a scrollable display apparatus having two scrollable display parts. The first scrollable display apparatus 600 may also be a scrollable display apparatus having two scrollable display parts.

Figure 19A:
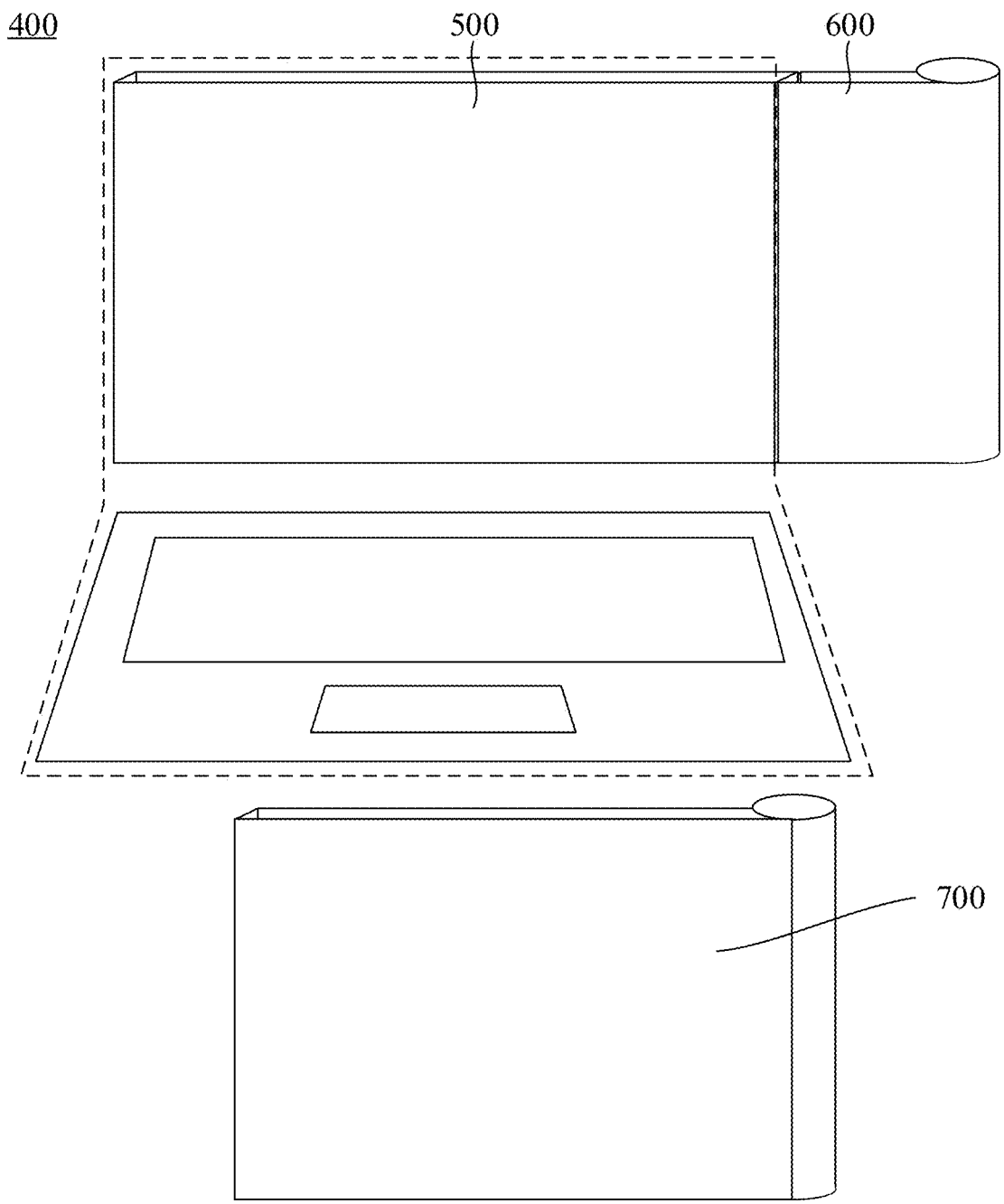
FIG. 19A is a structural diagram of a display system, in accordance with some embodiments.
Figure 19B:
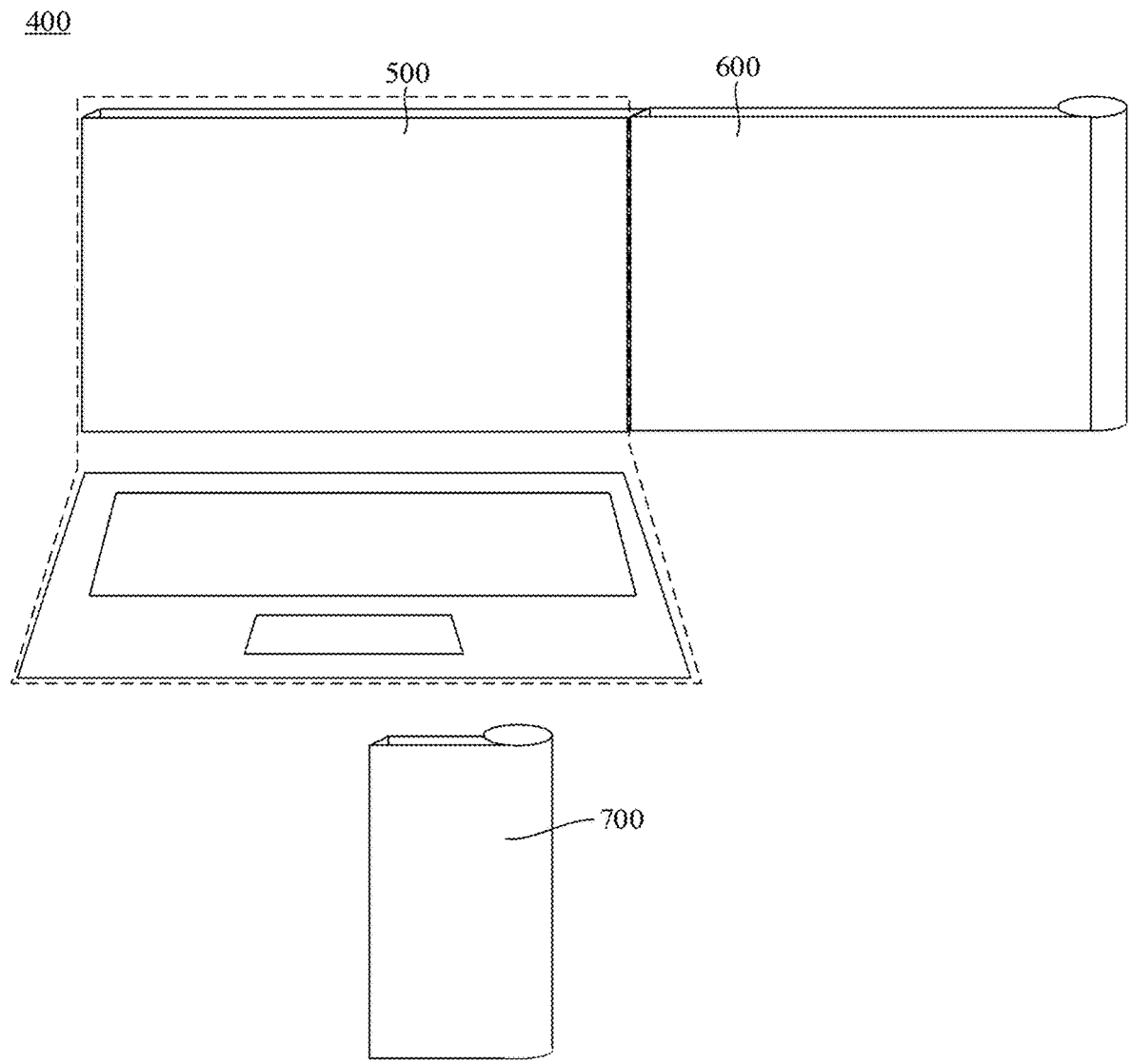
FIG. 19B is a structural diagram of a display system, in accordance with some embodiments.

In some of the above embodiments, the display system 400 includes the first display apparatus 500 and the first scrollable display apparatus 600; in some other embodiments, referring to FIG. 19A and FIG. 19B, the display system 400 further includes a second scrollable display apparatus 700, and the second scrollable display apparatus 700 is coupled to the first display apparatus 500. The first display apparatus 500 is further configured to: in a case that the second connecting part 610 is connected to the first connecting part 510, and an apparatus of the first scrollable display apparatus 600 and the second scrollable display apparatus 700 is in a start-folded state, obtain display information of the apparatus in the start-folded state; and based on the display information, control the other apparatus of the first scrollable display apparatus 600 and the second scrollable display apparatus 700 to be folded to a designated target state, and to display the display information.

Figure 19C:
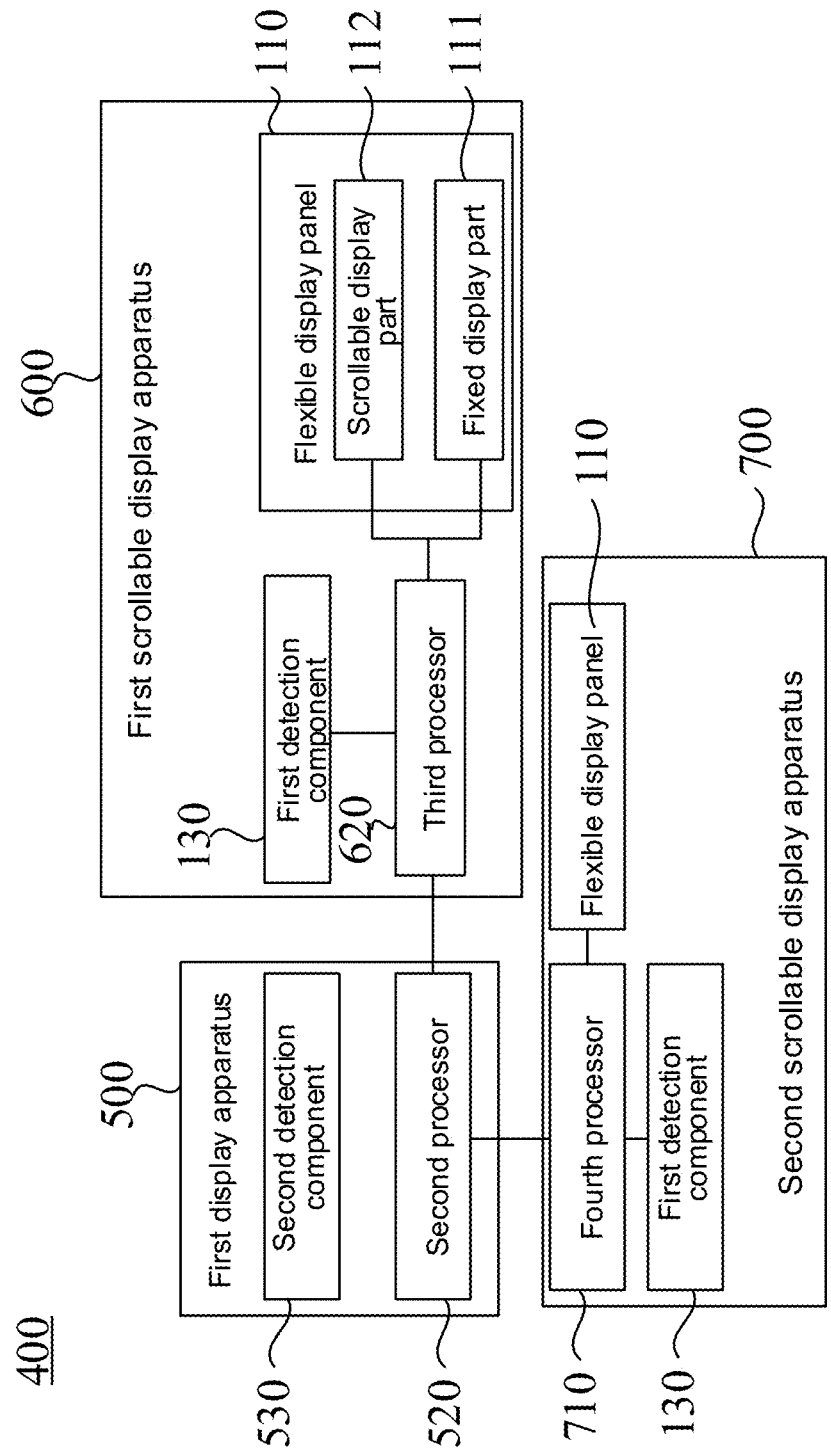
FIG. 19C is a structural diagram of a display system, in accordance with some embodiments.

In some examples, referring to FIG. 19C, the second scrollable display apparatus 700 includes a flexible display panel 110, and the flexible display panel 110 includes a fixed display part 111 and at least one scrollable display part 112. The second scrollable display apparatus 700 further includes at least one first detection component 130 and one or more fourth processors 710.

Here, structures of the flexible display panel 110 and the first detection component 130 in the second scrollable display apparatus 700 are the same as those of the flexible display panel 110 and the first detection component 130 in the scrollable display apparatus 100 in the above embodiments, which will not be described here.

The fourth processor 710 is configured to determine a current state of the second scrollable display apparatus 700 according to a position information of the scrollable display part 112 of the second scrollable display apparatus 700 detected by the first detection component 130, where the current state includes a start-unfolded state and a start-folded state. Here, a process of determining the current state of the scrollable display part 112 of the second scrollable display apparatus 700 by the fourth processor 710 is the same as a process of determining the current state of the scrollable display part 112 by the first processor 140, and will not be repeated here. Since the second scrollable display apparatus 700 includes the scrollable display part 112, the current state of the scrollable display part 112 of the second scrollable display apparatus 700 is the current state of the second scrollable display apparatus 700.

In some examples, the current state of the first scrollable display apparatus 600 further includes a start-folded state. In a case that the scrollable display part 112 is in the start-folded state, an area of a portion of the scrollable display part 112 exposed to an outside gradually decreases.

In some examples, the fourth processor 710 is coupled to the second processor 520 of the first display apparatus 500, and the fourth processor 710 may transmit the current state of the second scrollable display apparatus 700 to the second processor 520.

In some examples, in a case that the second connecting part 610 is connected to the first connecting part 510, if the second scrollable display apparatus 700 is in the start-folded state, the second processor 520 of the first display apparatus 500 may start to obtain display information of the second scrollable display apparatus 700, and then transmit the display information to the first scrollable display apparatus 600, and control the first scrollable display apparatus 600 to be unfolded to a designated target state, simultaneously.

In some other examples, in a case that the second connecting part 610 is connected to the first connecting part 510, if the first scrollable display apparatus 600 is in the start-folded state, the second processor 520 of the first display apparatus 500 may start to obtain display information of the first scrollable display apparatus 600, and then transmit the display information to the second scrollable display apparatus 700, and control the second scrollable display apparatus 700 to be unfolded to a designated target state, simultaneously.

To sum up, the first display apparatus 500 may control the display information of the first scrollable display apparatus 600 or the second scrollable display apparatus 700 according to the states of the first scrollable display apparatus 600 and the second scrollable display apparatus 700, without the need for the user's manual selection, thereby improving intelligence of the display system 400, and improving the convenience and experience of the user.

Alternatively, in some other embodiments, the first display apparatus 500 is further configured: in a case that the second connecting part 610 is connected to the first connecting part 510, and of the first scrollable display apparatus 600 and the second scrollable display apparatus 700, an apparatus is in the start-unfolded state, and the other apparatus is in the start-folded state, obtain display information of the apparatus in the start-unfolded state, and transmits the display information to the apparatus in the start-folded state.

The second processor 520 of the first display apparatus 500 may control the first scrollable display apparatus 600 to display interface information of the second scrollable display apparatus 700 according to the current state of the first scrollable display apparatus 600 and the current state of the second scrollable display apparatus 700, or control the second scrollable display apparatus 700 to display interface information of the first scrollable display apparatus 600.

In a case that the second connecting part 610 is connected to the first connecting part 510, if the first scrollable display apparatus 600 is in the start-unfolded state and the second scrollable display apparatus 700 is in the start-folded state, the second processor 520 of the first display apparatus 500 may obtain the interface information of the second scrollable display apparatus 700, and transmit the interface information of the second scrollable display apparatus 700 to the first scrollable display apparatus 600, so that the first scrollable display apparatus 600 displays the interface information of the second scrollable display 700.

In some other examples, in a case that the second connecting part 610 is connected to the first connecting part 510, if the second scrollable display apparatus 700 is in the start-unfolded state and the first scrollable display apparatus 600 is in the start-folded state, the second processor 520 of the first display apparatus 500 may obtain the interface information of the first scrollable display apparatus 600, and transmit the interface information of the first scrollable display apparatus 600 to the second scrollable display apparatus 700, so that the second scrollable display apparatus 700 displays the interface information of the first scrollable display 600.

To sum up, the first display apparatus 500 may control the display information of the first scrollable display apparatus 600 or the second scrollable display apparatus 700 according to the states of the first scrollable display apparatus 600 and the second scrollable display apparatus 700, without the need for the user's manual selection, thereby improving intelligence of the display system 400, and improving the convenience and experience of the user.

In some of the above embodiments, the second scrollable display apparatus 700 interacts with the first scrollable display apparatus 600 through the first display apparatus 500. In some other implementations, the second scrollable display apparatus 700 and the first scrollable display apparatus 600 may interact directly. In some embodiments, as shown in FIG. 19D, the second scrollable display apparatus 700 is coupled to the first scrollable display apparatus 600; in a case that, of the first scrollable display apparatus 600 and the second scrollable display apparatus 700, an apparatus is in the start-unfolded state, and the other apparatus is in the start-folded state, the apparatus in the start-unfolded state obtains and displays display information of the apparatus in the start-folded state.

Figure 19D:
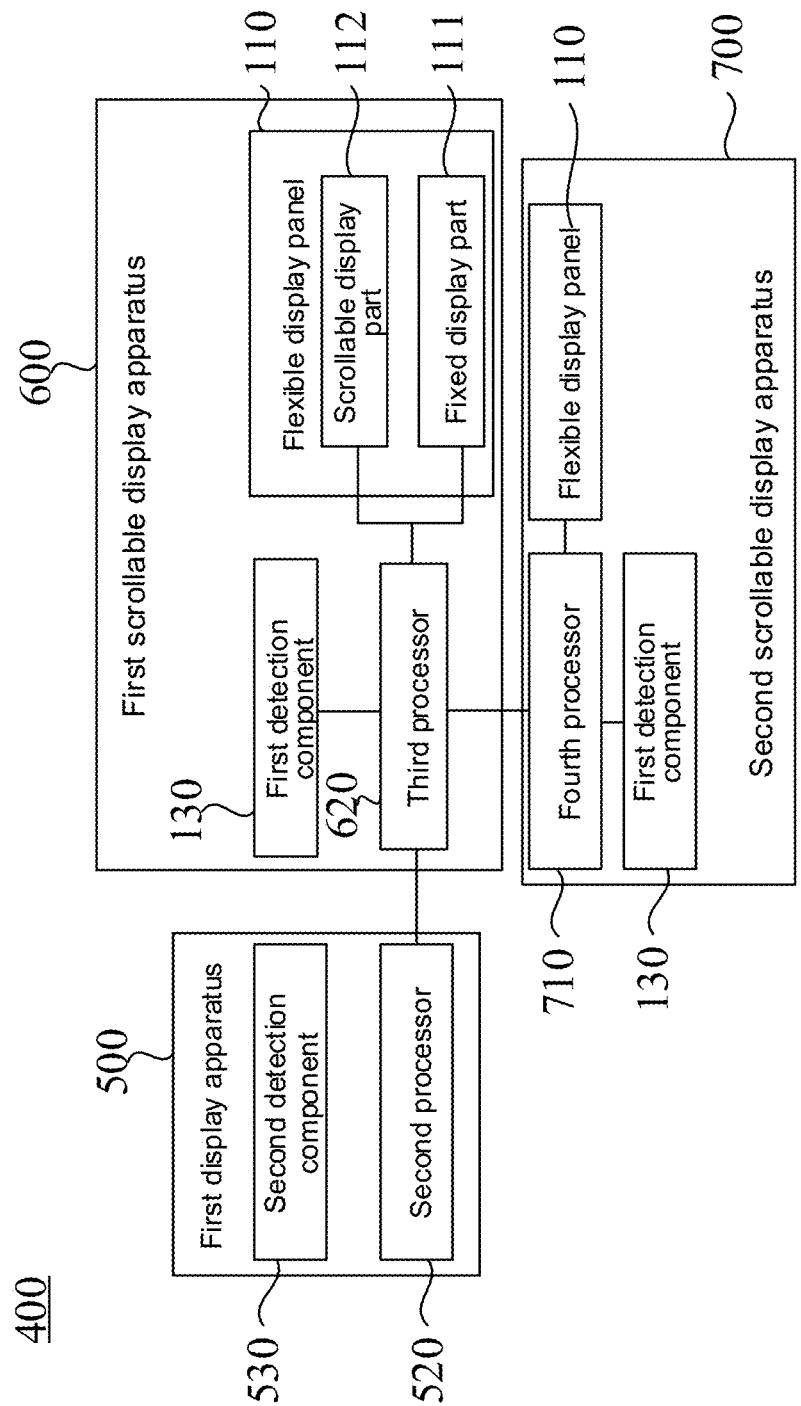
FIG. 19D is a structural diagram of a display system, in accordance with some embodiments.

In some examples, as shown in FIG. 19D, the third processor 620 is coupled to the fourth processor 710. The fourth processor 710 may transmit the current state of the second scrollable display apparatus 700 to the third processor 620. The third processor 620 controls an interaction between the first scrollable display apparatus 600 and the second scrollable display apparatus 700 according to the current state of the first scrollable display apparatus 600 and the current state of the second scrollable display apparatus 700.

In some examples, the third processor 620 may obtain the current states of the first scrollable display apparatus 600 and the second scrollable display apparatus 700. In a case that the second connecting part 610 is connected to the first connecting part 510, if the first scrollable display apparatus 600 is in the start-unfolded state, and the second scrollable display apparatus 700 is in the start-folded state, the third processor 620 may transmit a control command to the fourth processor 710 of the second scrollable display apparatus 700. The fourth processor 710 transmits the interface information of the second scrollable display apparatus 700 to the first scrollable display apparatus 600 according to the control command, and then the first scrollable display apparatus 600 displays the interface information of the second scrollable display apparatus 700. Therefore, the display information of the first scrollable display apparatus 600 may be determined without the need for the user's manual selection, which greatly improves user experience.

In some other examples, in a case that the second connecting part 610 is connected to the first connecting part 510, if the second scrollable display apparatus 700 is in the start-unfolded state, and the first scrollable display apparatus 600 is in the start-folded state, the third processor 620 may transmit a control command to the second scrollable display apparatus 700, and transmit the interface information of the first scrollable display apparatus 600 to the second scrollable display apparatus 700. In response to the control command, the second scrollable display apparatus 700 performs displaying according to the interface information of the first scrollable display apparatus 600, so that the second scrollable display apparatus 700 displays the current interface of the first scrollable display apparatus 600. Therefore, the display information of the second scrollable display apparatus 700 may be determined without the need for the user's manual selection, which greatly improves user experience.

Figure 20:
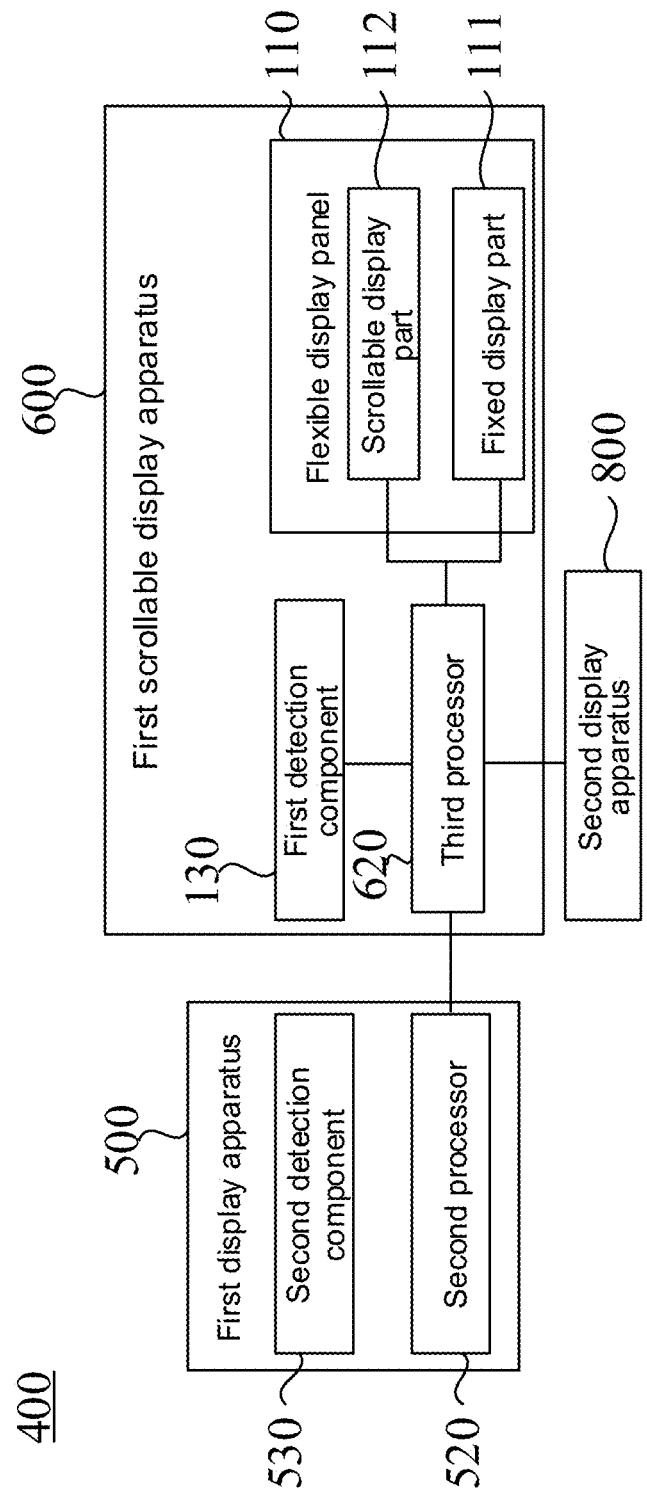
FIG. 20 is a structural diagram of a display system, in accordance with some embodiments.

In some embodiments, referring to FIG. 20, the display system 400 further includes a second display apparatus 800, and the second display apparatus 800 is coupled to the first scrollable display apparatus 600. The second display apparatus 800 is configured to, in a case that the second connecting part 610 is connected to the first connecting part 510, and the first scrollable display apparatus 600 is in the preset state, display a plurality of second extension option messages, where the preset state includes any one of the folded state and the start-unfolded state. The first scrollable display apparatus 600 is configured to, in response to a control instruction corresponding to a selected second extension option message, display extension display information corresponding to the selected second extension option message.

In some embodiments, the second display apparatus 800 may be any product or component having a display function such as an electronic paper LCD (Liquid Crystal Display), an OLED panel, a mobile phone, a tablet computer, a television, a monitor, a notebook computer, a digital photo frame, or a navigator.

Figure 21A:
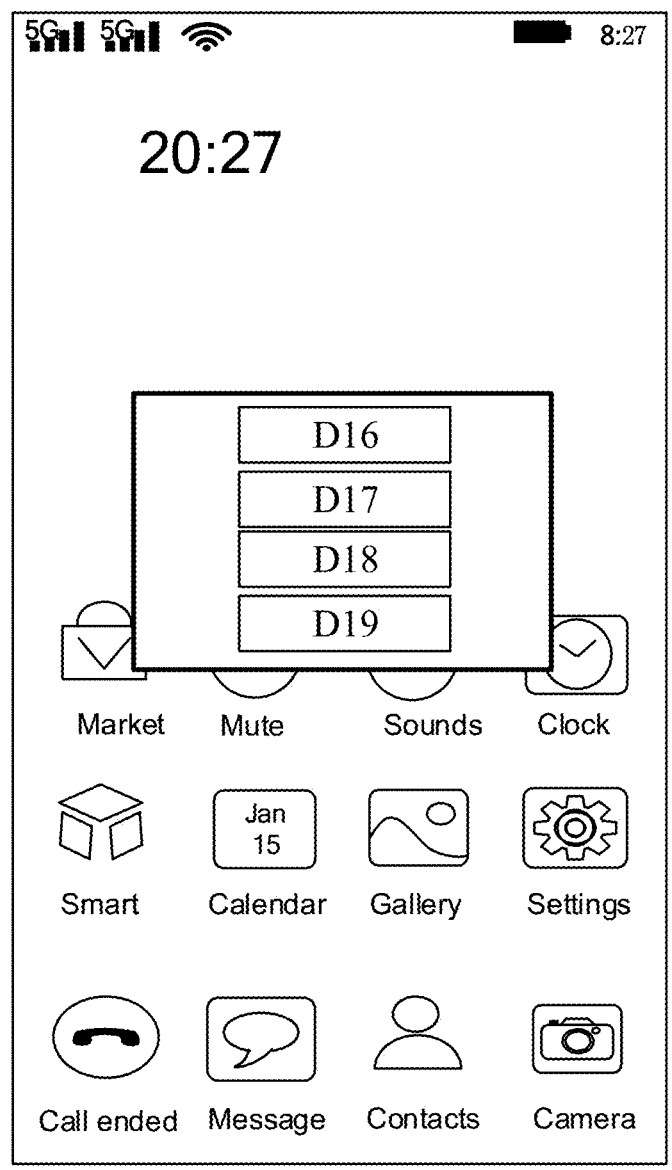
FIG. 21A is an interface diagram of a second display apparatus in a display system, in accordance with some embodiments.

In some examples, in a case that the second connecting part 610 is connected to the first connecting part 510, and the first scrollable display apparatus 600 is in the preset state, the second display apparatus 800 displays the plurality of second option messages. For example, the second display apparatus 800 is a mobile phone. In this case, an interface of the second display apparatus 800 is shown in FIG. 21A. In FIG. 21A, D16 to D19 represent the plurality of second extension option messages.

The second display apparatus 800 may transmit the extension display information corresponding to the selected second extension option message to the first scrollable display apparatus 600 according to the control instruction corresponding to the second extension option message selected by the user. The first scrollable display apparatus 600 performs displaying according to the received selected second option message, so that the first scrollable display apparatus 600 displays the extension display information corresponding to the selected second option message.

The display information may be transmitted to the first scrollable display apparatus 600 through the second display apparatus 800. Therefore, it enables the user to operate the interface of the first display apparatus 500 while browsing information of other apparatuses without changing the apparatus, greatly improving the convenience of the user's work.

In some embodiments, the second extension option messages include any one or more of a sixth option message D16, a seventh option message D17, an eighth option message D18, and a ninth option message D19. The first scrollable display apparatus 600 is configured to: in response to a control instruction corresponding to the sixth option message D16, display interface information on a next layer-level of a current interface of the second display apparatus 800; or in response to a control instruction corresponding to the seventh option message D17, display interface information on a previous layer-level of the current interface of the second display apparatus 800; or in response to a control instruction corresponding to the eighth option message D18, display desktop information of the second display apparatus 800; or in response to a control instruction corresponding to the ninth option message D19, display interface information of any application program other than a current application program from all opened application programs on the second display apparatus 800.

Hereinafter, considering example in which the current interface of the first display apparatus 500 is a certain text editing interface, and the second display apparatus 800 is a mobile phone, the sixth option message D16, the seventh option message D17, the eighth option message D18, and the ninth option message D19 will be illustratively described.

In some examples, in a case that the second connecting part 610 is connected to the first connecting part 510, and the first scrollable display apparatus 600 is in the preset state, the second display apparatus 800 displays the sixth option message D16 and the seventh option message D17, the eighth option message D18, and the ninth option message D19. For example, in this case, the interface of the second display apparatus 800 is shown in FIG. 21A.

Figure 21B:
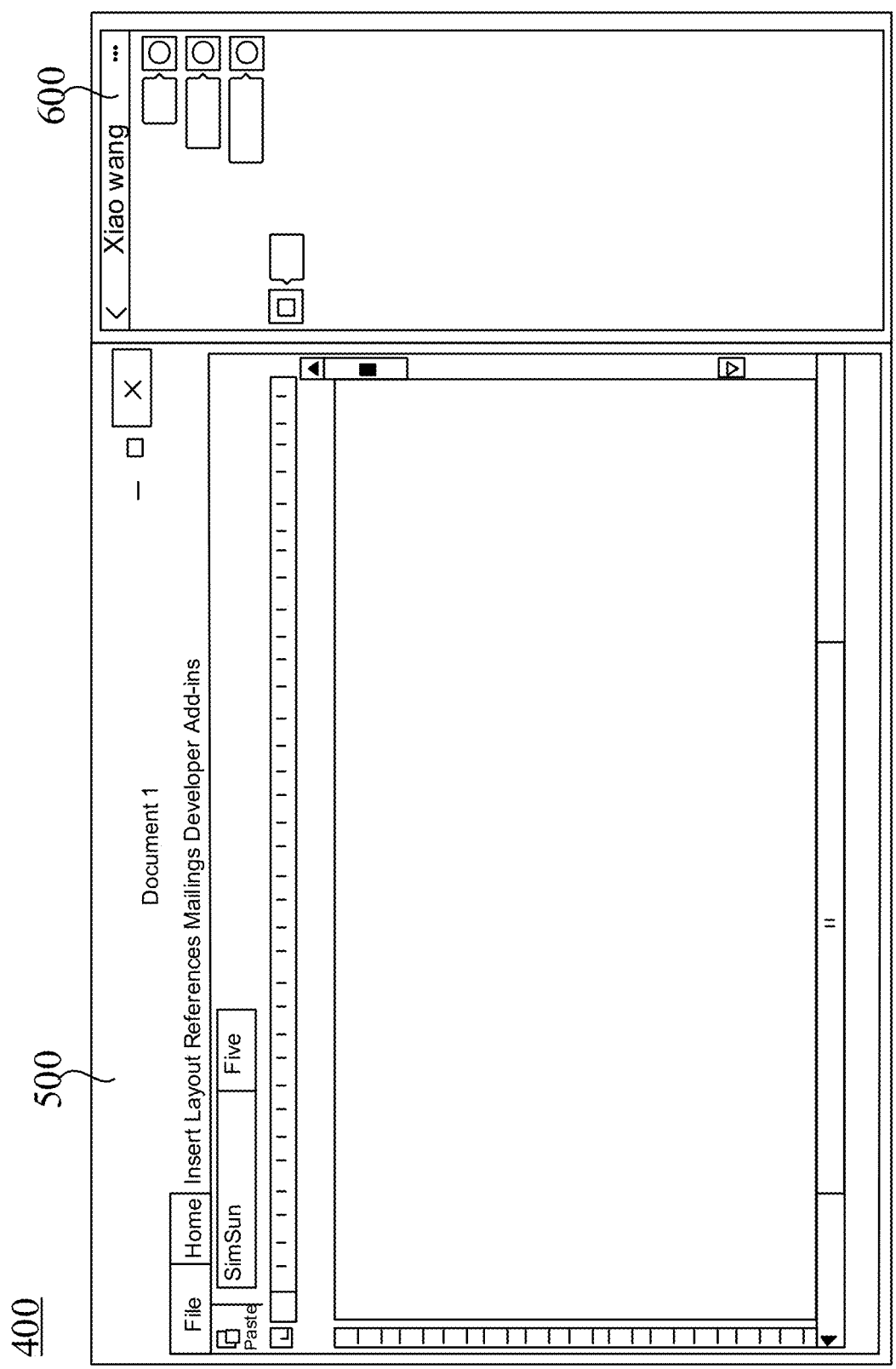
FIG. 21B is an interface diagram of a display system, in accordance with some embodiments.

If the user selects the sixth option message D16, the second display apparatus 800 will transmit the interface information on the next layer-level of the second display apparatus 800 to the first scrollable display apparatus 600. For example, the current interface of the second display apparatus 800 is a chat list interface of a chat application program, and the interface information on the next layer-level of the second display apparatus 800 is a chat interface with someone. In this case, the interface of the display system 400 is shown in FIG. 21B.

Figure 21C:
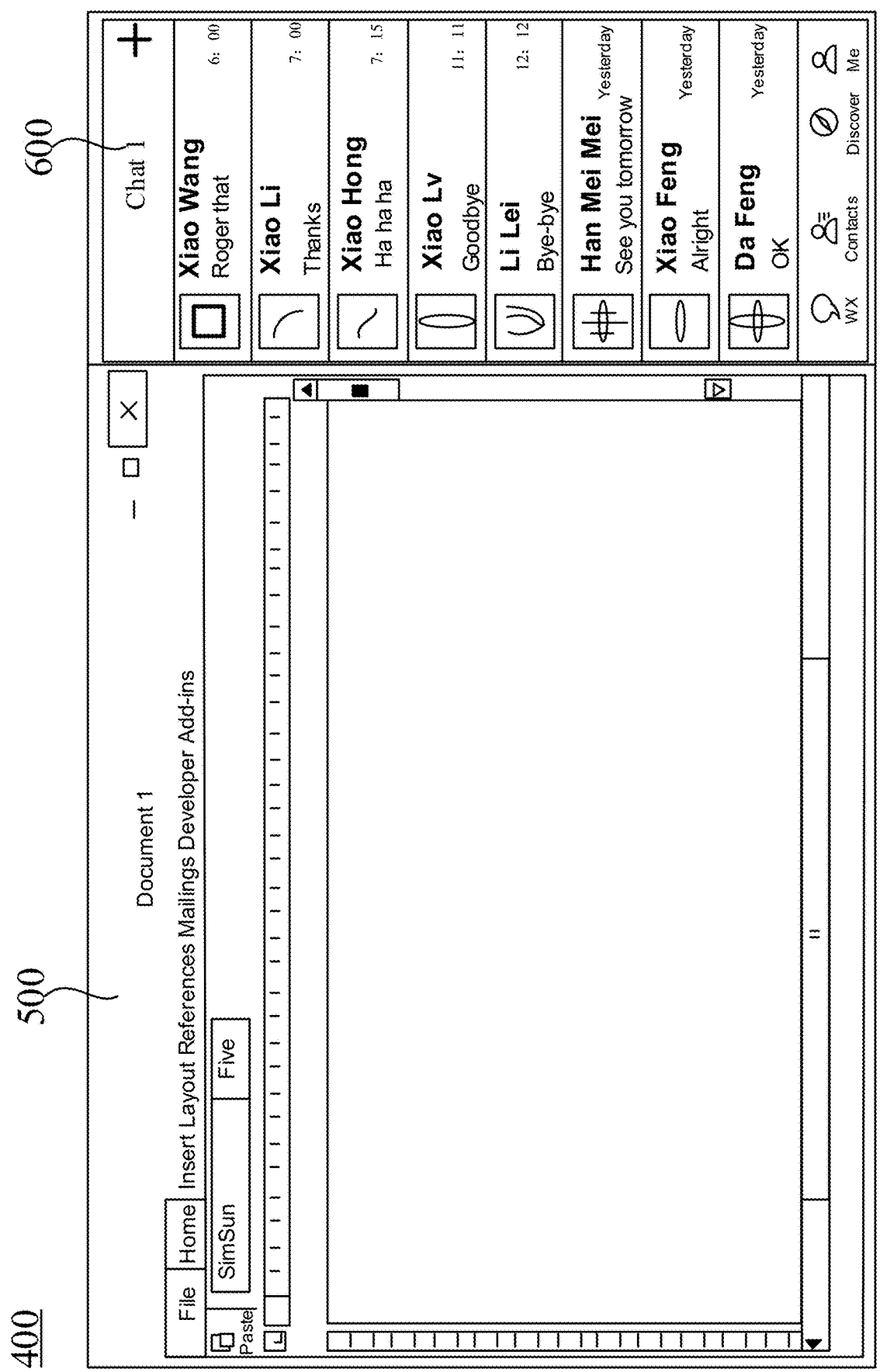
FIG. 21C is an interface diagram of a display system, in accordance with some embodiments.

If the user selects the seventh option message D17, the second display apparatus 800 will transmit the interface information on the previous layer-level of the second display apparatus 800 to the first scrollable display apparatus 600. For example, the current interface of the second display apparatus 800 is a chat interface with someone, and the interface information on the next layer-level of the second display apparatus 800 is a chat list interface of a chat application program. In this case, the interface of the display system 400 is shown in FIG. 21C.

Figure 21D:
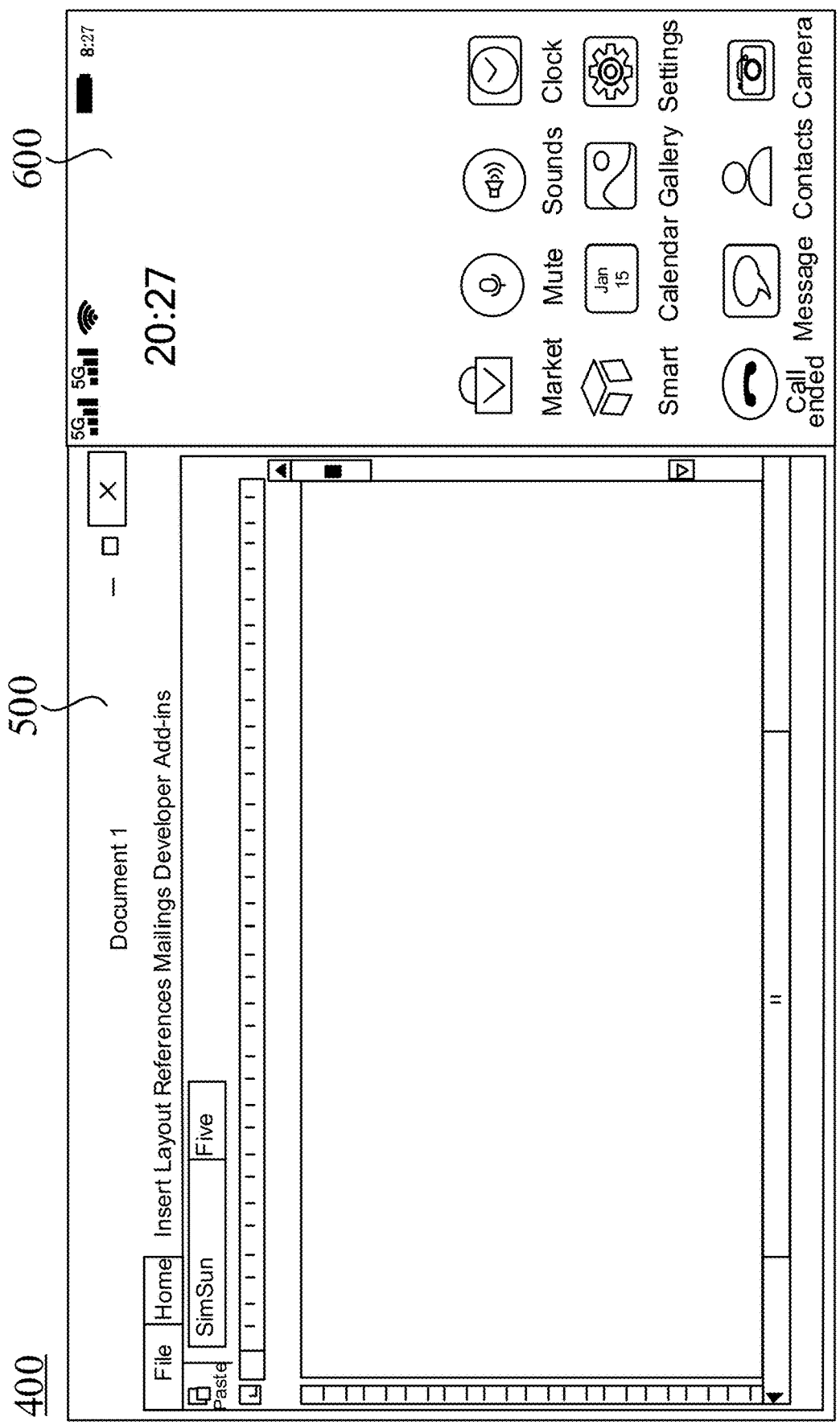
FIG. 21D is an interface diagram of a display system, in accordance with some embodiments.

If the user selects the eighth option message D18, the second display apparatus 800 will transmit the desktop information of the second display apparatus 800 to the first scrollable display apparatus 600. In this case, the interface of the display system 400 is shown in FIG. 21D.

Figure 21E:
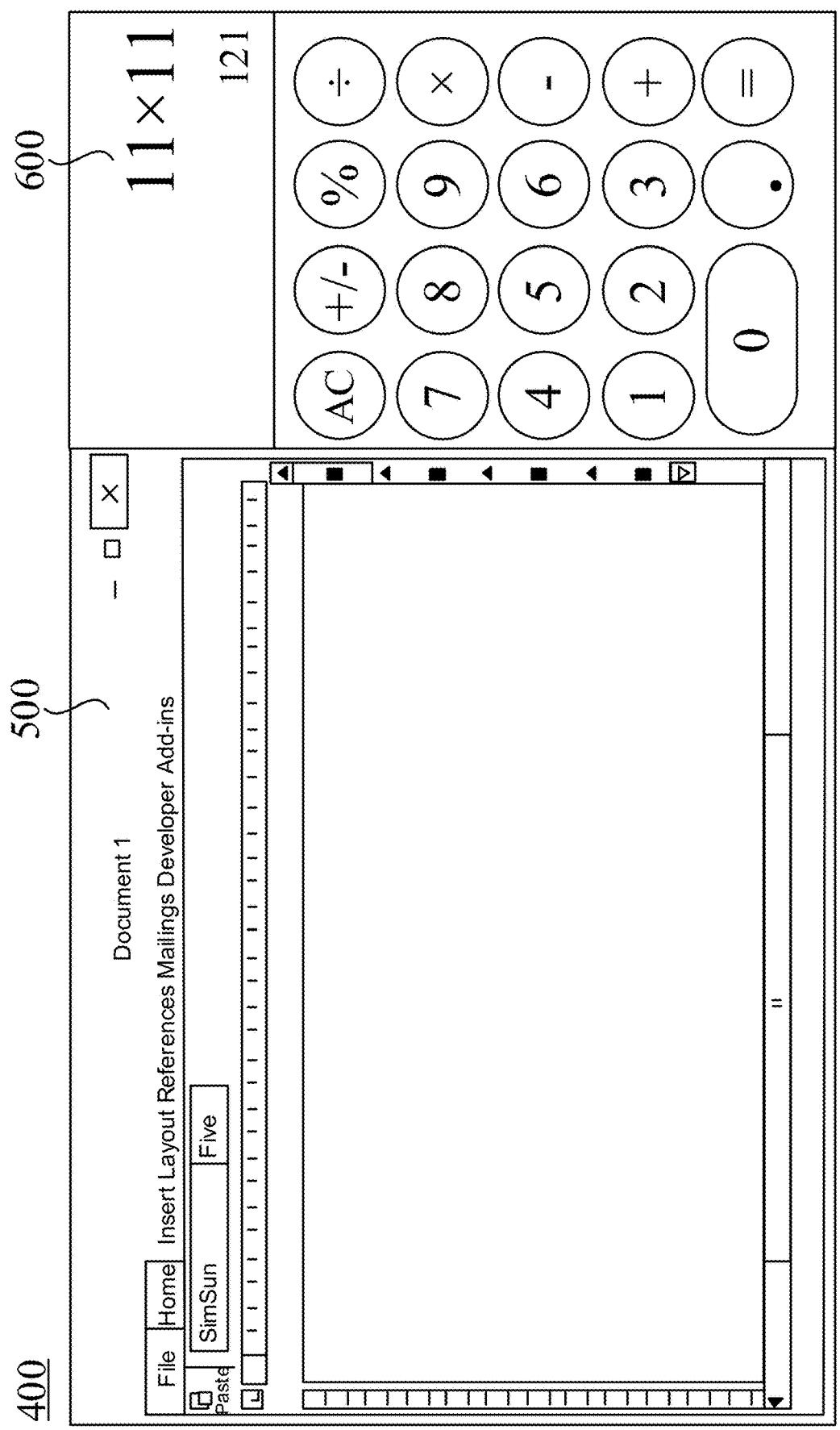
FIG. 21E is an interface diagram of a display system, in accordance with some embodiments.

If the user selects the ninth option message D19, the second display apparatus 800 will transmit the interface information of any application program other than a current application program from all opened application programs on the second display apparatus to the first scrollable display apparatus 600. For example, the current interface of the second display apparatus 800 is a certain chat application program, and in addition to the chat application program, a short video player program, a setting program and a calculator program are opened on the second display apparatus 800. The user may select to transmit an interface information of the calculator program to the first scrollable display apparatus 600. In this case, the interface of the display system 400 is shown in FIG. 21E.

To sum up, in a case that the user selects any one from the sixth option message D16 to the ninth option message D19, corresponding information of the second display apparatus 800 may be displayed on the first scrollable display apparatus 600. Therefore, it enables the user to operate the first display apparatus 500 while viewing and browsing information of the second display apparatus 800 without changing the apparatus, greatly improving the convenience of the user's work.

In some other embodiments, the second display apparatus 800 may be a scrollable display apparatus.

Figure 22:
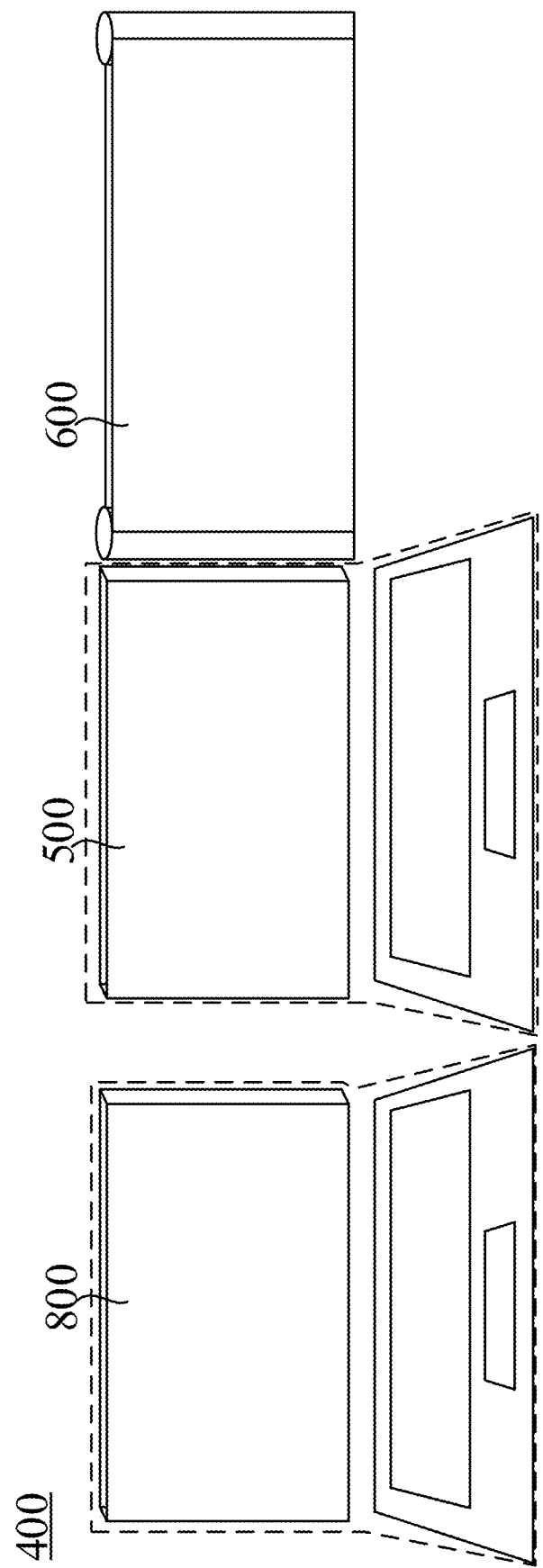
FIG. 22 is a structural diagram of a display system, in accordance with some embodiments.

In some examples, referring to FIG. 22, the second display apparatus 800 may be a notebook computer, and the first display apparatus 500 may also be a notebook computer. In some other examples, the second display apparatus 800 and the first display apparatus 500 may also be other display apparatuses, which are not specifically limited here.

Some embodiments of the present disclosure provide an interaction method of a display system, which is used in the display system 400 provided in some of the above embodiments. Referring to FIG. 16A and FIG. 16B, the display system 400 includes a first display apparatus 500 and at least one first scrollable display apparatus 600. The first display apparatus 500 includes a first connecting part 510, and the first scrollable display apparatus 600 includes a second connecting part 610.

Referring to FIG. 16C, the interaction method of the display system includes the following steps S01 and S02.

S01, in a case that the second connecting part 610 is connected to the first connecting part 510, and the first scrollable display apparatus 600 is in a preset state, displaying, by the first display apparatus 500, a plurality of first extension option messages, where the preset state includes any one of a folded state and a start-unfolded state.

S02, in response to a control instruction corresponding to a selected first extension option message, displaying, by the first scrollable display apparatus 600, extension display information corresponding to the selected first extension option message.

Different first extension option messages correspond to different pieces of extension display information. Referring to FIG. 16C, before S02, in response to a control instruction corresponding to a selected first extension option message, displaying, by the first scrollable display apparatus 600, extension display information corresponding to the selected first extension option message, the interaction method of the display system further includes: S011, generating, by the first display apparatus 500, a corresponding control instruction according to the selected first extension option message; and S012, transmitting, by the first display apparatus 500, the display information corresponding to the selected first extension option message to a third processor 620 of the first scrollable display apparatus 600 according to the control instruction corresponding to the selected first extension option message. Then the first scrollable display apparatus 600 may display the extension display information corresponding to the selected first extension option message according to display information corresponding to the selected first extension option message.

In the interaction method of the display system provided by some embodiments of the present disclosure, in a case that the first connecting part 510 is connected to the second connecting part 610, and the first scrollable display apparatus 600 is in the preset state, the first display apparatus 500 provides the plurality of first extension option messages for the user to select a message, and then the first scrollable display apparatus 600 is controlled to display a corresponding information according to a first extension option message selected by the user. Therefore, there is no need for the user to determine the state of the first scrollable display apparatus 600, and according to a connection state of the first connecting part 510 and the second connecting part 610, and the state of the first scrollable display apparatus 600, the first display apparatus 500 may provide the plurality of first extension option messages for the user in time for selection, which brings a good user experience to the user.

In some embodiments, S02, in response to a control instruction corresponding to a selected first extension option message, displaying, by the first scrollable display apparatus 600, extension display information corresponding to the selected first extension option message, includes: if it is determined that the scrollable display part 112 is in a designated target state or upon receipt of a control instruction causing the scrollable display part 112 to be unfolded to the designated target state, in response to the control instruction corresponding to the selected first extension option message, displaying, by the first scrollable display apparatus 600, the extension display information corresponding to the selected first extension option message, where the designated target state is one of at least one target state.

In some examples, in a case that the scrollable display part 112 is unfolded to the designated target state, in response to the control instruction corresponding to the first extension option message selected by the user, the first scrollable display apparatus 600 will display the extension display information corresponding to the selected first extension option message. Before the scrollable display part 112 is unfolded to the designated target state, the scrollable display part 112 does not display images, thereby reducing load on a battery of the first scrollable display apparatus 600.

In some examples, referring to FIG. 18A, the interaction method of the display system further includes: S013, in a case that the first scrollable display apparatus 600 is unfolded to the designated target state, transmitting, by the first scrollable display apparatus 600, a resolution ratio of the first scrollable display apparatus 600 to the first display apparatus 500;

S014, adjusting, by the first display apparatus 500, the extension display information corresponding to the selected first extension option message according to the resolution ratio of the first scrollable display apparatus 600; and S015, transmitting, by the first display apparatus 500, the adjusted extension display information corresponding to the selected first extension option message to the first scrollable display apparatus 600.

S02, in response to a control instruction corresponding to a selected first extension option message, displaying, by the first scrollable display apparatus 600, extension display information corresponding to the selected first extension option message, includes: S021, in response to the control instruction corresponding to the selected first extension option message, displaying, by the first scrollable display apparatus 600, the adjusted extension display information corresponding to the selected first extension option message.

Here, the extension display information may be adjusted according to the resolution ratio of the first scrollable display apparatus 600, so in a case that the resolution ratio of the first scrollable display apparatus 600 is different from that of the first display apparatus 500, the resolution ratio of the first scrollable display apparatus 600 may adapt to the interface information of the first display apparatus 500, thereby making the interface of the first display apparatus 500 displayed on the first scrollable display apparatus 600 appropriate.

In some other examples, after receiving the control instruction causing the scrollable display part 112 to be unfolded to the designated target state, in response to the control instruction corresponding to the first extension option message selected by the user, the first scrollable display apparatus 600 displays the extension display information corresponding to the selected first extension option message. Therefore, before the scrollable display part 112 is unfolded to the designated target state, the scrollable display part 112 has displayed a corresponding image, and the display image may be gradually exposed during a process of unfolding the scrollable display part 112. Therefore, continuous experience of the user will not be interrupted during the process of unfolding the scrollable display part 112, and the user may get a strong sense of fashion and technology, thereby bringing the user a good visual and user experience.

In some examples, the interaction method of the display system further includes: after receiving the control instruction causing the scrollable display part 112 to be unfolded to the designated target state, transmitting, by the first scrollable display apparatus 600, the resolution ratio of the first scrollable display apparatus 600 to the first display apparatus 500.

In some embodiments, the interaction method of the display system further includes: in response to the control instruction corresponding to the selected first extension option message, controlling, by the first scrollable display apparatus 600, the scrollable display part 112 to be unfolded to the designated target state.

The scrollable display part 112 of the first scrollable display apparatus 600 may be unfolded to different target states according to a display image corresponding to the first extension option message, and the scrollable display part 112 has different display areas in the different target states. Therefore, the extension display information displayed on the first scrollable display apparatus 600 has a good display effect, and battery power of the first scrollable display apparatus 600 may be used reasonably.

In some embodiments, the plurality of first extension option messages D10 include any one or more of a first option message D11, a second option message D12, a third option message D13, a fourth option message D14, and a fifth option message D15. S02, in response to a control instruction corresponding to a selected first extension option message, displaying, by the first scrollable display apparatus 600, extension display information corresponding to the selected first extension option message, includes: in response to a control instruction corresponding to the first option message D11, displaying, by the first scrollable display apparatus 600, a current interface of the first display apparatus 500 together with the first display apparatus 500; or in response to a control instruction corresponding to the second option message D12, displaying, by the first scrollable display apparatus 600, interface information on a next layer-level of the current interface of the first display apparatus 500; or in response to a control instruction corresponding to the third option message D13, displaying, by the first scrollable display apparatus 600, interface information on a previous layer-level of the current interface of the first display apparatus 500; or in response to a control instruction corresponding to the fourth option message D14, displaying, by the first scrollable display apparatus 600, desktop information of the current interface of the first display apparatus 500; or in response to a control instruction corresponding to the fifth option message D15, displaying, by the first scrollable display apparatus 600, interface information of any application program other than a current application program from all opened application programs on the first display apparatus 500.

In a case that the user selects the first option message D11, the first scrollable display apparatus 600 and the first display apparatus 500 display the current interface of the first display apparatus 500 together. That is, the current interface of the first display apparatus 500 is enlarged, which is convenient for the user to view and browse the current interface of the first display apparatus 500. In a case that the user selects any one from the first option message D11 to the fifth option message D15, the first scrollable display apparatus 600 may display information other than the current interface of the first display apparatus 500, thereby facilitating the user to simultaneously viewing and browsing a plurality of interfaces without changing the current interface of the first display apparatus 500, which is convenient for users to operate.

The above describes the interaction method of the display system in a case that the display system 400 includes the first display apparatus 500 and the first scrollable display apparatus 600. In some other embodiments, referring to FIG. 19A and FIG. 19B, the display system 400 further includes a second scrollable display apparatus 700, and the second scrollable display apparatus 700 is coupled to the first display apparatus 500. The interaction method of the display system further includes: in a case that the second connecting part 610 is connected to the first connecting part 510, and an apparatus of the first scrollable display apparatus 600 and the second scrollable display apparatus 700 is in a start-folded state, obtaining, by the first display apparatus 500, display information of the apparatus in the start-folded state; and based on the display information, controlling, by the first display apparatus 500, the other apparatus of the first scrollable display apparatus 600 and the second scrollable display apparatus 700 to be folded to a designated target state, and to display the display information.

The first display apparatus 500 may control the display information of the first scrollable display apparatus 600 or the second scrollable display apparatus 700 according to the states of the first scrollable display apparatus 600 and the second scrollable display apparatus 700, without the need for the user's manual selection, thereby improving intelligence of the display system 400, and improving the convenience and experience of the user.

Alternatively, in some other embodiments, the interaction method of the display system further includes: in a case that the second connecting part 610 is connected to the first connecting part 510, and of the first scrollable display apparatus 600 and the second scrollable display apparatus 700, an apparatus is in the start-unfolded state, and the other apparatus is in the start-folded state, obtaining, by the first display apparatus 500, display information of the apparatus in the start-unfolded state, and transmitting, by the first display apparatus 500, the display information to the apparatus in the start-folded state. Here, the first display apparatus 500 may control the display information of the first scrollable display apparatus 600 or the second scrollable display apparatus 700 according to the states of the first scrollable display apparatus 600 and the second scrollable display apparatus 700, without the need for the user's manual selection, thereby improving intelligence of the display system 400, and improving the convenience and experience of the user.

Alternatively, in some other embodiments, the second scrollable display apparatus 700 is coupled to the first scrollable display apparatus 600. The interaction method of the display system further includes: in a case that, of the first scrollable display apparatus 600 and the second scrollable display apparatus 700, an apparatus is in the start-unfolded state, and the other apparatus is in the start-folded state, obtaining and displaying, by the apparatus in the start-unfolded state, display information of the apparatus in the start-folded state.

In this way, the display information of the first scrollable display apparatus 600 and the second scrollable display apparatus 700 may be determined, without the need for the user's manual selection, thereby greatly improving the experience of the user.

In some embodiments, referring to FIG. 20, the display system 400 further includes a second display apparatus 800, and the second display apparatus 800 is coupled to the first scrollable display apparatus 600. The interaction method of the display system further includes: in a case that the second connecting part 610 is connected to the first connecting part 510, and the first scrollable display apparatus 600 is in the preset state, displaying, by the second display apparatus 800, a plurality of second extension option messages, where the preset state includes any one of the folded state and the start-unfolded state; and in response to a control instruction corresponding to a selected second extension option message, displaying, by the first scrollable display apparatus 600, extension display information corresponding to the selected second extension option message.

The display information may be transmitted to the first scrollable display apparatus 600 through the second display apparatus 800. Therefore, it enables the user to operate the interface of the first display apparatus 500 while browsing information of other apparatuses without changing the apparatus, greatly improving the convenience of the user's work.

In some embodiments, the second extension option messages include any one or more of a sixth option message D16, a seventh option message D17, an eighth option message D18, and a ninth option message D19. S02, in response to a control instruction corresponding to a selected first extension option message, displaying, by the first scrollable display apparatus 600, extension display information corresponding to the selected first extension option message, includes: in response to a control instruction corresponding to the sixth option message D16, displaying, by the first scrollable display apparatus 600, interface information on a next layer-level of a current interface of the second display apparatus 800; or in response to a control instruction corresponding to the seventh option message D17, displaying, by the first scrollable display apparatus 600, interface information on a previous layer-level of the current interface of the second display apparatus 800; or in response to a control instruction corresponding to the eighth option message D18, displaying, by the first scrollable display apparatus 600, desktop information of the second display apparatus 800; or in response to a control instruction corresponding to the ninth option message D19, displaying, by the first scrollable display apparatus 600, interface information of any application program other than a current application program from all opened application programs on the second display apparatus 800.

In a case that the user selects any one from the sixth option message D16 to the ninth option message D19, corresponding information of the second display apparatus 800 may be displayed on the first scrollable display apparatus 600. Therefore, it enables the user to operate the first display apparatus 500 while viewing and browsing information of the second display apparatus 800 without changing the apparatus, greatly improving the convenience of the user's work.

Some embodiments of the present disclosure provide a computer-readable storage medium (e.g., a non-transitory computer-readable storage medium). The computer-readable storage medium has stored a computer program instruction. When run on the scrollable display apparatus, the computer program instruction causes the scrollable display apparatus to perform the control method of the scrollable display apparatus as described in any of the above embodiments; or when run on the first display apparatus, the computer program instruction causes the first display apparatus 500 to perform a method performed by the first display apparatus as described in any of the above embodiments; or when run on the second display apparatus 800, the computer program instruction causes the second display apparatus 800 to perform a method performed by the second display apparatus as described in any of the above embodiments; or when run on the first scrollable display apparatus 600, the computer program instruction causes the first scrollable display apparatus 600 to perform a method performed by the first scrollable display apparatus 600 as described in any of the above embodiments; or when run on the second scrollable display apparatus 700, the computer program instruction causes the second scrollable display apparatus 700 to perform a method performed by the second scrollable display apparatus 700 as described in any of the above embodiments.

For example, the computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

Some embodiments of the present disclosure provide a computer program product, which is stored on, for example, a non-transitory computer-readable storage medium. The computer program product includes a computer program instruction. When run on the scrollable display apparatus 100, the computer program instruction causes the scrollable display apparatus 100 to perform the control method of the scrollable display apparatus 100 as described in any of the above embodiments; or when run on the first display apparatus 500, the computer program instruction causes the first display apparatus 500 to perform a method performed by the first display apparatus 500 as described in any of the above embodiments; or when run on the second display apparatus 800, the computer program instruction causes the second display apparatus 800 to perform a method performed by the second display apparatus 800 as described in any of the above embodiments; or when run on the first scrollable display apparatus 600, the computer program instruction causes the first scrollable display apparatus 600 to perform a method performed by the first scrollable display apparatus 600 as described in any of the above embodiments; or when run on the second scrollable display apparatus 700, the computer program instruction causes the second scrollable display apparatus 700 to perform a method performed by the second scrollable display apparatus 700 as described in any of the above embodiments.

Some embodiments of the present disclosure provide a computer program. When run on the scrollable display apparatus 100, the computer program causes the scrollable display apparatus 100 to perform the control method of the scrollable display apparatus 100 as described in any of the above embodiments; or when run on the first display apparatus 500, the computer program causes the first display apparatus 500 to perform a method performed by the first display apparatus 500 as described in any of the above embodiments; or when run on the second display apparatus 800, the computer program causes the second display apparatus 800 to perform a method performed by the second display apparatus 800 as described in any of the above embodiments; or when run on the first scrollable display apparatus 600, the computer program causes the first scrollable display apparatus 600 to perform a method performed by the first scrollable display apparatus 600 as described in any of the above embodiments; or when run on the second scrollable display apparatus 700, the computer program causes the second scrollable display apparatus 700 to perform a method performed by the second scrollable display apparatus 700 as described in any of the above embodiments.

Beneficial effects of the computer-readable storage medium, the computer program product, and the computer program are same as the beneficial effects of the method as described in some embodiments described above, and details will not be repeated here.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A scrollable display apparatus, comprising:
   a flexible display panel, including a fixed display part and at least one scrollable display part;
   at least one first detection component, a first detection component in the at least one first detection component being configured to detect location information of a scrollable display part in the at least one scrollable display part; and
   one or more first processors, configured to:
      determine a current state of the scrollable display part according to the position information of the scrollable display part detected by the first detection component, wherein the current state includes a start-unfolded state;
      if it is determined that the scrollable display part is in the start-unfolded state, control the fixed display part to display a plurality of extension selection messages; and
      in response to a control instruction corresponding to a selected extension selection message from the plurality of first extension option messages, control the scrollable display part to display extension display information corresponding to the selected extension selection message.

2. The scrollable display apparatus according to claim 1, wherein
   the current state further includes at least one target state; and
   a first processor is configured to: if it is determined that the scrollable display part is in a designated target state or upon receipt of a control instruction causing the scrollable display part to be unfolded to the designated target state, in response to the control instruction corresponding to the selected extension selection message, control the scrollable display part to display the extension display information corresponding to the selected extension selection message, wherein the designated target state is one of the at least one target state.

3. The scrollable display apparatus according to claim 2, wherein the first detection component includes:
   at least two photosensitive elements, disposed on the scrollable display part and coupled to the first processor, any photosensitive element being configured to detect an intensity of external ambient light, wherein
   the at least two photosensitive elements include a first photosensitive element and at least one second photosensitive element; and
   the first processor is configured to:
      if an intensity of external ambient light detected by the first photosensitive element is within a first preset intensity range, and an intensity of external ambient light detected by all second photosensitive elements is within a second preset intensity range, determine that the scrollable display part is in the start-unfolded state, wherein any light intensity value in the first preset intensity range is greater than any light intensity value in the second preset intensity range; and
      if the intensity of the external ambient light detected by the first photosensitive element is within the first preset intensity range, and an intensity of the external ambient light detected by a designated number of second photosensitive elements is within the second preset intensity range, determine that the scrollable display part is in the designated target state.

4. The scrollable display apparatus according to claim 2, further comprising:
a first housing component, wherein the first housing component includes a fixed member and a sliding member that are connected in a sliding manner, the fixed member is connected to the fixed display part, and the sliding member is connected to the scrollable display part, wherein
the first detection component includes an induction member and at least one detection member, the induction member is disposed on the sliding member or the scrollable display part, the at least one detection member is disposed on the fixed member and coupled to the first processor, and the at least one detection member is configured to detect position information of the induction member to obtain the position information of the scrollable display part.

5. The scrollable display apparatus according to claim 4, wherein
the scrollable display part has a display portion and a connecting portion, the display portion is adjacent to the fixed display part, and the connecting portion is located on a side of the display portion away from the fixed display part; and
the induction member is located on the connecting portion.

6. The scrollable display apparatus according to claim 4, wherein
the induction member includes a magnetic element; and
a detection member includes magnetic detection elements, and a number of the magnetic detection elements is at least two, wherein
at least two of the magnetic detection elements include an initial magnetic detection element and at least one target magnetic detection element; and
the first processor is configured to:
if the magnetic element is out of a detection range of the initial magnetic detection element and does not enter a detection range of any target magnetic detection element, determine that the scrollable display part is in the start-unfolded state; and
if the magnetic element is located within a detection range of a designated target magnetic detection element, determine that the scrollable display part is in the designated target state, wherein the designated target magnetic detection element is one of the at least one target magnetic detection element.

7. The scrollable display apparatus according to claim 4, wherein
the induction member includes a first electrode plate; and
a detection member includes a second electrode plate, and the second electrode plate and the first electrode plate form a capacitor, wherein
the first electrode plate and the second electrode plate are both coupled to the first processor; and
the first processor is configured to:
if a capacitance value of the capacitor is within a first capacitance threshold range, determine that the scrollable display part is in the start-unfolded state; and if the capacitance value of the capacitor is within a second capacitance threshold range, determine that the scrollable display part is in the designated target state.

8. The scrollable display apparatus according to claim 4, wherein
the flexible display panel includes a plurality of conductive layers, and the induction member is located in at least one conductive layer.

9. The scrollable display apparatus according to claim 4, wherein
the at least one scrollable display part is-includes two scrollable display parts, and the two scrollable display parts are respectively disposed on two opposite sides of the fixed display part; and
the sliding member further includes two sliding shafts, and a scrollable display part is wound on a portion of an outer peripheral surface of a sliding shaft; diameters of the two sliding shafts in a first direction are not equal, and the first direction is perpendicular to a display surface of the fixed display part.

10. The scrollable display apparatus according to claim 2, wherein
the first processor is further configured to:
based on the control instruction corresponding to the selected extension selection message, control the scrollable display part to be unfolded to the designated target state.

11. The scrollable display apparatus according to claim 1, wherein
the extension selection messages include a first selection message and a second selection message; and
a first processor is configured to:
in response to a control instruction corresponding to the first selection message, control the scrollable display part and the fixed display part to display a current interface of the fixed display part together; or
in response to a control instruction corresponding to the second selection message, control the scrollable display part to display a display image different from the current interface of the fixed display part.

12. The scrollable display apparatus according to claim 11, wherein
the second selection message includes any one or more of a first selection sub-message, a second selection sub-message, a third selection sub-message, and a fourth selection sub-message; and
the first processor is configured to:
in response to a control instruction corresponding to the first selection sub-message, control the scrollable display part to display desktop information of the fixed display part; or
in response to a control instruction corresponding to the second selection sub-message, control the scrollable display part to display interface information on a next layer-level of the current interface of the fixed display part; or
in response to a control instruction corresponding to the third selection sub-message, control the scrollable display part to display interface information on a previous layer-level of the current interface of the fixed display part; or
in response to a control instruction corresponding to the fourth selection sub-message, control the scrollable display part to display interface information of any application program other than a current application program from all opened application programs.

13. The scrollable display apparatus according to claim 11, further comprising:
a communication interface, coupled to the first processor and configured to be coupled to an external display apparatus, wherein
the second selection message includes a fifth selection sub-message; and
the first processor is configured to, in response to a control instruction corresponding to the fifth selection sub-message, control the scrollable display part to display current interface information of the external display apparatus.

14. A display system, comprising:
a first display apparatus, including a first connecting part; and
at least one first scrollable display apparatus, a first scrollable display apparatus in the at least one first scrollable display apparatus including a second connecting part, wherein
the first display apparatus is configured to, in a case that the second connecting part is connected to the first connecting part, and the first scrollable display apparatus is in a preset state, display a plurality of first extension option messages, wherein the preset state includes any one of a folded state and a start-unfolded state; and
the first scrollable display apparatus is configured to, in response to a control instruction corresponding to a selected first extension option message from the plurality of first extension option messages, display extension display information corresponding to the selected first extension option message.

15. The display system according to claim 14, wherein
the first scrollable display apparatus includes a flexible display panel, and the flexible display panel includes a fixed display part and at least one scrollable display part; the first scrollable display apparatus is configured to: if it is determined that the scrollable display part is in a designated target state or upon receipt of a control instruction causing the scrollable display part to be unfolded to the designated target state, in response to the control instruction corresponding to the selected first extension option message, display the extension display information corresponding to the selected first extension option message, wherein the designated target state is one of at least one target state.

16. The display system according to claim 15, wherein
the first scrollable display apparatus is further configured to, in response to the control instruction corresponding to the selected first extension option message, control the scrollable display part to be unfolded to the designated target state.

17. The display system according to claim 14, wherein
the first extension option messages include any one or more of a first option message, a second option message, a third option message, a fourth option message, and a fifth option message;
the first scrollable display apparatus is configured to:
in response to a control instruction corresponding to the first option message, display a current interface of the first display apparatus together with the first display apparatus; or
in response to a control instruction corresponding to the second option message, display interface information on a next layer-level of the current interface of the first display apparatus; or
in response to a control instruction corresponding to the third option message, display interface information on a previous layer-level of the current interface of the first display apparatus; or
in response to a control instruction corresponding to the fourth option message, display desktop information of the current interface of the first display apparatus; or
in response to a control instruction corresponding to the fifth option message, display interface information of any application program other than a current application program from all opened application programs on the first display apparatus.

18. The display system according to claim 14, further comprising a second scrollable display apparatus, wherein
the second scrollable display apparatus is coupled to the first display apparatus, and the first display apparatus is further configured to:
in a case that the second connecting part is connected to the first connecting part, and an apparatus of the first scrollable display apparatus and the second scrollable display apparatus is in a start-folded state, obtain display information of the apparatus in the start-folded state; and based on the display information, control an other apparatus of the first scrollable display apparatus and the second scrollable display apparatus to be folded to a designated target state, and to display the display information; or
in a case that the second connecting part is connected to the first connecting part, and of the first scrollable display apparatus and the second scrollable display apparatus, an apparatus is in the start-unfolded state, and an other apparatus is in the start-folded state, obtain display information of the apparatus in the start-folded state, and transmit the display information to the apparatus in the start-unfolded state; or
the second scrollable display apparatus is coupled to the first scrollable display apparatus, wherein in a case that, of the first scrollable display apparatus and the second scrollable display apparatus, an apparatus is in the start-unfolded state, and an other apparatus is in the start-folded state, the apparatus in the start-unfolded state is configured to obtain and display display information of the apparatus in the start-folded state.

19. The display system according to claim 14, further comprising a second display apparatus, wherein
the second display apparatus is coupled to the first scrollable display apparatus;
the second display apparatus is configured to:
in a case that the second connecting part is connected to the first connecting part, and the first scrollable display apparatus is in the preset state, display a plurality of second extension option messages, wherein the preset state includes any one of the folded state and the start-unfolded state; and
the first scrollable display apparatus is configured to, in response to a control instruction corresponding to a selected second extension option message, display extension display information corresponding to the selected second extension option message.

20. The display system according to claim 19, wherein
the second extension option messages include any one or more of a sixth option message, a seventh option message, an eighth option message, and a ninth option message;

the first scrollable display apparatus is configured to:
  in response to a control instruction corresponding to the sixth option message, display interface information on a next layer-level of a current interface of the second display apparatus; or
  in response to a control instruction corresponding to the seventh option message, display interface information on a previous layer-level of the current interface of the second display apparatus; or
  in response to a control instruction corresponding to the eighth option message, display desktop information of the second display apparatus; or
  in response to a control instruction corresponding to the ninth option message, display interface information of any application program other than a current application program from all opened application programs on the second display apparatus.

* * * * *